US012800603B2

(12) United States Patent
Tada et al.

(10) Patent No.: US 12,800,603 B2
(45) Date of Patent: Nov. 17, 2026

(54) SPECIMEN MEASUREMENT APPARATUS AND SPECIMEN TRANSPORT DEVICE

(71) Applicant: Sysmex Corporation, Kobe (JP)

(72) Inventors: Masashi Tada, Kobe (JP); Taku Inoue, Kobe (JP); Hironori Katsumi, Kobe (JP)

(73) Assignee: Sysmex Corporation, Kobe (JP)

( * ) Notice: Subject to any disclaimer, the term of this patent is extended or adjusted under 35 U.S.C. 154(b) by 489 days.

(21) Appl. No.: 18/492,248

(22) Filed: Oct. 23, 2023

(65) Prior Publication Data

US 2024/0142483 A1 May 2, 2024

(30) Foreign Application Priority Data

Oct. 28, 2022 (JP) ................................ 2022-173738
Oct. 28, 2022 (JP) ................................ 2022-173739

(51) Int. Cl.
*G01N 35/04* (2006.01)
*G01N 35/02* (2006.01)

(52) U.S. Cl.
CPC ........... *G01N 35/04* (2013.01); *G01N 35/026* (2013.01); *G01N 2035/0412* (2013.01); *G01N 2035/0415* (2013.01); *G01N 2035/0479* (2013.01)

(58) Field of Classification Search
None
See application file for complete search history.

(56) References Cited

U.S. PATENT DOCUMENTS

2009/0003981 A1 1/2009 Miller
2014/0079527 A1* 3/2014 Takai .................. G01N 35/026 422/65

(Continued)

FOREIGN PATENT DOCUMENTS

CN 104515864 4/2015
EP 0809112 B1 2/2006

(Continued)

OTHER PUBLICATIONS

"Office Action of Europe Counterpart Application", issued on Nov. 20, 2025, p. 1-p. 9.

(Continued)

*Primary Examiner* — Lore R Jarrett
(74) *Attorney, Agent, or Firm* — JCIPRNET

(57) ABSTRACT

Disclosed is a specimen measurement apparatus comprising: a measurement unit configured to suction a specimen from a specimen container and measure the suctioned specimen; and a specimen transport unit configured to transport the specimen container to the measurement unit, wherein the specimen transport unit includes a first transport part including a first placement surface configured to allow a specimen rack to be placed thereon, the first transport part being configured to transport a plurality of the specimen racks, each holding the specimen container, on the first placement surface, and a second transport part disposed above the first transport part and including a second placement surface configured to allow the specimen rack to be placed thereon, the second transport part being configured to transport a plurality of the specimen racks on the second placement surface, and at least one of the first transport part and the second transport part is configured to allow the specimen rack to be taken out therefrom or set thereon by a user in a state where the first placement surface and the second (Continued)

placement surface are located at predetermined positions for transporting the specimen rack.

17 Claims, 30 Drawing Sheets

(56) References Cited

U.S. PATENT DOCUMENTS

| | | | | |
|---|---|---|---|---|
| 2014/0212248 | A1* | 7/2014 | Takai | G01N 35/04 414/281 |
| 2021/0011040 | A1 | 1/2021 | Masutani et al. | |
| 2021/0285978 | A1 | 9/2021 | Feilders et al. | |

FOREIGN PATENT DOCUMENTS

| | | | |
|---|---|---|---|
| EP | 3396388 | A1 | 10/2018 |
| JP | H06-207943 | A | 7/1994 |
| JP | H07-234228 | A | 9/1995 |
| JP | H09-304396 | A | 11/1997 |
| JP | 2003262642 | | 9/2003 |
| JP | 2013-142560 | A | 7/2013 |
| JP | 2015010961 | | 1/2015 |
| JP | 2019-174397 | A | 10/2019 |
| JP | 2019174396 | | 10/2019 |
| WO | 2011/093442 | A1 | 8/2011 |

OTHER PUBLICATIONS

The extended European search report ("EESR") issued on Feb. 26, 2024 in a related European patent application No. 23205792.7 (10 pages).

The extended European search report ("EESR") issued on Apr. 10, 2024 in a counterpart European patent application No. 23205787.7 (10 pages).

"Office Action of US Related U.S. Appl. No. 18/492,208", issued on May 7, 2026, pp. 1-32.

"Notice of Reasons for Refusal of Japan Counterpart Application", issued on May 19, 2026, with English translation thereof, p. 1-p. 5.

"Office Action of U.S. Related Application, U.S. Appl. No. 18/492,208", issued on May 7, 2026, p. 1-p. 32.

* cited by examiner (5) TRANSPORT RACK FROM FIRST LIFTING/LOWERING PART TO SPECIMEN SUCTION POSITION ON FIRST TRANSPORT PATH (6) RELAY RACK FROM FIRST TRANSPORT PATH TO SECOND LIFTING/LOWERING PART (7) RELAY RACK FROM SECOND LIFTING/LOWERING PART TO SECOND TRANSPORT PATH (8) RELAY RACK FROM SECOND TRANSPORT PATH TO FIRST LIFTING/LOWERING PART (9) RELAY RACK FROM FIRST LIFTING/LOWERING PART TO FIRST TRANSPORT PART (1a) SET SPECIMEN RACK ONTO THIRD TRANSPORT PART (2a) RELAY RACK FROM THIRD TRANSPORT PART TO FIRST LIFTING/LOWERING PART (FIRST MODIFICATION) RETURN RACK FROM FIRST LIFTING/LOWERING PART TO THIRD TRANSPORT PART (SECOND MODIFICATION)

(SECOND MODIFICATION)

(SECOND MODIFICATION)

(THIRD MODIFICATION)

(FOURTH MODIFICATION)

(FIFTH MODIFICATION)

(SIXTH MODIFICATION)

(SEVENTH MODIFICATION)

SPECIMEN MEASUREMENT APPARATUS AND SPECIMEN TRANSPORT DEVICE

CROSS REFERENCE TO RELATED APPLICATIONS

This application claims priority from prior Japanese Patent Application No. 2022-173738, filed on Oct. 28, 2022, entitled "SPECIMEN MEASUREMENT APPARATUS AND SPECIMEN TRANSPORT DEVICE" and prior Japanese Patent Application No. 2022-173739, filed on Oct. 28, 2022, entitled "SPECIMEN MEASUREMENT APPARATUS AND SPECIMEN TRANSPORT DEVICE", the entire contents of which are incorporated herein by reference.

FIELD OF THE INVENTION

The present invention relates to: a specimen transport unit (specimen transport device) that transports a specimen rack to a measurement unit (measurement device) for measuring a specimen and collects the specimen rack from the measurement device; and a specimen measurement apparatus including the specimen transport device.

BACKGROUND OF THE INVENTION

Japanese Laid-Open Patent Publication No. 2019-174397 discloses a specimen measurement system including: a specimen setting unit; a specimen measurement unit; a specimen transport path through which a specimen rack is transported from the specimen setting unit to the specimen measurement unit; a specimen collection path which is provided at a position, in the height direction, different from that of the specimen transport path and through which a specimen rack is collected from the specimen measurement unit to the specimen setting unit; and a transfer mechanism which transfers a specimen rack from the specimen transport path to the specimen collection path. The specimen setting unit includes a cart for holding a specimen rack, and the cart is accommodated inside the specimen setting unit. The cart has: an upper stage as a specimen setting part on which a specimen rack holding pre-measurement specimen containers is set; and a lower stage as a rack collection part on which a specimen rack holding post-measurement specimen containers is collected. A laboratory technician or the like who uses the specimen measurement system draws out the cart from the specimen setting unit, and places a specimen rack onto the upper stage of the cart or takes out, from the lower stage of the cart, a specimen container containing a specimen having been measured.

In the above Japanese Laid-Open Patent Publication No. 2019-174397, the cart needs to be drawn out from the specimen setting unit in order to set a specimen rack in the specimen setting unit or take out a specimen rack from the specimen setting unit. This results in complexity. Thus, it has been desired to mitigate load of a user's work regarding setting and collection of a specimen rack.

SUMMARY OF THE INVENTION

The scope of the present invention is defined solely by the appended claims, and is not affected to any degree by the statements within this summary.

In order to attain the above object, as shown in FIG. 1 and FIG. 2, a specimen measurement apparatus (300) according to the present invention includes: a measurement unit (10) configured to suction a specimen from a specimen container (1) and measure the suctioned specimen; and a specimen transport unit (20) configured to transport the specimen container (1) to the measurement unit (10), wherein the specimen transport unit (20) includes a first transport part (21) including a first placement surface (21*b*) configured to allow a specimen rack (2) to be placed thereon, the first transport part (21) being configured to transport a plurality of the specimen racks (2), each holding the specimen container (1), on the first placement surface (21*b*), and a second transport part (22) disposed above the first transport part (21) and including a second placement surface (22*b*) configured to allow the specimen rack (2) to be placed thereon, the second transport part (22) being configured to transport a plurality of the specimen racks (2) on the second placement surface (22*b*), and at least one of the first transport part (21) and the second transport part (22) is configured to allow the specimen rack (2) to be taken out therefrom or set thereon by a user in a state where the first placement surface (21*b*) and the second placement surface (22*b*) are located at predetermined positions for transporting the specimen rack (2).

As shown in FIG. 1 to FIG. 3, a specimen transport device (20) according to the present invention is a specimen transport device configured to transport a specimen container (1) to a measurement device (10) configured to suction a specimen from the specimen container (1), the measurement device (10) being further configured to measure the suctioned specimen, the specimen transport device including: a first transport part (21) including a first placement surface (21*b*) configured to allow a specimen rack (2) to be placed thereon, the first transport part (21) being configured to transport a plurality of the specimen racks (2), each holding the specimen container (1), on the first placement surface (21*b*); and a second transport part (22) disposed above the first transport part (21) and including a second placement surface (22*b*) configured to allow the specimen rack (2) to be placed thereon, the second transport part (22) being configured to transport a plurality of the specimen racks (2) on the second placement surface (22*b*), wherein at least one of the first transport part (21) and the second transport part (22) is configured to allow the specimen rack (2) to be taken out therefrom or set thereon by a user in a state where the first placement surface (21*b*) and the second placement surface (22*b*) are located at predetermined positions for transporting the specimen rack (2).

DETAILED DESCRIPTION

Hereinafter, an embodiment will be described with reference to the drawings.

Figure 1:
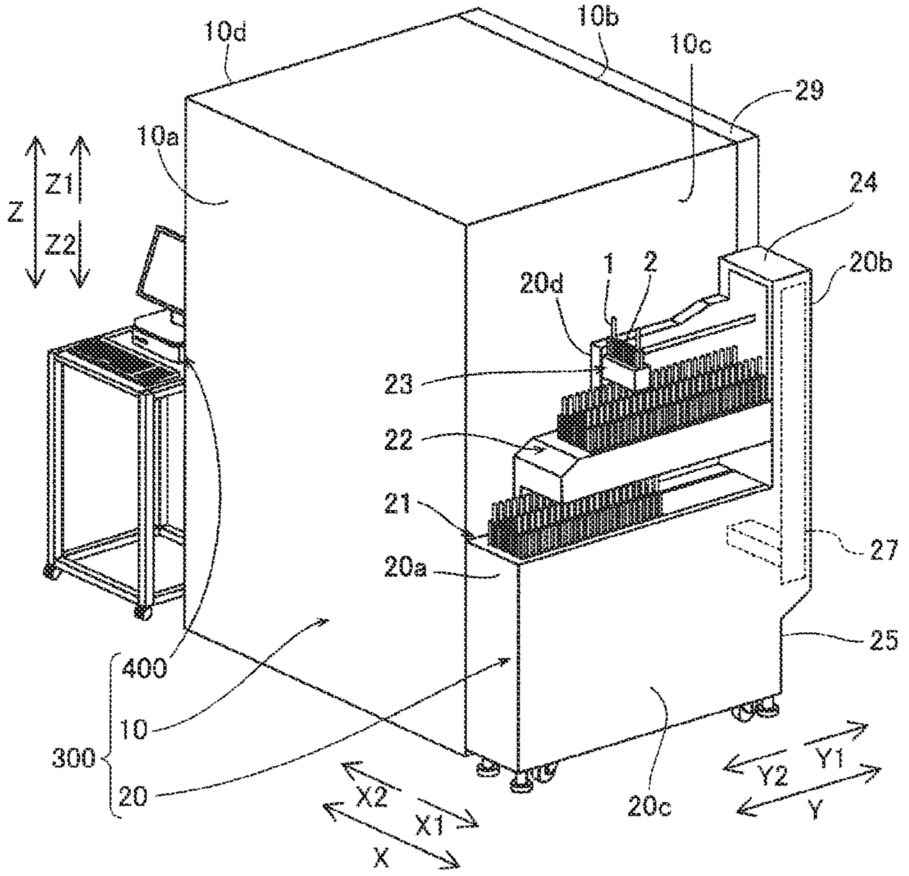
FIG. 1 is a schematic perspective view of a specimen measurement apparatus in the present embodiment.

As shown in FIG. 1, a specimen measurement apparatus 300 includes a measurement unit 10, a specimen transport unit 20, and an analysis unit 400.

The measurement unit 10 is configured to suction a specimen from a specimen container 1 and measure the suctioned specimen. Specifically, the measurement unit 10 is an immunoassay device that detects an analyte in the specimen by utilizing an antigen-antibody reaction. The specimen is serum or plasma.

The measurement unit 10 has a front surface 10*a*, a rear surface 10*b*, and a pair of side surfaces 10*c* and 10*d*. The measurement unit 10 has a structure in which various mechanisms for performing specimen measurement are accommodated in a box-like housing. The front surface 10*a*, the rear surface 10*b*, and the pair of side surfaces 10*c* and 10*d* are outer surfaces of the housing.

Hereinafter, in a horizontal plane, a lateral direction extending along the front surface 10*a* of the measurement unit 10 is defined as an X direction, and directions to one side and another side in the X direction are respectively defined as an X1 direction and an X2 direction. In the horizontal plane, a front-rear direction extending along the side surfaces 10*c* and 10*d* of the measurement unit 10 is defined as a Y direction, a direction to the farther side (rear surface 10*b* side) in the Y direction is defined as a Y1 direction, and a direction to the nearer side (front surface 10*a* side) in the Y direction is defined as a Y2 direction. An up-down direction orthogonal to the X direction and the Y direction is defined as a Z direction, and an upward direction and a downward direction in the Z direction are respectively defined as a Z1 direction and a Z2 direction.

The specimen transport unit 20 is configured to transport a specimen container 1 to the measurement unit 10. That is, the specimen transport unit 20 is a specimen transport device for transporting a specimen container 1 to the measurement device (measurement unit 10) which suctions a specimen from the specimen container 1 and which measures the suctioned specimen.

The specimen transport unit 20 allows a specimen rack 2 holding a specimen container 1 to be set thereon. On the specimen transport unit 20, a specimen rack 2 holding a specimen container 1 that has not been subjected to specimen suction by the measurement unit 10 is set by a user. The specimen transport unit 20 is configured to transport the specimen rack 2 having been set thereon toward the measurement unit 10. The specimen transport unit 20 is configured to collect and store thereon a specimen rack 2 holding a specimen container 1 that has been subjected to specimen suction by the measurement unit 10 (hereinafter, referred to as a specimen rack 2 having been subjected to specimen suction). The specimen rack 2 having been subjected to specimen suction is taken out from the specimen transport unit 20 by a user.

The specimen transport unit 20 is disposed on the X1 side relative to the measurement unit 10 so as to be adjacent to the side surface 10*c* on one side (X1 side) of the measurement unit 10. The specimen transport unit 20 extends in the front-rear direction (Y direction) along the side surface 10*c* on the X1 side of the measurement unit 10. The specimen transport unit 20 has a front surface 20*a*, a rear surface 20*b*, and a pair of side surfaces 20*c* and 20*d*. The front surface 20*a* and the rear surface 20*b* are end surfaces in the long-side direction (Y direction) of the specimen transport unit 20. The pair of side surfaces 20*c* and 20*d* are surfaces in the short-side direction (X direction) of the specimen transport unit 20.

Figure 2:
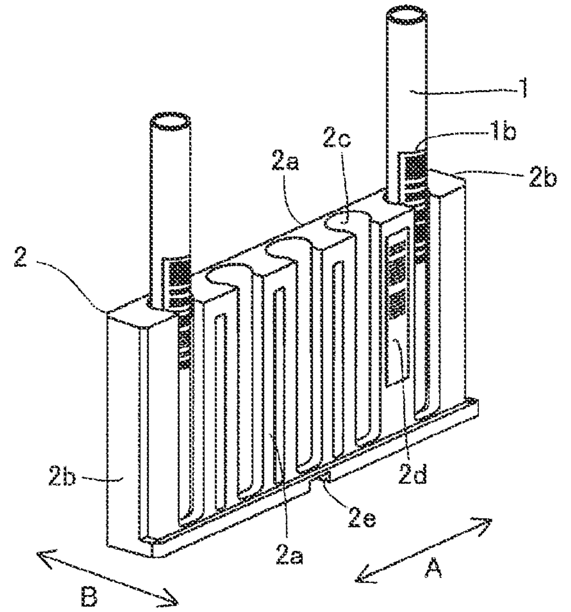
FIG. 2 is a schematic perspective view showing a specimen rack.

As shown in FIG. 2, the specimen rack 2 has the shape of a rectangular parallelepiped including a pair of long-side side surfaces 2*a* and a pair of short-side side surfaces 2*b*. The direction in which the long-side side surfaces 2*a* extend is a long-side direction A of the specimen rack 2, and the direction in which the short-side side surfaces 2*b* extend is a short-side direction B of the specimen rack 2. The specimen rack 2 has a plurality of holding holes 2*c* extending downward from the upper surface thereof. One specimen container 1 is inserted into one of the holding holes 2*c* so that the specimen container 1 is held. The plurality of holding holes 2*c* are linearly provided at intervals along the long-side direction A of the specimen rack 2. A barcode label 2*d* indicating identification information for identifying the specimen rack 2 is pasted on the long-side side surface 2*a* on one side. An engagement groove 2*e* to be engaged with an engagement piece 36*a* (see FIG. 6) of a laterally-sending mechanism 36 described later is formed in a bottom portion of the specimen rack 2.

The specimen container 1 is a cylindrical container having a cylindrical shape and having an opened upper end and a closed bottom portion. A specimen collected from a subject is contained inside the specimen container 1. A barcode label 1*b* indicating identification information for identifying the specimen container 1 is pasted on the side surface of the specimen container 1. Each of the holding holes 2*c* is in the form of a cut leading to the long-side side surface 2*a* on the one side, and the side surface of the corresponding specimen container 1 inserted into the holding hole 2*c* is partially exposed from the long-side side surface 2*a* on the one side. A user inserts the specimen container 1 into the holding hole 2*c* with the specimen container 1 being oriented such that the barcode label 1*b* of the specimen container 1 is exposed from the cut of the long-side side surface 2*a*.

(Configuration of Specimen Transport Unit)

Figure 3:
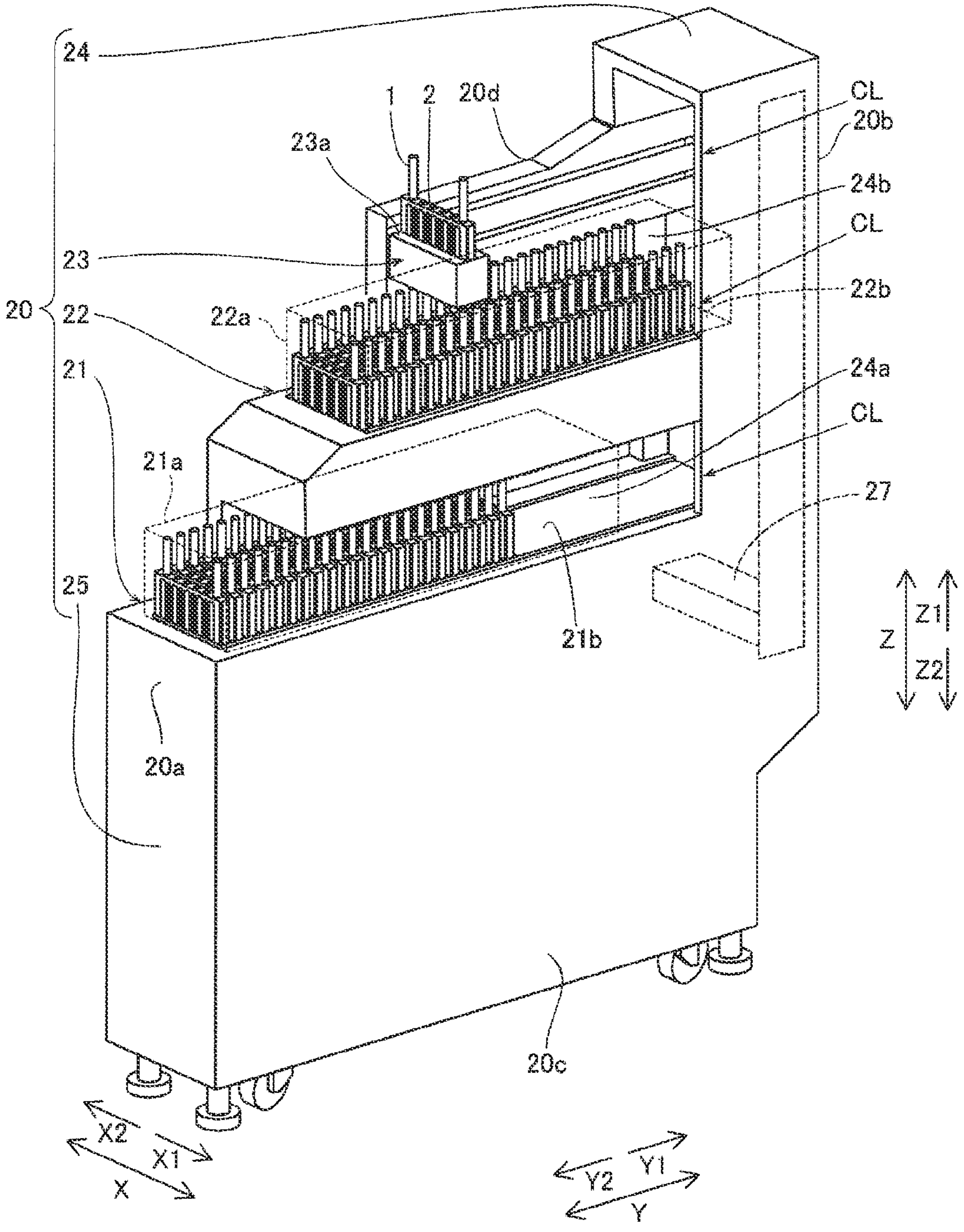
FIG. 3 is a schematic perspective view showing a portion of a specimen transport unit.

As shown in FIG. 1, the specimen transport unit 20 includes: a first transport part 21; a second transport part 22 disposed above the first transport part 21; a third transport part 23 disposed above the second transport part 22; a first lifting/lowering part 27; and a transport mechanism 29. FIG. 3 is a schematic perspective view showing a portion of the specimen transport unit 20. As shown in FIG. 3, the specimen transport unit 20 includes the first transport part 21, the second transport part 22, the third transport part 23, and furthermore, a cover part 24 described later. The cover part 24 is an exterior member of the specimen transport unit 20.

The first transport part 21, the second transport part 22, and the third transport part 23 are arranged in the up-down direction. That is, the specimen transport unit 20 has a layered structure composed of three layers.

The first transport part 21 has a placement surface and is configured to transport a plurality of specimen racks 2, each holding a specimen container 1, on the placement surface in the short-side direction B of the specimen racks 2. The second transport part 22 has a placement surface and is configured to transport a plurality of specimen racks 2 on the placement surface in the short-side direction B of the specimen racks 2. The third transport part 23 has a placement surface and is configured to transport a specimen rack 2 on the placement surface in the short-side direction B of the specimen rack 2.

In the present embodiment, the first transport part 21 is a rack collection part that collects a specimen rack 2 holding a specimen container 1 having been subjected to specimen suction by the measurement unit 10. The first transport part 21 is configured to be able to hold a plurality of the specimen racks 2 and store the specimen racks 2 until a user takes out the specimen racks 2. The second transport part 22 is a rack setting part on which a specimen rack 2 that has not been subjected to specimen suction by the measurement unit 10 is set, and which transports the specimen rack 2 having been set thereon toward the measurement unit 10.

Thus, the rack collection part (first transport part 21) and the rack setting part (second transport part 22) are located so as to overlap with each other in a top view. Consequently, as compared to a case where all of the individual transport parts are arranged at different positions in a plan view, the installation area of the device can be decreased, and the positions for work of setting and collecting specimen racks 2 by a user can be set to coincide with one another. Therefore, the user does not have to move to a plurality of work positions, whereby the efficiency of a user's work can be enhanced and load of a user's work can be decreased.

In addition, since the second transport part 22 on the upper side out of the first transport part 21 and the second transport part 22 is configured as the rack setting part, work of setting a specimen rack 2 holding a specimen container 1 to be subjected to measurement can be performed at a high position that is closer to the height of the eyes of a user. Therefore, at the time of setting a specimen rack 2, work of checking as to whether, for example, wrong specimen containers 1 are absent on the specimen rack 2 can be easily performed.

On the third transport part 23, a specimen rack 2 can be set. The third transport part 23 is an interruption specimen setting part. On the third transport part 23, a specimen rack 2 holding a specimen container 1 that is to be subjected to specimen suction by the measurement unit 10 in preference to the specimen container 1 held by the specimen rack 2 having been set on the second transport part 22, is set. The third transport part 23 is configured to transport the specimen rack 2 having been set thereon toward the measurement unit 10 in preference to the specimen rack 2 having been set on the second transport part 22. The specimen rack 2 set on the third transport part 23 holds a specimen container 1 containing an interruption specimen. Examples of the interruption specimen include: an urgent specimen as a specimen from a subject; a control specimen that contains a predetermined component in a predetermined amount and that is used for quality control of the measurement unit 10; and a calibrator used for creating a calibration curve for converting a detection signal outputted from the measurement unit 10 into a concentration of the predetermined component.

That is, as specimens to be measured by the measurement unit 10, there are two types of specimens, i.e., an ordinary specimen and an interruption specimen. Hereinafter, a case where the interruption specimen is an urgent specimen will be described. A user ordinarily sets, on the second transport part 22 (rack setting part), a specimen rack 2 holding a specimen container 1 containing the ordinary specimen. A plurality of the specimen racks 2 can be set on the second transport part 22. The second transport part 22 sequentially sends out the specimen racks 2 having been set thereon toward the measurement unit 10.

When there is an urgent specimen to be measured prior to specimens of the specimen racks 2 having been set on the second transport part 22, a user sets, on the third transport part 23 (interruption specimen setting part), a specimen rack 2 holding a specimen container 1 containing the urgent specimen. When the specimen rack 2 is set on the third transport part 23, the second transport part 22 temporarily stops sending out the specimen racks 2, and the third transport part 23 preferentially (i.e., as an interruption process) sends out the specimen rack 2 having been set thereon toward the measurement unit 10.

Since the second transport part 22 as the rack setting part and the third transport part 23 as the interruption specimen setting part are arranged upward/downward, a specimen rack 2 with an urgent specimen being set can be set on the third transport part 23 by a user from the same standing position as the standing position at which a specimen rack 2 with an ordinary specimen being set is set on the second transport part 22. As a result, a specimen rack 2 with an urgent specimen being set is easily set.

The first transport part 21, the second transport part 22, and the third transport part 23 are provided along the front-rear direction, of the measurement unit 10, which is the short-side direction B so as to be side-by-side with the side surface 10*c* on the X1 side out of the pair of side surfaces 10*c* and 10*d* of the measurement unit 10.

Each of the first transport part 21, the second transport part 22, and the third transport part 23 allows a specimen rack 2 to be set thereon so as to be oriented such that: the long-side direction A of the specimen rack 2 coincides with the X direction; and the short-side direction B of the specimen rack 2 coincides with the Y direction. On each of the second transport part 22 and the first transport part 21, a plurality of specimen racks 2 are disposed side-by-side along the Y direction. Each of the first transport part 21, the second transport part 22, and the third transport part 23 is configured to transport a specimen rack 2 holding a specimen container 1 in the short-side direction B of the specimen rack 2 (i.e., Y direction). In other words, each of the first transport part 21, the second transport part 22, and the third transport part 23 is configured to hold and transport the specimen rack 2 oriented such that: the long-side direction A of the specimen rack 2 coincides with the width direction of said part (X direction); and the short-side direction (direction B) of the specimen rack 2 coincides with the transport direction of said part (Y direction).

The third transport part 23 is not used in the absence of a specimen to be preferentially processed, and thus is used less often than the second transport part 22. The number of racks that can be set on the third transport part 23 is smaller than the number of racks that can be set on the second transport part 22. For example, the number of racks that can be set on the second transport part 22 is 25, and the number of racks that can be set on the third transport part 23 is 1. The number of racks that can be stored on the first transport part 21 is equal to or larger than the number of racks that can be set on the second transport part 22 and is, for example, 30.

In addition, each of the first transport part 21, the second transport part 22, and the third transport part 23 has a single transport lane CL on which a specimen rack 2 is transported. On the second transport part 22 and the first transport part 21, specimen racks 2 are linearly arrayed along the Y direction. Consequently, the occupation areas, in the horizontal plane, of the first transport part 21, the second transport part 22, and the third transport part 23 can be made smaller than those in a case where the first transport part 21, the second transport part 22, and the third transport part 23 include a plurality of lanes in the horizontal plane. As a result, the installation area of the specimen transport unit 20 can be effectively decreased.

Here, with the configuration in which the plurality of transport parts are arranged upward/downward, the second transport part 22 on the upper side might hinder work of setting or collecting a specimen rack 2 with respect to the first transport part 21 on the lower side.

Considering this, in the present embodiment, at least the first transport part 21 out of the first transport part 21 and the second transport part 22 is configured to allow a specimen rack 2 to be taken out therefrom or set thereon in the long-side direction A (X direction) of the specimen rack 2 in a state where the respective placement surfaces (21*b*, 22*b*) of the first transport part 21 and the second transport part 22 are located at predetermined positions for transport shown in FIG. 1. The state of being located at the predetermined positions for transport refers to a state where each of the placement surfaces (21*b*, 22*b*) is located at a position at which the specimen rack 2 can be relayed between the placement surface (21*b*, 22*b*) and a transport surface of a transport device on the upstream or downstream side. In addition, at least the first transport part 21 out of the first transport part 21 and the second transport part 22 is configured to allow a specimen rack 2 to be taken out therefrom or set thereon in the long-side direction A (X direction) of the specimen rack 2 during operation of the specimen transport unit 20. The phrase "during operation of the specimen transport unit 20" means a period in which an operation of transporting a specimen rack 2 holding a specimen container 1 that has not been subjected to specimen suction to a specimen suction position of the measurement unit 10 and collecting the specimen rack 2 holding the specimen container 1 that has been subjected to specimen suction from the specimen suction position of the measurement unit 10, is being performed. That is, during the period from send-out of a specimen rack 2 set on the second transport part 22 or the third transport part 23 to collection of the specimen rack 2 onto the first transport part 21, a preceding specimen rack 2 having been collected can be taken out from the first transport part 21.

Consequently, work of collecting a specimen rack 2 from the first transport part 21 can be easily performed without moving the respective placement surfaces (21*b*, 22*b*) of the first transport part 21 and the second transport part 22. In addition, work of collecting a specimen rack 2 from the first transport part 21 can be easily performed even during operation of the specimen transport unit 20. With the above configuration, the specimen measurement apparatus 300 in the present embodiment enables reduction of the installation area thereof and mitigation of load of a user's work regarding setting and collection of a specimen rack.

In the present embodiment, both the first transport part 21 and the second transport part 22 are configured to allow specimen racks 2 to be taken out therefrom or set thereon in the state where the respective placement surfaces (21*b*, 22*b*) of the first transport part 21 and the second transport part 22 are located at the predetermined positions for transport shown in FIG. 1. To this end, the cover part 24 of the specimen transport unit 20 is provided such that at least portions of a rack storing region 21*a* of the first transport part 21 and a rack storing region 22*a* of the second transport part 22 are uncovered and exposed to outside. The rack storing regions are spaces in which a plurality of specimen racks 2 can be stored on the respective transport parts.

Figure 5:
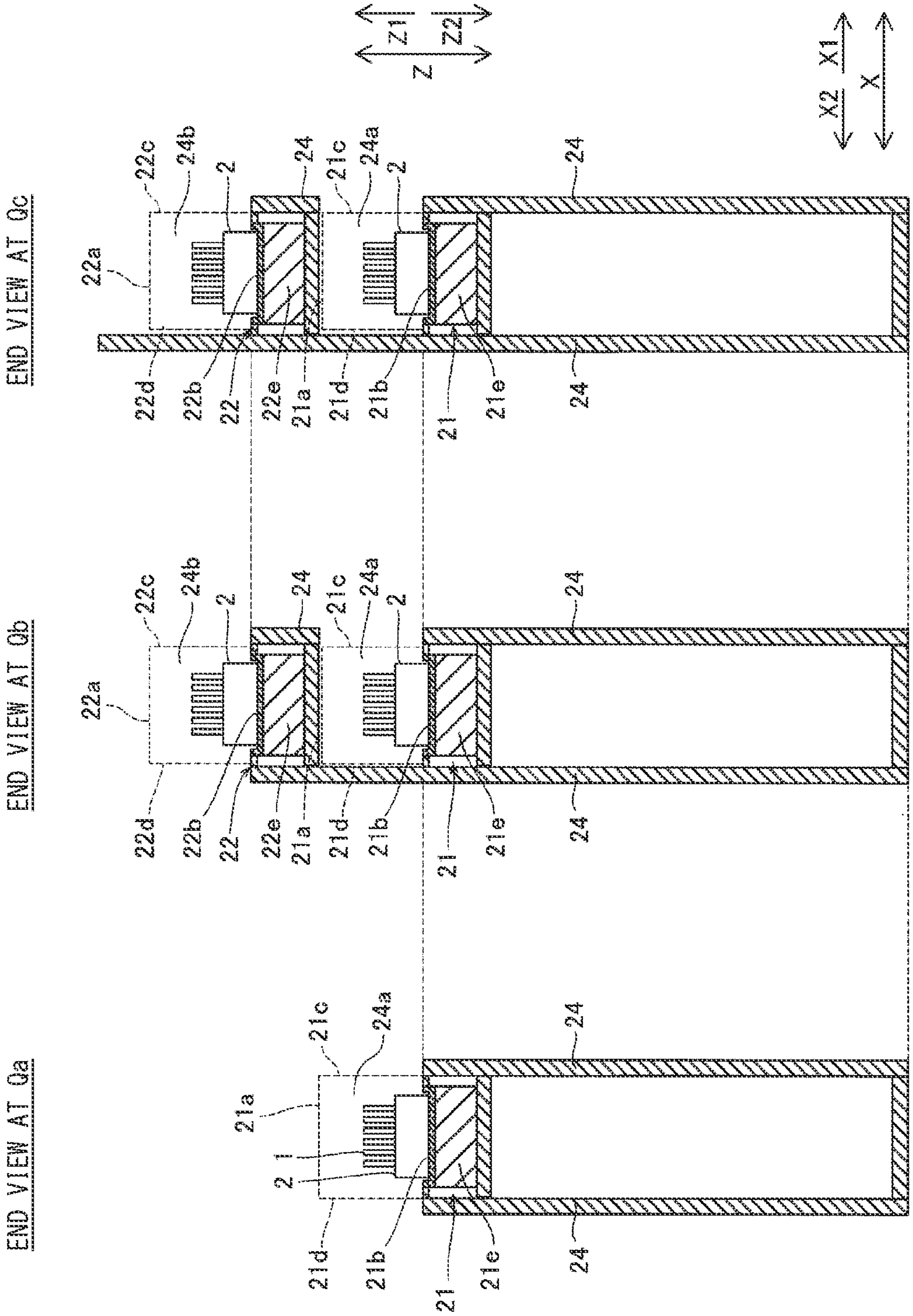
FIG. 5 is a schematic diagram in which the shapes of end surfaces of the specimen transport unit at respective positions Qa, Qb, and Qc shown in FIG. 4 are compared.

The first transport part 21 and the second transport part 22 each have a pair of side surfaces extending along the short-side direction B and respectively have the placement surfaces (21*b*, 22*b*) which allow a plurality of specimen racks 2 to be placed thereon. Specifically, the first transport part 21 has: the first placement surface 21*b* extending in the Y direction; and a side surface 21*c* on the X1 side and a side surface 21*d* on the X2 side which are shown in FIG. 5. The second transport part 22 has: the second placement surface 22*b* extending in the Y direction; and a side surface 22*c* on the X1 side and a side surface 22*d* on the X2 side which are shown in FIG. 5. The side surfaces 21*d* and 22*d* on the X2 side are side surfaces on the side facing the measurement unit 10.

Figure 4:
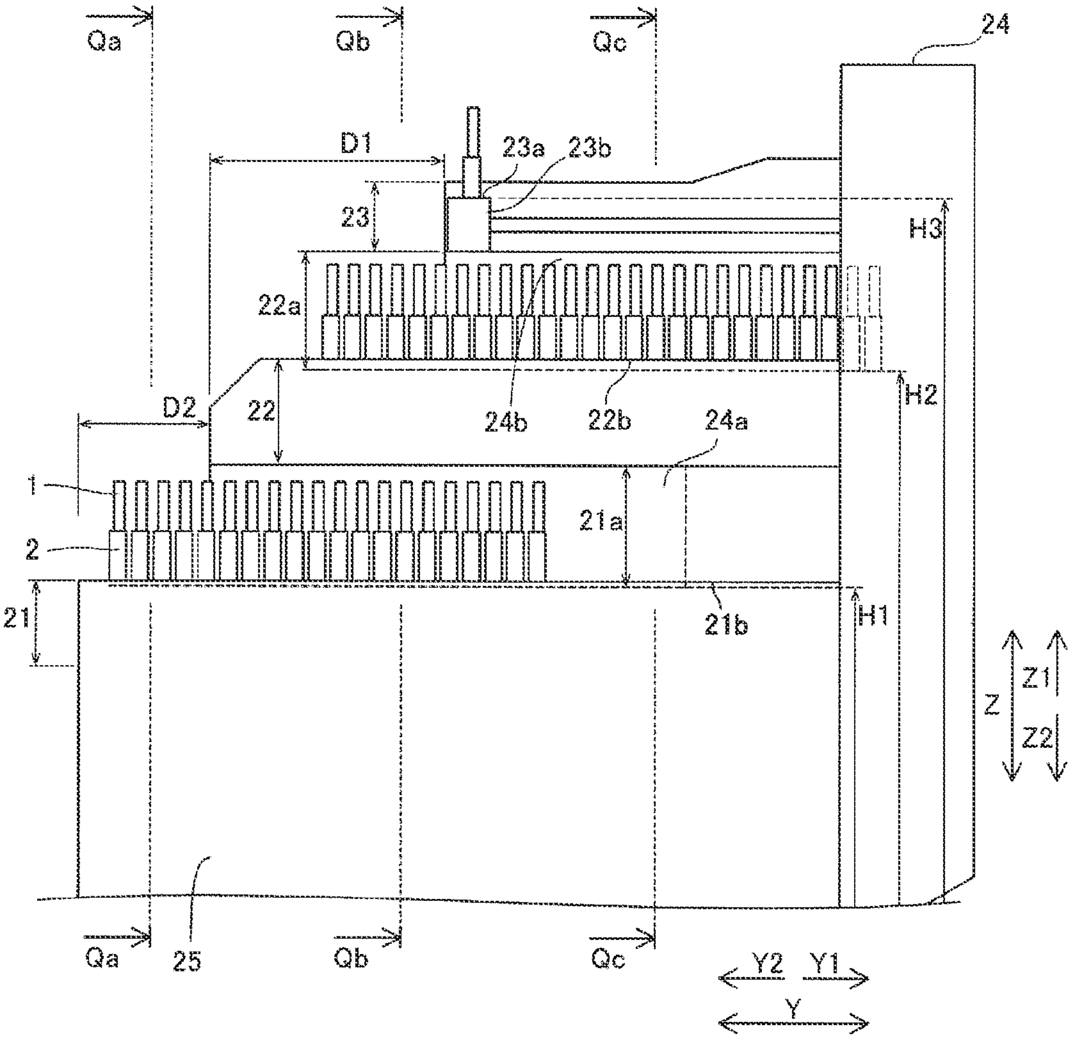
FIG. 4 is a schematic side view showing an upper portion of the specimen transport unit in an enlarged manner.

As shown in FIG. 4, the first placement surface 21*b*, for specimen racks 2, of the first transport part 21 is located at a height H1. The second placement surface 22*b* of the second transport part 22 is located at a height H2. A third placement surface 23*a* of the third transport part 23 is located at a height H3. Each of the heights H1 to H3 means a height from the floor surface on which the specimen transport unit 20 is installed. The heights of the respective placement surfaces are in a relationship of height H1<height H2<height H3. For example, the height H1 is about 65 cm, and the height H3 is about 105 cm. Although the heights H1 to H3 are not limited, the height H1 may be preferably not lower than 35 cm and not higher than 95 cm and more preferably not lower than 45 cm and not higher than 85 cm from the viewpoint of making it easy to set and take out a specimen rack 2. From the same viewpoint, the height H3 may be preferably not lower than 75 cm and not higher than 135 cm and more preferably not lower than 85 cm and not higher than 125 cm.

The height range between the first placement surface 21*b* of the first transport part 21 and the lower surface of the second transport part 22 is the rack storing region 21*a*, on the first placement surface 21*b*, in which a specimen rack 2 is stored. The height range between the second placement surface 22*b* of the second transport part 22 and the lower surface of the third transport part 23 is the rack storing region 22*a*, on the second placement surface 22*b*, in which a specimen rack 2 is stored. Each of the rack storing regions 21*a* and 22*a* extends along the short-side direction B (Y direction) such that a plurality of specimen racks 2 can be set side-by-side in the short-side direction B.

<Structure for Taking Out or Setting Specimen Rack from Side Surface Side>

As shown in FIG. 3 to FIG. 5, the cover part 24 is provided so as to cover the specimen transport unit 20 such that a range, of the side surface 21*c* on the X1 side of the first transport part 21, that corresponds to the entire length of the rack storing region 21*a* on the first placement surface 21*b* is exposed to outside. That is, the cover part 24 has a shape in which an exposed portion 24*a*, at which the X1 side of the rack storing region 21*a* is exposed, is formed such that a user can take out a specimen rack 2 from the X1 side of the rack storing region 21*a*. The exposed portion 24*a* is a space included in the rack storing region 21*a*.

Consequently, even in the configuration in which the second transport part 22 is disposed above the first transport part 21, a specimen rack 2 can be taken out from or set on the first transport part 21 from the side surface 21*c* side during operation of the specimen transport unit 20.

In the present embodiment, a range, of the side surface 22*c* on the X1 side of the second transport part 22, that corresponds to a portion of the rack storing region 22*a* is not covered by the cover part 24 and is exposed. The cover part 24 has a shape in which an exposed portion 24*b*, at which a portion of the X1 side of the rack storing region 22*a* is exposed, is formed such that a user can set a specimen rack 2 from the X1 side of the rack storing region 22*a*. The exposed portion 24*b* is a space included in the rack storing region 22*a*. In the present embodiment, the rack storing region 22*a* allows twenty-five specimen racks 2 to be placed therein and has a range that corresponds to twenty-three specimen racks 2 on the Y2 side and that is not covered by the cover part 24 and is exposed. The size of the region that is not covered by the cover part 24 and is exposed is not limited, and the region only has to have a size that allows one or more specimen racks 2 to be placed. The size of the region may be, for example, a size that is not smaller than 1/10, 1/5, 1/4, 1/3, 1/2, or 2/3 of the size corresponding to the maximum number of (in the present embodiment, twenty-five) specimen racks 2 that can be placed in the rack storing region 22*a*.

Consequently, in the present embodiment, even in the configuration in which the third transport part 23 is disposed above the second transport part 22, a specimen rack 2 can be taken out from or set on the second transport part 22 from the side surface 22*c* side in the state where the respective placement surfaces (21*b*, 22*b*) of the first transport part 21 and the second transport part 22 are located at the predetermined positions for transport shown in FIG. 1.

As shown in FIG. 4, the cover part 24 in the present embodiment is provided such that the rack storing region 21*a* of the first transport part 21 is exposed over the entire length of the rack storing region 21*a* in the short-side direction B (Y direction). Consequently, a user can, in the long-side direction A (X direction), visually recognize and take out a specimen rack 2 stored on the first transport part 21 at any position in the rack storing region 21*a* of the first transport part 21.

For the rack storing region 22*a* of the second transport part 22, the cover part 24 is provided such that a portion of the rack storing region 22*a* in the short-side direction B (Y direction) is exposed. Consequently, a user can, from the X1 side, set a specimen rack 2 onto the second transport part 22 at any position in the region, of the rack storing region 22*a* of the second transport part 22, that is not covered by the cover part 24 and is exposed. Furthermore, the user can, from the X1 side, visually recognize the specimen rack 2 having been set. It is also easy to take out a specimen rack 2 having been set once, before the specimen rack 2 is transported.

Alternatively, for the rack storing region 21*a* of the first transport part 21, the cover part 24 may be provided such that a portion of the rack storing region 21*a* in the short-side direction B (Y direction) is exposed. Likewise, the cover part 24 may be provided such that the rack storing region 22*a* of the second transport part 22 is exposed over the entire length thereof <Structure for Taking Out or Setting Specimen Rack from Front Surface Side and from Above>

In addition, each of the first transport part 21, the second transport part 22, and the third transport part 23 extends along the front-rear direction (Y direction) of the measurement unit 10, has a front end portion (Y2-side end portion), and is configured to allow a specimen rack 2 to be set on or taken out from the front end portion.

That is, the cover part 24 is provided such that front end portions (Y2-direction-side end portions) of the rack storing region 21*a* of the first transport part 21 and the rack storing region 22*a* of the second transport part 22 are also exposed. In other words, the Y2 direction side of each of the rack storing regions 21*a* and 22*a* is not covered by the cover part 24 and is exposed. Consequently, a user can take out, to the Y2 direction side, a specimen rack 2 set on the front end portion of the first transport part 21. The user can set, from the Y2 direction side, a specimen rack 2 onto the front end portion of the second transport part 22.

Further, as shown in FIG. 4, the front end portion of the second transport part 22 is located on the rear side (in the Y1 direction) relative to the front end portion of the first transport part 21. The front end portion of the second transport part 22 is located at a position shifted from the front end portion of the first transport part 21 to the rear side by a distance D2. The front end portion of the second transport part 22 is shifted in the Y1 direction from the Y2-side end portion of the rack storing region 21*a* of the first transport part 21 by the distance of four specimen racks 2. The cover part 24 is provided such that, within a range in the front-rear direction (Y direction) between the front end portion of the first transport part 21 and the front end portion of the second transport part 22 (a range equivalent to the distance D2), an upper side relative to the first transport part 21 is uncovered and exposed.

Consequently, a space that is covered by neither the second transport part 22 nor the cover part 24 can be ensured above the front end portion of the first transport part 21. Therefore, even though the second transport part 22 is provided above the first transport part 21, a specimen rack 2 can be taken out upward from the front end portion of the first transport part 21, whereby workability in collecting a specimen rack 2 can be improved. In addition, the upper side relative to specimen racks 2 on the front end portion of the first transport part 21 is uncovered and exposed, whereby visibility at the time of checking the specimen racks 2 by a user is improved.

In the present embodiment, the front end portion of the third transport part 23 is located on the rear side (in the Y1 direction) relative to the front end portion of the second transport part 22. The front end portion of the third transport part 23 is located at a position shifted from the front end portion of the second transport part 22 to the rear side by a distance D1. The front end portion of the third transport part 23 is shifted in the Y1 direction from the Y2-side end portion of the rack storing region 22*a* of the second transport part 22 by the distance of five specimen racks 2. The cover part 24 is provided such that, within a range in the front-rear direction (Y direction) between the front end portion of the second transport part 22 and the front end portion of the third transport part 23 (a range equivalent to the distance D1), an upper side relative to the second transport part 22 is uncovered and exposed.

Consequently, a space that is not covered by the third transport part 23 can be ensured above the front end portion of the second transport part 22. Therefore, even though the third transport part 23 is provided above the second transport part 22, a specimen rack 2 can be set on the front end portion of the second transport part 22 from above, whereby workability in setting a specimen rack 2 can be improved. In addition, the upper side relative to specimen racks 2 on the front end portion of the second transport part 22 is uncovered and exposed, whereby visibility at the time of checking the specimen racks 2 by a user is improved.

The specimen transport unit 20 further includes a base part 25 supporting the first transport part 21 from below. The first transport part 21 is provided on the base part 25. The front end portion of the first transport part 21 protrudes from the base part 25 to the front side (Y2 side) in the front-rear direction. This makes it easy for a hand of a user to reach the front end portion of the first transport part 21, whereby work of collecting a specimen rack 2 from the front end portion of the first transport part 21 can be easily performed.

FIG. 5 is a schematic diagram in which the shapes of X-Z end surfaces in the Y direction of the specimen transport unit 20 at respective positions Qa, Qb, and Qc shown in FIG. 4 are compared. The position Qa is a position between the front end portion of the first transport part 21 and the front end portion of the second transport part 22. The position Qb is a position between the front end portion of the second transport part 22 and the front end portion of the third transport part 23. The position Qc is a position between the front end portion and a rear end portion of the third transport part 23.

Regarding the rack storing region 21*a* of the first transport part 21, at the position Qa, each of the X2 side, the X1 side, and the Z1 side of the rack storing region 21*a* is not covered by the cover part 24 and is exposed to outside. This is because the positions in the Y direction of the front end portions of the first transport part 21 and the second transport part 22 are shifted from each other. Consequently, a user can easily visually recognize specimen racks 2 set within the range equivalent to the distance of five racks on the front end portion of the first transport part 21 and take out the specimen racks 2 in an arbitrarily-determined direction.

At the position Qb and the position Qc, the cover part 24 is provided such that, in the rack storing region 21*a* of the first transport part 21, one side surface on the measurement unit 10 side (the side surface 21*d* on the X2 side) out of the side surfaces of the first transport part 21 is covered and another side surface on an opposite side to the measurement unit 10 (the side surface 21*c* on the X1 side) out of the side surfaces of the first transport part 21 is exposed. Consequently, a user can, from the X1 side, visually recognize and take out a specimen rack 2 stored on the first transport part 21. Meanwhile, the measurement unit 10 is disposed so as to be adjacent to the X2 side of the rack storing region 21*a*, and thus a specimen rack 2 is not taken out or set from the X2 side of the rack storing region 21*a*. Therefore, the side from which a specimen rack 2 is taken out or set with respect to the rack storing region 21*a* is limited to one side (X1 side), and the side surface 21*d* on the measurement unit 10 side (X2 side) is purposely covered by the cover part 24, whereby a structure for supporting the second transport part 22 on the upper side can be provided in the cover part 24 at the side surface 21*d* side.

Regarding the rack storing region 22*a* of the second transport part 22, at the position Qb, each of the X2 side, the X1 side, and the Z1 side of the rack storing region 22*a* is not covered by the cover part 24 and is exposed to outside. This is because the positions in the Y direction of the front end portions of the second transport part 22 and the third transport part 23 are shifted from each other. Consequently, a user can easily visually recognize specimen racks 2 set within the range equivalent to the distance of five racks on the front end portion of the second transport part 22 and take out the specimen racks 2 in an arbitrarily-determined direction.

At the position Qc, the cover part 24 is provided such that, in the rack storing region 22*a* of the second transport part 22, one side surface on the measurement unit 10 side (the side surface 22*d* on the X2 side) out of the side surfaces of the second transport part 22 is covered and another side surface on the opposite side to the measurement unit 10 (the side surface 22*c* on the X1 side) out of the side surfaces of the second transport part 22 is exposed. Consequently, a user can take out or set a specimen rack 2 with respect to the second transport part 22 from the X1 side. Meanwhile, the measurement unit 10 is disposed so as to be adjacent to the X2 side of the rack storing region 22*a*, and thus a specimen rack 2 is not taken out or set from the X2 side of the rack storing region 22*a*. Therefore, the side from which a specimen rack 2 is taken out or set with respect to the rack storing region 22*a* is limited to one side (X1 side), and the side surface 22*d* on the measurement unit 10 side (X2 side) is purposely covered by the cover part 24, whereby a structure for supporting the third transport part 23 on the upper side can be provided in the cover part 24 at the side surface 22*d* side.

As described above, in the rack storing region 21*a* of the first transport part 21 and the rack storing region 22*a* of the second transport part 22, at least the side surfaces 21*c* and 22*c* on the X1 side are respectively exposed substantially over the entire lengths thereof in the Y direction. Therefore, each of the first transport part 21 and the second transport part 22 allows a specimen rack 2 to be taken out therefrom or set thereon in the long-side direction A (see FIG. 2) of the specimen rack 2 in the state where the respective placement surfaces (21*b*, 22*b*) of the first transport part 21 and the second transport part 22 are located at the predetermined positions for transport shown in FIG. 1. Consequently, it is possible to, without moving the placement surfaces (21*b*, 22*b*), additionally set a specimen rack 2 that has not been subjected to specimen suction and collect a specimen rack 2 that has been subjected to specimen suction. In addition, each of the first transport part 21 and the second transport part 22 allows a specimen rack 2 to be taken out therefrom or set thereon in the long-side direction A of the specimen rack 2 regardless of whether or not the specimen transport unit 20 is being operated. Consequently, it is possible to, while continuously performing an operation of transporting a specimen rack 2 to the measurement unit 10 by the specimen transport unit 20 or measuring a specimen by the measurement unit 10, additionally set a specimen rack 2 that has not been subjected to specimen suction and collect a specimen rack 2 that has been subjected to specimen suction.

When a specimen rack 2 cannot be taken out or set during operation of the specimen transport unit 20, the following necessity arises, for example. That is, after specimen racks 2 to be subjected to measurement are set on the second transport part 22 and are subjected to measurement, and all of the specimen racks 2 are collected on the first transport part 21, measurement by the specimen measurement apparatus 300 needs to be stopped, work of taking out the specimen racks 2 from the first transport part 21 and work of setting next specimen racks 2 onto the second transport part 22 need to be performed, and measurement needs to be restarted after each work is finished. Meanwhile, in the present embodiment, specimen racks 2 can be additionally set and taken out during operation of the specimen transport unit 20. Consequently, specimen racks 2, the number of which is larger than the maximum number of specimen racks 2 that can be set on the second transport part 22, can be continuously subjected to measurement processing without stopping measurement being performed by the specimen measurement apparatus 300.

As described later, the third transport part 23 employs a configuration in which the placement base 23*b* for allowing a specimen rack 2 to be set thereon is supported in a cantilever configuration from the X2 side. Thus, the upper side of the rack storing region 22*a* of the second transport part 22 is, at positions thereof other than the position above which the placement base 23*b* is disposed, not covered by the third transport part 23 (see FIG. 3). Consequently, a user can also easily visually recognize a specimen rack 2 set on the rear side (Y1 side) relative to the end of the distance of five racks on the front end portion of the second transport part 22 and take out the specimen rack 2 in an arbitrarily-determined direction. Meanwhile, when a user sets a specimen rack 2 onto the third transport part 23, the user might accidentally drop the specimen rack 2. To prevent this, a partition plate extending in the horizontal direction may be provided between the third transport part 23 and the second transport part 22.

(Internal Structure of Specimen Transport Unit)

Figure 6:
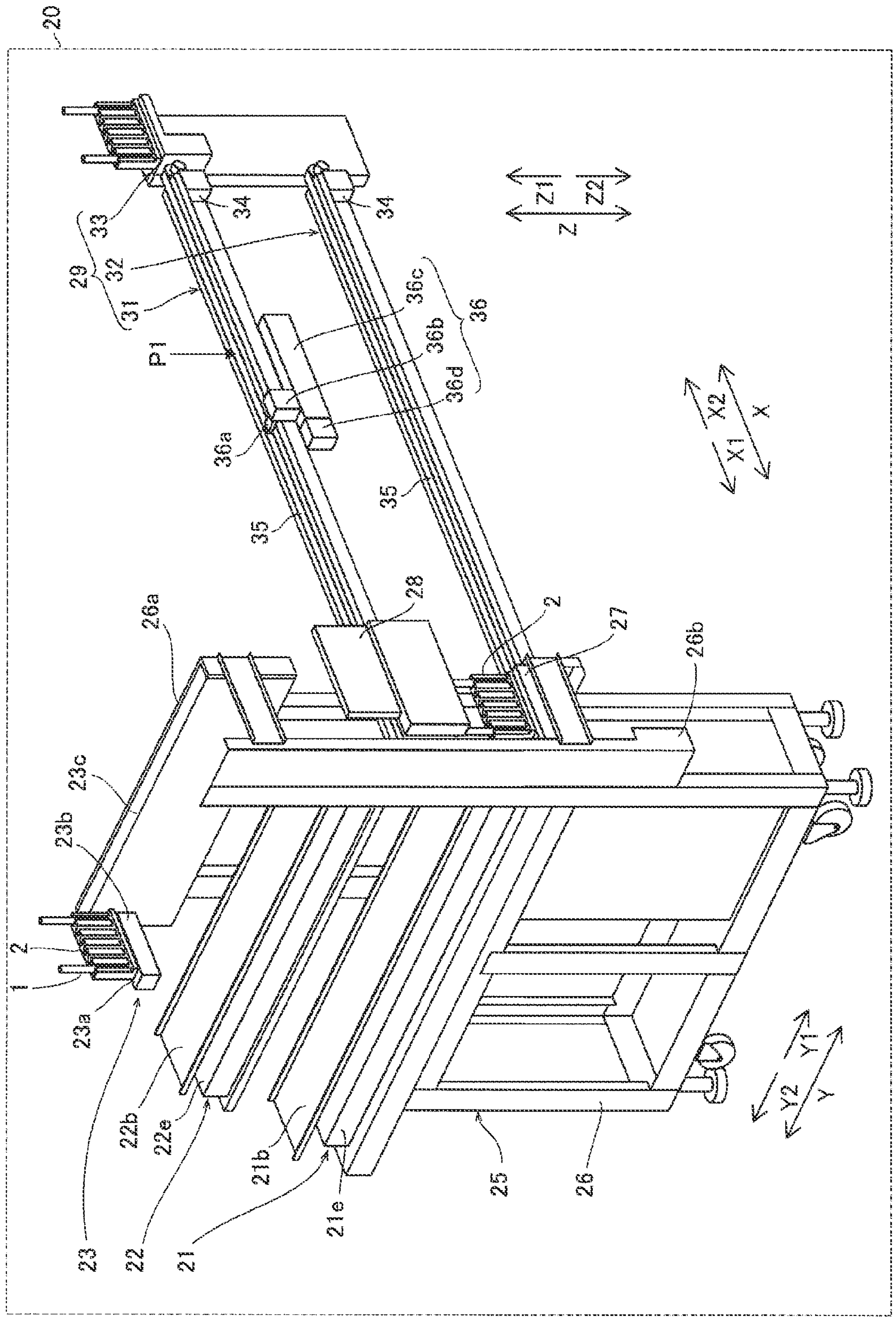
FIG. 6 is a perspective view for explaining the internal structure of the specimen transport unit.

FIG. 6 schematically shows an internal structure obtained by removing the cover part 24 from the specimen transport unit 20. Each of the first transport part 21, the second transport part 22, and the third transport part 23 is mounted on a chassis 26. The base part 25 corresponds to the lower side of the chassis 26.

The first transport part 21 (rack collection part) includes: the first placement surface 21*b* which allows a plurality of specimen racks 2 to be placed thereon; and a movement mechanism 21*e* which is accommodated on the lower surface side relative to the first placement surface 21*b* and which moves the specimen racks 2 on the first placement surface 21*b*. A user can set a specimen rack 2 at any position on the first placement surface 21*b*. Likewise, the second transport part 22 (rack setting part) includes: the second placement surface 22*b* which allows a plurality of specimen racks 2 to be placed thereon; and a movement mechanism 22*e* which is accommodated on the lower surface side relative to the second placement surface 22*b* and which moves the specimen racks 2 on the second placement surface 22*b*. A user can take out a specimen rack 2 from any position on the second placement surface 22*b*. The third transport part 23 (interruption specimen setting part) includes: the placement base 23*b* which allows a specimen rack 2 to be placed thereon; and a placement base movement mechanism 23*c* which supports the placement base 23*b* in a cantilever configuration from a lateral side and moves the placement base 23*b*. With these configurations, the three work positions for setting and collecting specimen racks 2 (the setting position for an urgent specimen, the setting position for an ordinary specimen, and the take-out position for a post-measurement specimen rack) can be set to coincide with one another, whereby load of a user's work regarding setting and collection of the specimen racks 2 can be effectively mitigated.

In addition, the specimen transport unit 20 further includes the first lifting/lowering part 27, a reading part 28, and the transport mechanism 29.

The first lifting/lowering part 27 is provided at a rear end portion (end portion in the Y1 direction) of the chassis 26. The first lifting/lowering part 27 is configured to move in the up-down direction between the first transport part 21, the second transport part 22, the third transport part 23, and a first transport path 31 and a second transport path 32 (described later) of the transport mechanism 29 and relay a specimen rack 2. That is, the first lifting/lowering part 27 receives a specimen rack 2 from each of the second transport part 22 and the third transport part 23 and relays the received specimen rack 2 to the transport mechanism 29. The first lifting/lowering part 27 receives a specimen rack 2 having been subjected to specimen suction from the transport mechanism 29 and relays the received specimen rack 2 to the first transport part 21.

Consequently, the specimen rack 2 can be relayed by moving the first lifting/lowering part 27 upward/downward with respect to each of the first transport part 21, the second transport part 22, and the third transport part 23 disposed at different height positions.

The specimen transport unit 20 includes one first lifting/lowering part 27. The one first lifting/lowering part 27 is configured to be movable to: a relay position for each of the first transport part 21, the second transport part 22, and the third transport part 23; a reading position of the reading part 28; and a relay position for each of the first transport path 31 and the second transport path 32 (described later) of the transport mechanism 29.

The reading part 28 is configured to read identification information about a specimen rack 2 and specimen containers 1 thereon. The reading part 28 is an optical reader that reads identification information from each of the barcode label 2*d* on the specimen rack 2 and the barcode label 1*b* on the specimen container 1 (see FIG. 2).

The reading part 28 is provided at a position adjacent, on the Y1 direction side, to a movement region of the first lifting/lowering part 27. When receiving a specimen rack 2 from the second transport part 22 or the third transport part 23, the first lifting/lowering part 27 moves in the Z direction and positions the received specimen rack 2 at the reading position of the reading part 28. Consequently, the reading part 28 reads identification information about each of the specimen rack 2 and specimen containers 1 thereon.

The transport mechanism 29 is configured to receive the specimen rack 2 from the first lifting/lowering part 27, transport the specimen rack 2 to a specimen suction position P1, and transport the specimen rack 2 having been subjected to specimen suction to the first lifting/lowering part 27. The transport mechanism 29 is adjacent, on the X2 side, to the movement region of the first lifting/lowering part 27 and extends in the X2 direction. That is, the transport mechanism 29 is provided so as to be adjacent to the rear surface 10*b* of the measurement unit 10 (see FIG. 1) and so as to extend in the X direction along the rear surface 10*b*.

The transport mechanism 29 includes the first transport path 31 adjacent to the movement region of the first lifting/lowering part 27. The transport mechanism 29 includes the second transport path 32 disposed below the first transport path 31 and adjacent to the movement region of the first lifting/lowering part 27. The transport mechanism 29 includes a second lifting/lowering part 33 which moves in the up-down direction and which relays a specimen rack 2 between the first transport path 31 and the second transport path 32.

In the present embodiment, each of the first transport path 31 and the second transport path 32 extends in the X direction. Each of the first transport path 31 and the second transport path 32 includes: a drive part 34; and a transport belt 35 moved in a circulating manner by the drive part 34. The drive part 34 is, for example, a stepping motor. Each of the first transport path 31 and the second transport path 32 is configured to move the transport belt 35 thereof in a circulating manner so as to transport, in the X direction, a specimen rack 2 set on the upper surface of the transport belt 35. Each of the first transport path 31 and the second transport path 32 has: an X1-side end portion at which a specimen rack 2 can be relayed between said transport path and the first lifting/lowering part 27; and an X2-side end portion at which the specimen rack 2 can be relayed between said transport path and the second lifting/lowering part 33. The second lifting/lowering part 33 has a configuration equivalent to that of the first lifting/lowering part 27 and can relay the specimen rack 2 between the second lifting/lowering part 33 and each of the first transport path 31 and the second transport path 32.

Consequently, the first lifting/lowering part 27 and the transport mechanism 29 enable a specimen rack 2 to be transported from each of the second transport part 22 and the third transport part 23 to the specimen suction position P1 and enable a specimen rack 2 having been subjected to specimen suction to be transported to the first transport part 21. Therefore, the first transport part 21, the second transport part 22, and the third transport part 23 do not need to be separately provided with respective transport mechanisms 29, whereby the device configuration can be simplified, and the device can be downsized.

The specimen suction position P1 for suction by the measurement unit 10 is set on the first transport path 31. Therefore, the transport mechanism 29 transports, to the specimen suction position P1 on the first transport path 31, a specimen rack 2 relayed from the first lifting/lowering part 27 to the first transport path 31.

The transport mechanism 29 includes the laterally-sending mechanism 36 which is engaged with a specimen rack 2 transported to the specimen suction position P1 on the first transport path 31 and which moves the engaged specimen rack 2 in the X direction. The laterally-sending mechanism 36 includes: the engagement piece 36*a* to be engaged with the specimen rack 2; an engagement switching part 36*b* which causes the engagement piece 36*a* to advance to or retract from a position for engagement with the specimen rack 2 on the first transport path 31 and a position for disengagement from said specimen rack 2; a linear motion mechanism 36*c* which moves the engagement switching part 36*b* in the X direction; and a drive part 36*d* which drives the linear motion mechanism 36*c*. The drive part 36*d* is, for example, a stepping motor. The laterally-sending mechanism 36 causes the engagement piece 36*a* to be engaged with the engagement groove 2*e* of the specimen rack 2 on the first transport path 31 and moves the specimen rack 2 such that the plurality of holding holes 2*c* (see FIG. 2) of the specimen rack 2 are positioned at the specimen suction position P1 one by one. Consequently, the laterally-sending mechanism 36 sequentially moves the plurality of specimen containers 1 held in the respective holding holes 2*c* of the specimen rack 2 to the specimen suction position P1 one by one, whereby a specimen is suctioned therefrom by the measurement unit 10.

During engagement with the laterally-sending mechanism 36, the specimen rack 2 is not moved by the transport belt 35 of the first transport path 31. Therefore, while the laterally-sending mechanism 36 is holding the first specimen rack 2 at the specimen suction position P1, the first transport path 31 can receive the second and subsequent specimen racks 2 from the first lifting/lowering part 27 and transport the specimen racks 2 to the nearer side (X1 side) relative to the specimen suction position P1.

When specimens have been suctioned from all the specimen containers 1, the laterally-sending mechanism 36 disengages the engagement piece 36*a* from the specimen rack 2. The transport mechanism 29 relays the specimen rack 2 having been subjected to specimen suction from the first transport path 31 to the second lifting/lowering part 33, relays the specimen rack 2 from the second lifting/lowering part 33 to the second transport path 32, and relays the specimen rack 2 from the second transport path 32 to the first lifting/lowering part 27.

(Detailed Configuration of Each Part of Specimen Transport Unit)

Next, the configuration of each part of the specimen transport unit 20 will be described in detail.

<Second Transport Part (Rack Setting Part)>

Figure 7:
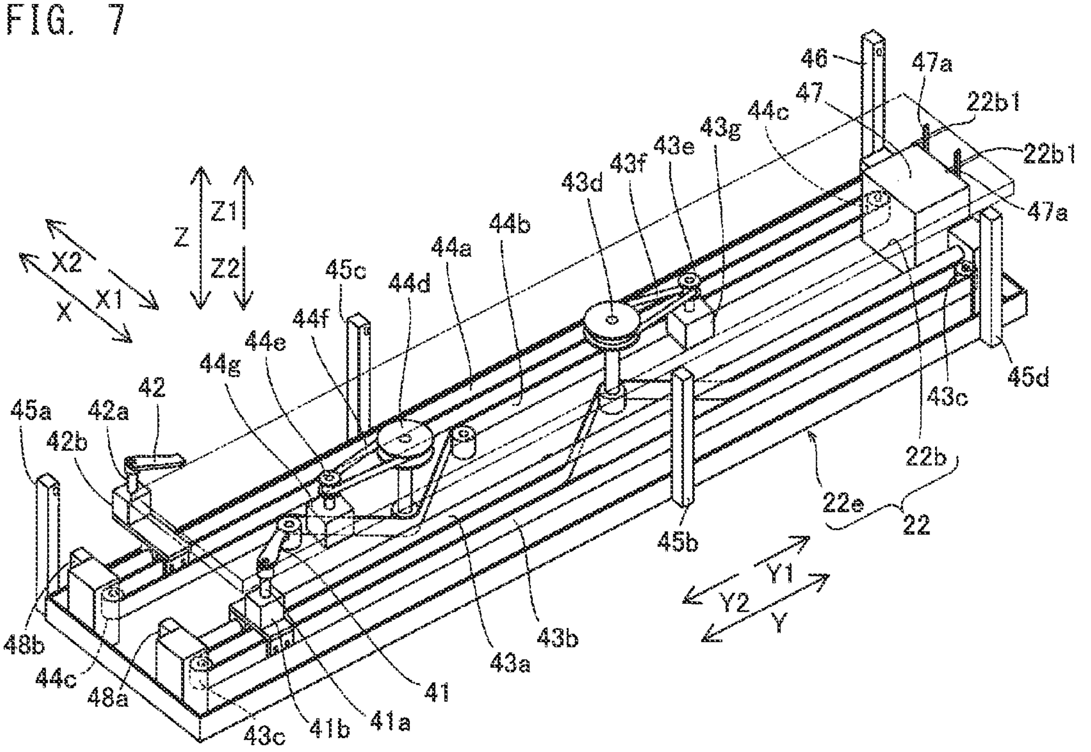
FIG. 7 is a perspective view for explaining a second transport part.

As shown in FIG. 7, as described above, the second transport part 22 includes: the second placement surface 22*b*; and the movement mechanism 22*e* accommodated on the lower surface side relative to the second placement surface 22*b*. The second placement surface 22*b* is formed of a flat-sheet member extending in the Y direction. In FIG. 7, the second placement surface 22*b* is indicated by an alternate long and two short dashes line, whereby the structure of the movement mechanism 22*e* on the lower surface side relative to the second placement surface 22*b* is shown.

The movement mechanism 22*e* includes a one-side claw 41 and an other-side claw 42 and is configured to bring the one-side claw 41 and the other-side claw 42 into contact with a specimen rack 2 and move these claws in the Y direction, to move the specimen rack 2 on the second placement surface 22*b* in the Y1 direction. The one-side claw 41 and the other-side claw 42 are respectively disposed on the X1 side and the X2 side above the second placement surface 22*b*.

The one-side claw 41 is attached to a rotation shaft 41*a* extending upward/downward from the X1 side of the second placement surface 22*b*. The rotation shaft 41*a* is held by a slider 41*b* provided below the second placement surface 22*b*.

The movement mechanism 22*e* includes, as a mechanism for driving the one-side claw 41, a guide shaft 43*a*, a first belt 43*b*, two driven pulleys 43*c*, a transmission shaft 43*d*, a drive pulley 43*e*, a second belt 43*f*, and a claw drive part 43*g*.

The slider 41*b* is movably attached to the guide shaft 43*a* and fixed at a predetermined position on the first belt 43*b*. The guide shaft 43*a* extends in the Y direction from the front end portion on the Y2 side to a rear end portion on the Y1 side of the second transport part 22. The first belt 43*b* is extended onto the two driven pulleys 43*c* and a pulley at one end portion of the transmission shaft 43*d*.

The second belt 43*f* is extended onto the drive pulley 43*e* and a pulley at the other end portion of the transmission shaft 43*d*. The claw drive part 43*g* rotates the drive pulley 43*e* connected to an output shaft. The claw drive part 43*g* is, for example, a stepping motor. The rotation of the drive pulley 43*e* causes rotation of the transmission shaft 43*d* via the second belt 43*f*. The rotation of the transmission shaft 43*d* causes circulating rotation of the first belt 43*b*. The circulating rotation of the first belt 43*b* cause the slider 41*b* provided with the one-side claw 41 to move in the Y1 direction and the Y2 direction along the guide shaft 43*a*.

Therefore, the one-side claw 41 can be moved in the Y1 direction and the Y2 direction along the guide shaft 43*a* through circulating rotation of the first belt 43*b* caused by the claw drive part 43*g*.

The configuration of the other-side claw 42 is the same as that of the above one-side claw 41. That is, the other-side claw 42 is attached to a rotation shaft 42*a* extending upward/downward from the X2 side of the second placement surface 22*b*. The rotation shaft 42*a* is held by a slider 42*b* provided below the second placement surface 22*b*.

The configuration of a mechanism for driving the other-side claw 42 is the same as that of the mechanism for driving the above one-side claw 41. The movement mechanism 22*e* includes, as the mechanism for driving the other-side claw 42, a guide shaft 44*a*, a first belt 44*b*, two driven pulleys 44*c*, a transmission shaft 44*d*, a drive pulley 44*e*, a second belt 44*f*, and a claw drive part 44*g*.

In the same manner as the one-side claw 41, the other-side claw 42 can be moved in the Y1 direction and the Y2 direction along the guide shaft 44*a* through circulating rotation of the first belt 44*b* caused by the claw drive part 44*g*.

When the one-side claw 41 and the other-side claw 42 are moved in the Y1 direction from the front end portion on the Y2 side, the one-side claw 41 and the other-side claw 42 are respectively engaged with the X1 side and the X2 side of a specimen rack 2 and move the specimen rack 2 in the Y1 direction.

Meanwhile, when the one-side claw 41 and the other-side claw 42 are moved in the Y2 direction from the rear end portion on the Y1 side, the one-side claw 41 and the other-side claw 42 receive, upon contact with a specimen rack 2, reaction force from the specimen rack 2 so as to be rotated to angular positions at which the claws are not engaged with the specimen rack 2. Consequently, the claws are moved in the Y2 direction without moving the specimen rack 2.

Consequently, the movement mechanism 22*e* can move the specimen rack 2 set on the second placement surface 22*b* of the second transport part 22 toward the rear end portion on the Y1 direction side and relay the specimen rack 2 to the first lifting/lowering part 27 adjacent to the Y1 direction side of the second transport part 22. The movement mechanism 22*e* includes origin sensors 48*a* and 48*b* for detecting respective origin positions of the one-side claw 41 and the other-side claw 42. The origin positions are set on the end portion in the Y2 direction of the second transport part 22.

The second transport part 22 is provided with: rack presence/absence sensors 45*a*, 45*b*, 45*c*, and 45*d* for performing detection as to whether or not there is a specimen rack 2 set on the second placement surface 22*b*; and a rear-end sensor 46 for performing detection as to whether or not there is a specimen rack 2 at a portion (rear end portion) immediately in front of the relay position for a specimen rack 2. The rack presence/absence sensors 45*a* and 45*b* are a light emitter and a light receiver of a transmission-type optical sensor, and transmit and receive detection light that obliquely crosses the space above half the second placement surface 22*b* on the Y2 side. Likewise, the rack presence/absence sensors 45*c* and 45*d* are a light emitter and a light receiver of a transmission-type optical sensor, and transmit and receive detection light that obliquely crosses the space above half the second placement surface 22*b* on the Y1 side. The rack presence/absence sensors 45*a*, 45*b*, 45*c*, and 45*d* perform detection as to whether or not there is a specimen rack 2, regardless of the position at which the specimen rack 2 has been set on the second placement surface 22*b*. The rear-end sensor 46 is a reflection-type optical sensor and is disposed on the rear end portion (Y1-side end portion) of the second placement surface 22*b*.

When the rack presence/absence sensors 45*a* to 45*d* detect a specimen rack 2, the second transport part 22 moves, under the control of the controller 211 described later, the specimen rack 2 in the Y1 direction toward the first lifting/ lowering part 27 present at the relay position for the second transport part 22 by the movement mechanism 22*e*.

The rear end portion of the second transport part 22 is provided with a rack returning mechanism 47. Regarding a specimen rack 2 remaining on the second transport part 22 without being relayed to the first lifting/lowering part 27, the rack returning mechanism 47 has a function of returning the specimen rack 2 in the Y2 direction by a predetermined safety distance from the rear end portion of the second transport part 22.

The rack returning mechanism 47 includes a pair of claws 47*a* which are engaged with a specimen rack 2 and which move the specimen rack 2. When the movement mechanism 22*e* sends out a specimen rack 2 to the first lifting/lowering part 27, the rack returning mechanism 47 causes the pair of claws 47*a* to retract downward of the second placement surface 22*b*. After the specimen rack 2 is relayed from the movement mechanism 22*e* to the first lifting/lowering part 27, the rack returning mechanism 47 performs a retraction operation of returning a specimen rack 2 present on the rear end portion of the second transport part 22 in the Y2 direction. Specifically, the rack returning mechanism 47 causes the pair of claws 47*a* to protrude upward of the second placement surface 22*b* from below the second placement surface 22*b* through cuts 22*b*1 formed in the rear end portion of the second placement surface 22*b* and moves the pair of claws 47*a* to the Y2 direction side, to return the specimen rack 2 present on the rear end portion of the second transport part 22 in the Y2 direction. Consequently, the specimen rack 2 remaining on the second transport part 22 retracts to the Y2 side to a position at which the specimen rack 2 is detected by the rear-end sensor 46, whereby the specimen rack 2 can be prevented from falling off from the rear end portion.

<First Transport Part (Rack Collection Part)>

Figure 8:
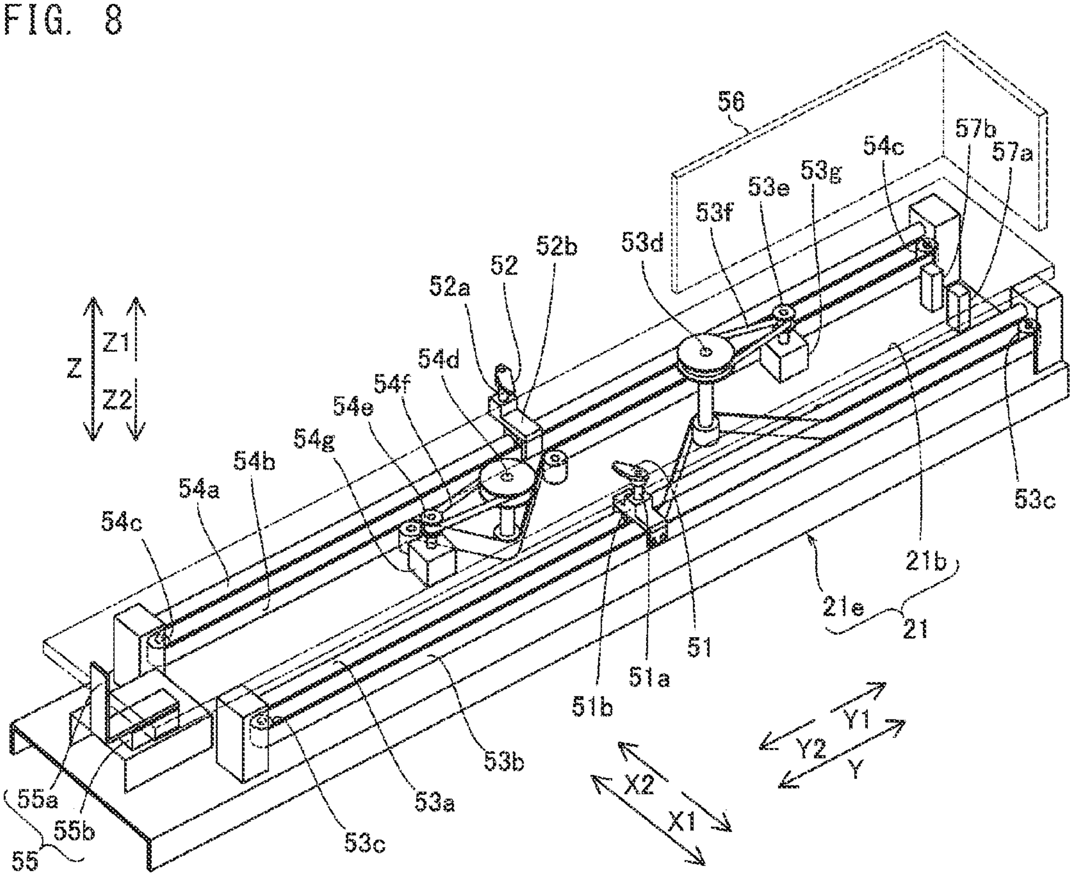
FIG. 8 is a perspective view for explaining a first transport part.

As shown in FIG. 8, as described above, the first transport part 21 includes: the first placement surface 21*b*; and the movement mechanism 21*e* accommodated on the lower surface side relative to the first placement surface 21*b*. The first placement surface 21*b* is formed of a flat-sheet member extending in the Y direction. In FIG. 8, the first placement surface 21*b* is indicated by an alternate long and two short dashes line, whereby the structure of the movement mechanism 21*e* on the lower surface side relative to the first placement surface 21*b* is shown.

The movement mechanism 21*e* includes a one-side claw 51 and an other-side claw 52 and is configured to engage the one-side claw 51 and the other-side claw 52 with a specimen rack 2 and move these claws in the Y direction, to move the specimen rack 2 on the first placement surface 21*b* in the Y2 direction. The one-side claw 51 and the other-side claw 52 are respectively disposed on the X1 side and the X2 side above the first placement surface 21*b*.

The one-side claw 51 is attached to a rotation shaft 51*a* extending upward/downward from the X1 side of the first placement surface 21*b*. The rotation shaft 51*a* is held by a slider 51*b* provided below the first placement surface 21*b*.

The movement mechanism 21*e* includes, as a mechanism for driving the one-side claw 51, a guide shaft 53*a*, a first belt 53*b*, two driven pulleys 53*c*, a transmission shaft 53*d*, a drive pulley 53*e*, a second belt 53*f*, and a claw drive part 53*g*.

The slider 51*b* is movably attached to the guide shaft 53*a* and fixed at a predetermined position on the first belt 53*b*. The guide shaft 53*a* extends in the Y direction from the front end portion on the Y2 side to a rear end portion on the Y1 side of the first transport part 21. The first belt 53*b* is extended onto the two driven pulleys 53*c* and a pulley at one end portion of the transmission shaft 53*d*.

The second belt 53*f* is extended onto the drive pulley 53*e* and a pulley at the other end portion of the transmission shaft 53*d*. The claw drive part 53*g* rotates the drive pulley 53*e* connected to an output shaft. The claw drive part 53*g* is, for example, a stepping motor. The rotation of the drive pulley 53*e* causes rotation of the transmission shaft 53*d* via the second belt 53*f*. The rotation of the transmission shaft 53*d* causes circulating rotation of the first belt 53*b*. The circulating rotation of the first belt 53*b* cause the slider 51*b* provided with the one-side claw 51 to move in the Y1 direction and the Y2 direction along the guide shaft 53*a*.

Therefore, the one-side claw 51 can be moved in the Y1 direction and the Y2 direction along the guide shaft 53*a* through circulating rotation of the first belt 53*b* caused by the claw drive part 53*g*.

The configuration of the other-side claw 52 is the same as that of the above one-side claw 51. That is, the other-side claw 52 is attached to a rotation shaft 52*a* extending upward/downward from the X2 side of the first placement surface 21*b*. The rotation shaft 52*a* is held by a slider 52*b* provided below the first placement surface 21*b*.

The configuration of a mechanism for driving the other-side claw 52 is the same as that of the mechanism for driving the above one-side claw 51. The movement mechanism 21*e* includes, as the mechanism for driving the other-side claw 52, a guide shaft 54*a*, a first belt 54*b*, two driven pulleys 54*c*, a transmission shaft 54*d*, a drive pulley 54*e*, a second belt 54*f*, and a claw drive part 54*g*.

In the same manner as the one-side claw 51, the other-side claw 52 can be moved in the Y1 direction and the Y2 direction along the guide shaft 54*a* through circulating rotation of the first belt 54*b* caused by the claw drive part 54*g*.

When the one-side claw 51 and the other-side claw 52 are moved in the Y2 direction from the rear end portion on the Y1 side, the one-side claw 51 and the other-side claw 52 are respectively engaged with the X1 side and the X2 side of a specimen rack 2 and move the specimen rack 2 in the Y2 direction.

Meanwhile, when the one-side claw 51 and the other-side claw 52 are moved in the Y1 direction from the front end portion on the Y2 side, the one-side claw 51 and the other-side claw 52 receive, upon contact with a specimen rack 2, reaction force from the specimen rack 2 so as to be rotated to angular positions at which the claws are not engaged with the specimen rack 2. Consequently, the claws are moved in the Y1 direction without moving the specimen rack 2.

Consequently, the movement mechanism 21*e* can move the specimen rack 2 set on the first placement surface 21*b* of the first transport part 21 toward the front end portion on the Y2 direction side. The rear end portion of the first transport part 21 is provided with origin sensors 57*a* and 57*b* for detecting origin positions, of the one-side claw 51 and the other-side claw 52, from which the specimen rack 2 is moved toward the front end portion on the Y2 direction side.

The first transport part 21 is provided with an arrival detector 55 for detecting that the specimen rack 2 set on the first placement surface 21*b* has arrived at the front end portion of the first placement surface 21*b*. The arrival detector 55 includes: a contact member 55*a* with which the specimen rack 2 having arrived at the front end portion of the first placement surface 21*b* is brought into contact; and a contact sensor 55*b* which detects movement of the contact member 55*a*. The contact member 55*a* is adjacent, on the front surface side (Y2 side), to the front end portion of the first placement surface 21*b* and protrudes upward of the first placement surface 21*b*. When the specimen rack 2 moved in the Y2 direction by the movement mechanism 21*e* has arrived at the front end portion of the first placement surface 21*b*, the contact member 55*a* is pushed in the Y2 direction by the specimen rack 2. The contact sensor 55*b* detects that the contact member 55*a* has been pushed in the Y2 direction.

Figure 9:
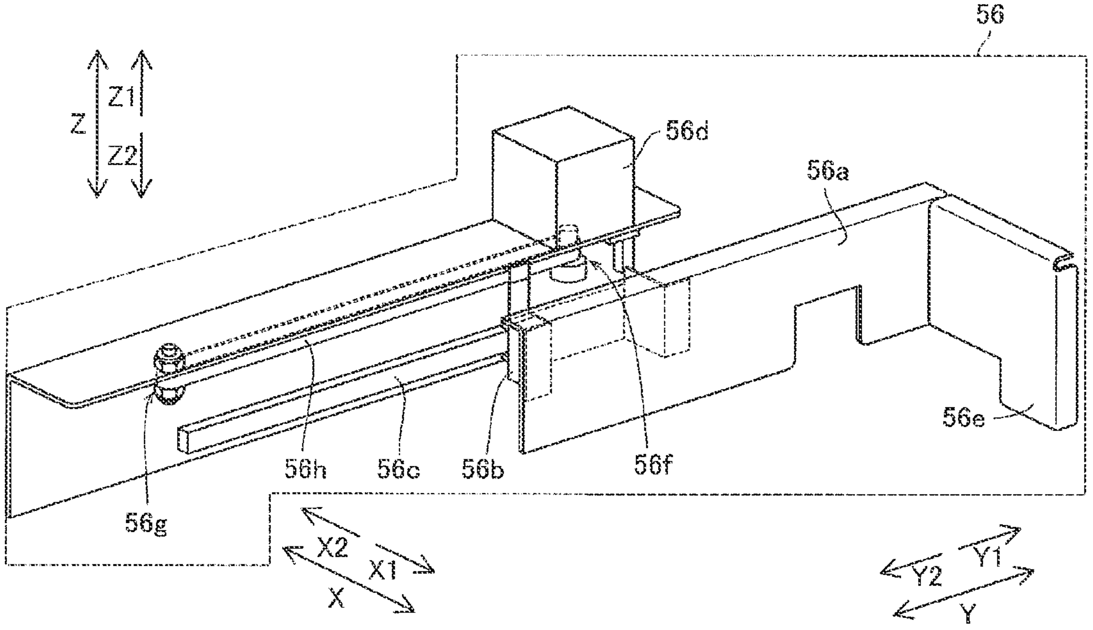
FIG. 9 is a perspective view for explaining a sending mechanism.

The first transport part 21 is provided with a sending mechanism 56 which sends a specimen rack 2 on the first lifting/lowering part 27 to the first transport part 21. As shown in FIG. 9, the sending mechanism 56 includes: an actuation plate 56*a* attached to a slider 56*b*; a guide rail 56*c* by which the slider 56*b* is supported so as to be movable in the Y direction; a collection drive part 56*d* which moves the slider 56*b* in the Y direction; and a transmission mechanism. The actuation plate 56*a* is formed in an L shape so as to be bent to the rear side (Y1 side) relative to the movement region of the first lifting/lowering part 27 while avoiding the movement region. An engagement portion 56*e* on an end side of the actuation plate 56*a* can be brought into contact with the specimen rack 2 set on the first lifting/lowering part 27 and push out the specimen rack 2 in the Y2 direction.

The transmission mechanism includes: pulleys 56*f* and 56*g* arranged in the Y direction; and a drive belt 56*h* extended onto the pulleys 56*f* and 56*g*. The collection drive part 56*d* rotates the pulley 56*f*, to cause circulating rotation of the drive belt 56*h*. The slider 56*b* is connected to a portion of the drive belt 56*h* and moved in the Y direction along the guide rail 56*c* in association with the circulating rotation of the drive belt 56*h*. Consequently, in a state where the first lifting/lowering part 27 is disposed at the relay position for the first transport part 21, the sending mechanism 56 moves the actuation plate 56*a* in the Y2 direction by the collection drive part 56*d*. Thus, the sending mechanism 56 pushes out, by the actuation plate 56*a*, a specimen rack 2 held by the first lifting/lowering part 27 in the Y2 direction to move the specimen rack 2 onto the first placement surface 21*b* of the first transport part 21.

Under the control of the controller 211 (see FIG. 34) described later, when the first lifting/lowering part 27 holding a specimen rack 2 is disposed at the relay position for the first transport part 21, the first transport part 21 performs a sending operation of sending the specimen rack 2 by the sending mechanism 56 and, after performing the sending operation, performs a movement operation of moving the specimen rack 2 in the Y2 direction toward the front end portion by the movement mechanism 21*e*.

The movement operation is performed until the arrival detector 55 detects that the specimen rack 2 has arrived at the front end portion of the rack storing region 21*a*. When a plurality of specimen racks 2 are present on the first placement surface 21*b*, all the specimen racks 2 on the first placement surface 21*b* are moved together, and the movement operation is ended upon contact, with the contact member 55*a*, of the specimen rack 2 located at the head on the Y2 side. Thus, the distance over which the one-side claw 51 and the other-side claw 52 move in the Y2 direction from the origin positions thereof to the end position of the movement operation varies according to the number of specimen racks 2 present on the first placement surface 21*b*. A smaller number of specimen racks 2 present on the first placement surface 21*b* leads to a longer distance over which the one-side claw 51 and the other-side claw 52 move. Meanwhile, a larger number of specimen racks 2 present on the first placement surface 21*b* leads to a shorter distance over which the one-side claw 51 and the other-side claw 52 move.

Therefore, the controller 211 can obtain the number of specimen racks 2 stored on the first transport part 21, on the basis of the distance over which the one-side claw 51 and the other-side claw 52 have moved during the movement operation, i.e., the amount of drive by the claw drive part 53*g* and the claw drive part 54*g*.

<Third Transport Part (Interruption Specimen Setting Part)>

Figure 10:
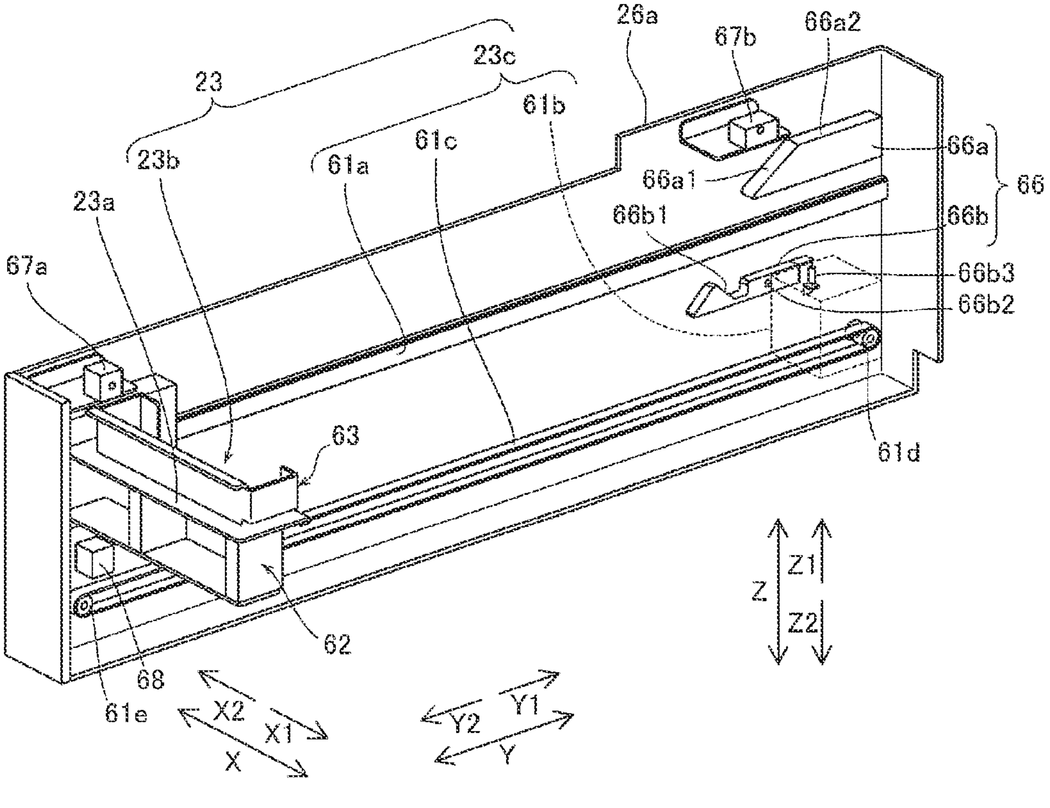
FIG. 10 is a perspective view for explaining a third transport part.

As shown in FIG. 10, as described above, the third transport part 23 includes: the placement base 23*b* which allows a specimen rack 2 to be placed thereon; and the placement base movement mechanism 23*c* which supports the placement base 23*b* in a cantilever configuration from the lateral side and moves the placement base 23*b*.

The placement base movement mechanism 23*c* includes a guide rail 61*a*, a placement base drive part 61*b*, and a transmission part. The guide rail 61*a*, the placement base drive part 61*b*, and the transmission part are attached to a side surface member 26*a* on the X2 side of the chassis 26 (see FIG. 6). The guide rail 61*a* extends along the Y direction. The placement base drive part 61*b* is, for example, a stepping motor. The transmission part is a belt-pulley mechanism composed of a belt 61*c* and pulleys 61*d* and 61*e*. The placement base drive part 61*b* rotationally drives the pulley 61*d*, to move the belt 61*c* in a circulating manner.

The placement base 23*b* includes, as separate parts, a table part 62 and an arm part 63 each configured to be movable in the Y direction. The table part 62 includes a slider 62*a* (see FIG. 11) movably engaged with the guide rail 61*a*. The arm part 63 includes a slider 65*a* (see FIG. 12) movably engaged with the guide rail 61*a*. Thus, the placement base 23*b* (the table part 62 and the arm part 63) is supported in a cantilever configuration from the X2 side by the side surface member 26*a* via the guide rail 61*a*. The chassis 26 is not provided on the X1 side of the placement base 23*b*, and the X1 side of the placement base 23*b* is a free end.

Out of the table part 62 and the arm part 63, the arm part 63 is connected to a predetermined portion of the belt 61*c* and moved in the Y direction by the placement base drive part 61*b*, and the table part 62 is not connected to the belt 61*c* and is engaged with the arm part 63 so as to be movable together with the arm part 63.

Figure 11:
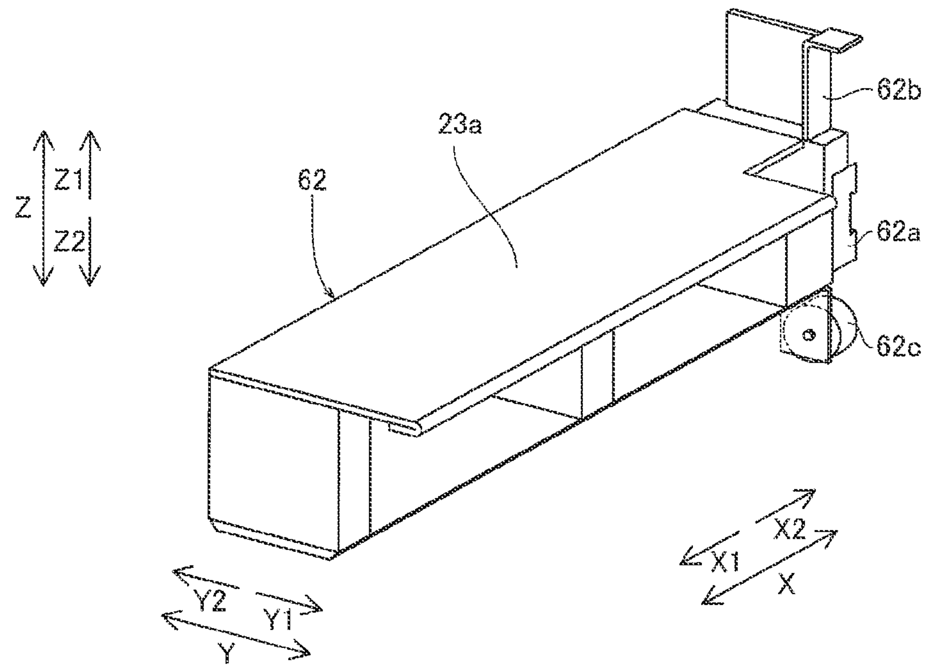
FIG. 11 is a perspective view for explaining a table part.

As shown in FIG. 11, the table part 62 has the shape of a rectangular parallelepiped so as to extend in the X direction and includes an engagement member 62*b* and an engagement roller 62*c*. The slider 62*a* is provided to an X2-side end portion of the table part 62.

The upper surface of the table part 62 serves as the third placement surface 23*a* of the third transport part 23. The table part 62 supports the lower surface of a specimen rack 2 from below. The table part 62 has a width in the Y direction corresponding to the width dimension of a specimen rack 2 and allows one specimen rack 2 to be set thereon.

The engagement member 62*b* has the shape of a wall raised upward from the upper surface of the table part 62, at the X2-side end portion of the table part 62. A first roller 64*b* (described later) of the arm part 63 is engaged with the engagement member 62*b*. The engagement roller 62*c* is provided on the lower surface side of the table part 62 via a bracket, at the X2-side end portion of the table part 62.

Figure 12:
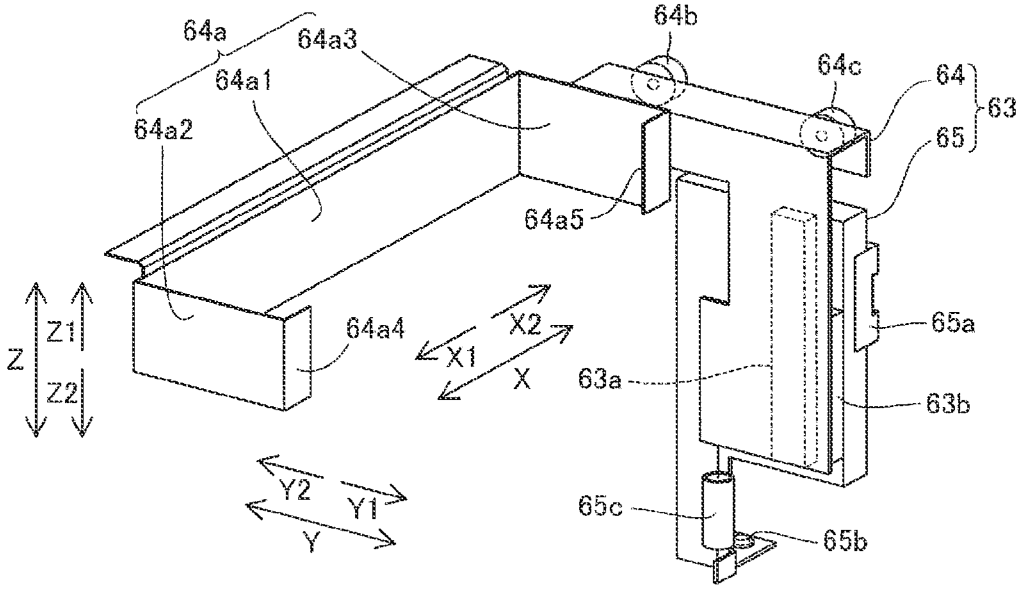
FIG. 12 is a perspective view for explaining an arm part.

As shown in FIG. 12, the arm part 63 includes a first member 64 and a second member 65. The first member 64 includes an arm 64*a*, the first roller 64*b*, and a second roller 64*c*. The second member 65 includes the slider 65*a*, a belt connection portion 65*b*, and an urging member 65*c*. The first member 64 and the second member 65 are connected so as to be relatively movable upward/downward (in the Z direction), through engagement between a guide 63*a* provided to the first member 64 and a slider 63*b* provided to the second member 65.

The arm 64*a* is disposed above the table part 62, i.e., above the third placement surface 23*a* of the third transport part 23. The arm 64*a* is made of a sheet-shaped member formed so as to enclose the periphery of a specimen rack 2 set on the third placement surface 23*a*. That is, the arm 64*a* has: a front surface portion 64*a*1 extending in the X direction; and a side surface portion 64*a*2 and a side surface portion 64*a*3 respectively extending from an X1-side end portion and an X2-side end portion of the front surface portion 64*a*1 to the Y1 side. The front surface portion 64*a*1 and the side surface portions 64*a*2 and 64*a*3 are integrated with each other. In addition, Y1-side end portions of the side surface portion 64*a*2 and the side surface portion 64*a*3 respectively have bent portions 64*a*4 and 64*a*5 bent in such directions as to face each other. The arm 64*a* has an X2-side end portion attached to the first member 64.

When a specimen rack 2 is set on the third transport part 23, the specimen rack 2 is placed on the third placement surface 23*a* of the table part 62 after passing through the inner peripheral side of the arm 64*a* from above the arm 64*a*. Consequently, the front surface portion 64*a*1 of the arm 64*a* faces the Y2-side side surface of the specimen rack 2, and the bent portions 64*a*4 and 64*a*5 of the arm 64*a* face the Y1-side side surface of the specimen rack 2.

The first roller 64*b* and the second roller 64*c* are disposed at an interval in the Y direction. A configuration is employed in which the first roller 64*b* can be engaged with the engagement member 62*b* of the table part 62 by disposing the engagement member 62*b* of the table part 62 at a position on the Y1 side relative to the first roller 64*b* (a position between the first roller 64*b* and the second roller 64*c*). The second roller 64*c* has a function of allowing the first roller 64*b* and the engagement member 62*b* to be engaged with each other or disengaged from each other by an engagement switching mechanism 66 (see FIG. 10) described later.

The second member 65 includes the slider 65*a* on the X2 side. The belt connection portion 65*b* is fixed to the belt 61*c* (see FIG. 10) of the placement base movement mechanism 23*c*. Consequently, the entirety of the arm part 63 (the second member 65 and the first member 64) is moved in the Y direction in association with movement of the belt 61*c*. The urging member 65*c* has one end attached to the first member 64 and another end attached to the second member 65. The urging member 65*c* urges the first member 64 downward (in the Z2 direction).

With reference back to FIG. 10, the third transport part 23 includes the engagement switching mechanism 66 which switches the state of engagement between the table part 62 and the arm part 63. The engagement switching mechanism 66 is provided to an end portion in the Y1 direction so as to be adjacent to the first lifting/lowering part 27 present at the relay position for the third transport part 23. The engagement switching mechanism 66 includes: a tilted block 66*a* which operates the second roller 64*c* (see FIG. 12); and a positioning member 66*b* to be engaged with the engagement roller 62*c* (see FIG. 11).

The tilted block 66*a* has: a tilted surface 66*a*1 tilted such that the height thereof increases in the Y1 direction from a Y2-side end portion of the tilted surface 66*a*1; and a horizontal surface 66*a*2 extending in the Y1 direction from the Y1-side end portion of the tilted surface 66*a*1. The positioning member 66*b* has an engagement recess 66*b*1 and is provided so as to be rotatable about a rotation shaft 66*b*2.

In an engagement state (see FIG. 16) where the engagement member 62*b* and the first roller 64*b* are engaged with each other, movement of the arm part 63 in the Y1 direction causes the first roller 64*b* to push the engagement member 62*b* in the Y1 direction, whereby the table part 62 and the arm part 63 are moved together in the Y1 direction. Meanwhile, in a disengagement state (see FIG. 18) where the engagement member 62*b* and the first roller 64*b* are not engaged with each other, movement of the arm part 63 in the Y1 direction causes the arm part 63 to move in the Y1 direction with the table part 62 being left behind. In the disengagement state, only the arm part 63 is moved in the Y1 direction by the placement base drive part 61*b*, and the table part 62 is not moved. The tilted block 66*a* switches the state of engagement between the engagement member 62*b* and the first roller 64*b*.

The slider 62*a* of the table part 62 is located on the Y2 side relative to the slider 65*a* of the arm part 63. Thus, when the arm part 63 is moved in the Y2 direction, the table part 62 is pushed by the arm part 63 so that the arm part 63 and the table part 62 are moved together in the Y2 direction, regardless of whether the engagement state or the disengagement state is taken. An end portion in the Y2 direction of a movement range of the placement base 23*b* (the table part 62 and the arm part 63) is provided with an origin sensor 68 (see FIG. 10) which detects the placement base 23*b* disposed at an origin position.

Figure 13:
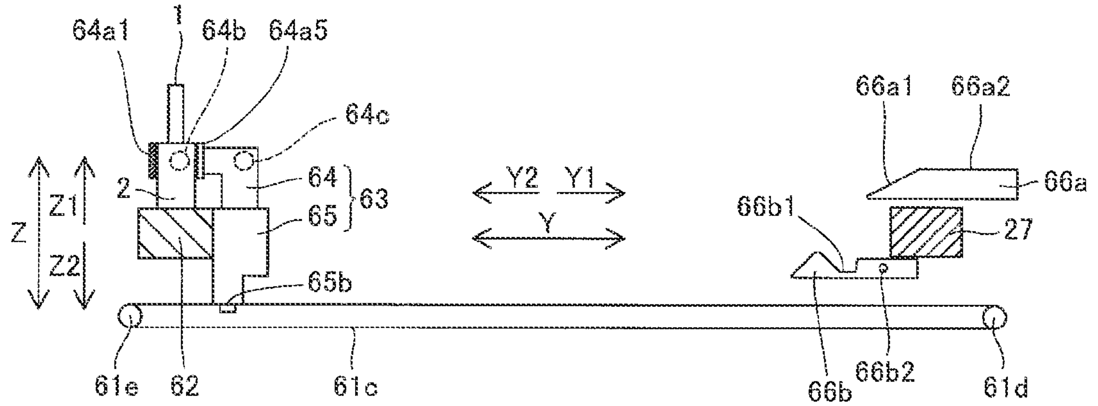
FIG. 13 is a side view for explaining a state where a placement base is present at an origin position.

As shown in FIG. 13, a specimen rack 2 is set on the third placement surface 23*a* in a state where the table part 62 and the arm part 63 are present at the origin position on the Y2 side. When the specimen rack 2 is set, the arm part 63 is driven in the Y1 direction by the placement base drive part 61*b*. The table part 62 and the arm part 63 are in the engagement state at the origin position, and the table part 62 and the arm part 63 are moved together.

Figure 14:
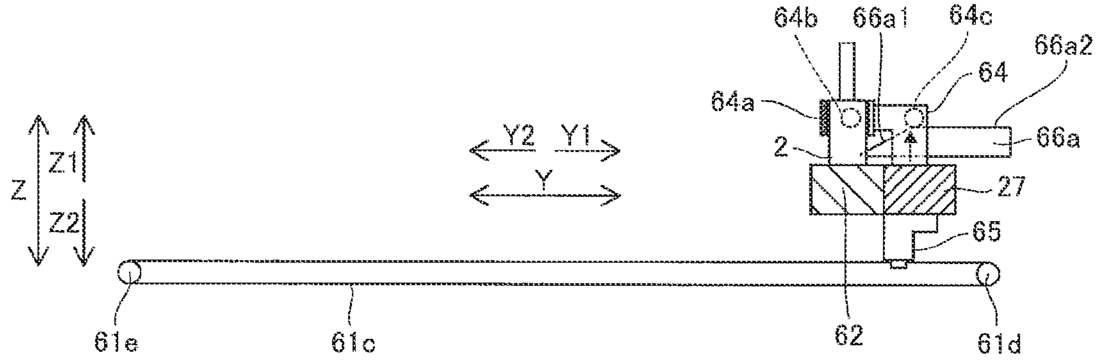
FIG. 14 is a side view for explaining a state where the placement base is present at an engagement switching position.
Figure 16:
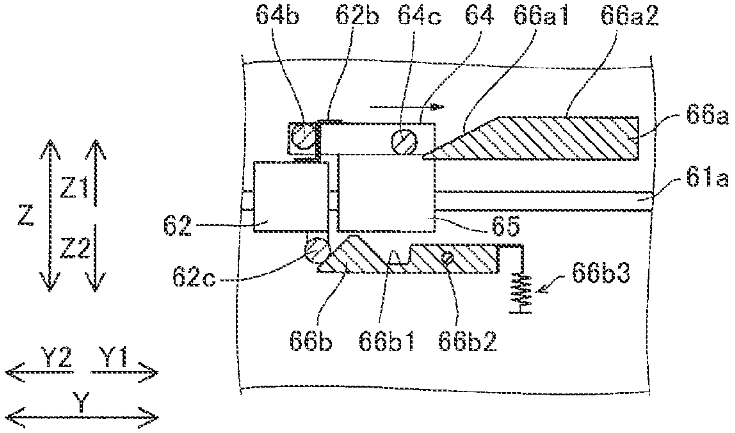
FIG. 16 is a schematic diagram for explaining a state where an engagement member and a first roller are engaged with each other.
Figure 17:
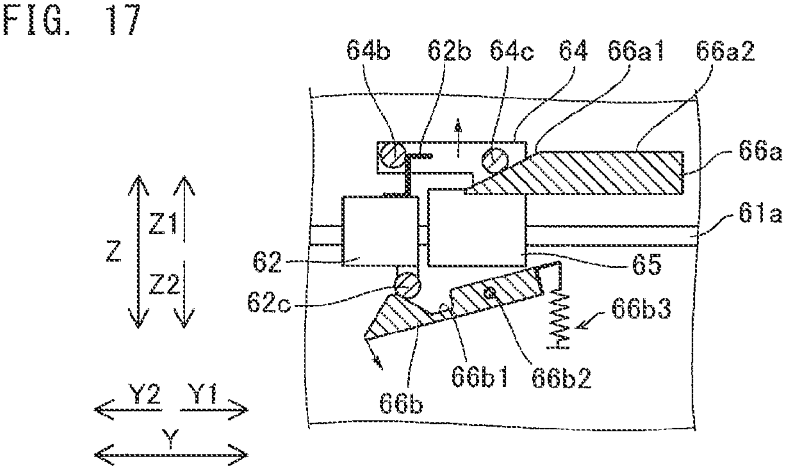
FIG. 17 is a side view for explaining a state where a second roller is present on a tilted surface.
Figure 18:
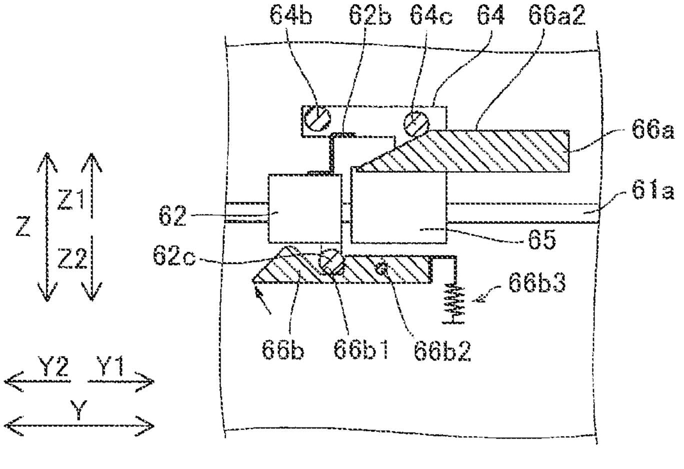
FIG. 18 is a schematic diagram for explaining a state where the engagement member and the first roller are disengaged from each other.

As shown in FIG. 14, when the table part 62 and the arm part 63 have arrived at a position immediately in front of the relay position at the end portion in the Y1 direction, the second roller 64*c* of the arm part 63 is moved onto the tilted surface 66*a*1 of the tilted block 66*a*. The second roller 64*c* is lifted in the Z1 direction, whereby the entirety of the first member 64 of the arm part 63 is moved upward (in the Z1 direction) relative to the second member 65. The movement of the first member 64 in the Z1 direction causes the first roller 64*b* of the arm part 63 to move to a position above the upper end of the engagement member 62*b* of the table part 62 as shown in FIG. 16 to FIG. 18. As a result, the first roller 64*b* and the engagement member 62*b* are disengaged from each other. When the second roller 64*c* has arrived at the horizontal surface 66*a*2 of the tilted block 66*a*, the arm part 63 is in the disengagement state. The position at which the state is switched between the engagement state and the disengagement state is referred to as an engagement switching position. At the time of movement to the Y1 direction side beyond the engagement switching position, only the arm part 63 is moved in the Y1 direction.

In addition, when the arm part 63 has arrived at the engagement switching position, the engagement roller 62*c* on the lower surface side of the table part 62 comes into contact with the positioning member 66*b* so that the positioning member 66*b* is rotated anticlockwise so as to be pushed away from an origin position, as shown in FIG. 16 to FIG. 18. When the engagement roller 62*c* has arrived at the position of the engagement recess 66*b*1 of the positioning member 66*b*, the positioning member 66*b* is rotated clockwise owing to urging force of an urging member **66*b*3 which urges the positioning member 66*b* toward the origin position, and the engagement roller 62*c* is received in the engagement recess 66*b*1. Consequently, the table part 62 disengaged from the arm part 63 is engaged with the positioning member 66*b*. The table part 62 is freely movable in the Y direction in a state of being disengaged from the arm part 63, but the position in the Y direction of the table part 62 is fixed through engagement with the positioning member 66*b*. As shown in FIG. 14, the position at which the table part 62 and the positioning member 66*b* are engaged with each other is set such that the specimen rack 2 can be relayed between the table part 62 and the first lifting/lowering part 27** disposed at the relay position.

Figure 15:
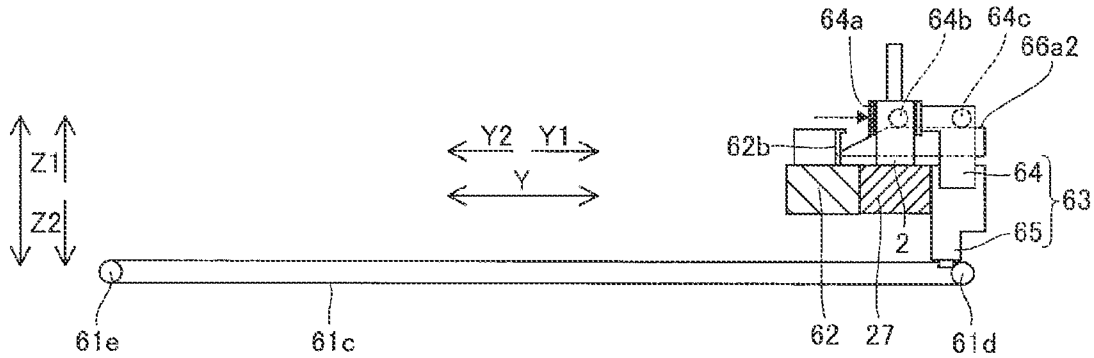
FIG. 15 is a side view for explaining a state where the placement base is present at a relay position.

As shown in FIG. 15, the arm part 63 is further driven in the Y1 direction by the placement base drive part **61*b* after the disengagement. Consequently, the arm 64*a* of the arm part 63 is moved in the Y1 direction from a position above the table part 62 to a position above the first lifting/lowering part 27. This arm 64*a* causes the specimen rack 2 set on the table part 62 to, as a result of being pushed by the arm 64*a*, move in the Y1 direction and move onto the upper surface of the first lifting/lowering part 27. In this manner, the specimen rack 2 set on the third transport part 23 is relayed to the first lifting/lowering part 27** disposed at the relay position.

At the relay position, the arm **64*a* is located above the first lifting/lowering part 27. In this state, the first lifting/lowering part 27 is moved downward, i.e., in the Z2 direction, whereby the specimen rack 2 passes through the inner side of the arm 64*a* and is transported in the Z2 direction. After the specimen rack 2 passes through the arm 64*a*, the arm part 63 is driven in the Y2 direction by the placement base drive part 61*b*, whereby the arm part 63 and the table part 62 are returned to the origin position. At the time of movement in the Y2 direction from the relay position, the second roller 64*c* is moved downward on the tilted surface 66*a*1 of the tilted block 66*a*, whereby the entirety of the first member 64 of the arm part 63 is moved downward (in the Z2 direction) relative to the second member 65. The movement of the first member 64 in the Z2 direction causes the first roller 64*b* of the arm part 63 to move to a position lower than the upper end of the engagement member 62*b* of the table part 62, whereby the first roller 64*b* and the engagement member 62*b* are engaged with each other again. Owing to urging force of the urging member 65*c*, the first member 64 is assuredly returned to the position at which the first roller 64*b* and the engagement member 62*b*** are engaged with each other.

After the table part 62 and the arm part 63 are engaged with each other again, the arm part 63 is driven in the Y2 direction by the placement base drive part **61*b*, whereby the arm part 63 pushes the table part 62 so as to move in the Y2 direction together with the table part 62. At this time, the engagement roller 62*c* of the table part 62 causes anticlockwise rotation of the positioning member 66*b* so as to get out of the inside of the engagement recess 66*b*1, whereby the table part 62 and the positioning member 66*b*** are disengaged from each other.

With the above configuration, the specimen rack 2 is relayed between the third transport part 23 and the first lifting/lowering part 27. As shown in FIG. 10, the third transport part 23 is provided with: an optical rack sensor **67*a* which is located at the origin position and which detects a specimen rack 2 set on the third placement surface 23*a*; and an optical rack sensor 67*b* which is located at a position (engagement switching position) in front of the relay position and which detects the specimen rack 2 set on the third placement surface 23*a***.

Thus, the third transport part 23 has a structure in which the placement base **23*b* supported in a cantilever configuration by the side surface member 26*a* on the X2 side of the chassis 26 is moved by the placement base movement mechanism 23*c* provided on the side surface member 26*a*, unlike the second transport part 22 having a structure in which the movement mechanism 22*e* is disposed on the lower surface side relative to the second placement surface 22*b*. Since the placement base movement mechanism 23*c* is configured to achieve supporting in a cantilever configuration, the thickness in the up-down direction of the third transport part 23 can be effectively decreased. Thus, as shown in FIG. 4, the thickness in the up-down direction of the third transport part 23 corresponds to the dimension in the up-down direction of the placement base 23*b*, and the thickness in the up-down direction of the third transport part 23 is smaller than the thickness in the up-down direction of the second transport part 22. Since the thickness of the third transport part 23 disposed on the upper side of the specimen transport unit 20 is decreased, increase in the height dimension of the specimen transport unit 20 can be suppressed. In addition, when, for example, a user checks a specimen rack 2 set on the specimen transport unit 20, the specimen rack 2** is made easier to see.

In addition, as shown in FIG. 3, the third transport part 23 has a structure in which the placement base **23*b* is supported in a cantilever configuration from the X2 side, and thus the cover part 24 covers only the side surface on the X2 side of the third transport part 23, and the side surface on the X1 side of the third transport part 23 is uncovered and exposed substantially over the entire movement range, of the placement base 23*b*, excluding the relay position for the first lifting/lowering part 27. Consequently, a specimen rack 2 set on the second transport part 22 located below the third transport part 23** can be easily visually recognized from the X1 side.

<First Lifting/Lowering Part>

Figure 19:
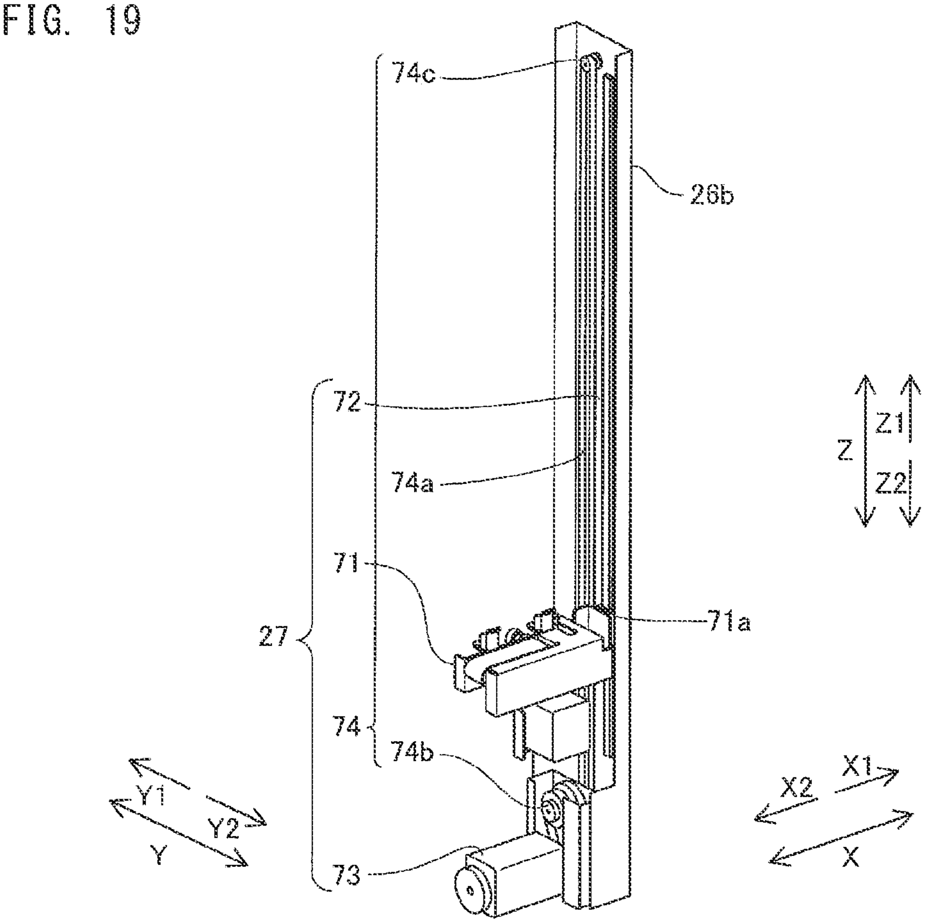
FIG. 19 is a perspective view for explaining a first lifting/lowering part.

As shown in FIG. 19, the first lifting/lowering part 27 includes a lifting/lowering placement part 71 movable upward/downward, a guide rail 72, a lifting/lowering drive part 73, and a transmission part 74. The guide rail 72, the lifting/lowering drive part 73, and the transmission part 74 are attached to a rear surface member **26*b* which is a portion of the chassis 26 (see FIG. 6). The guide rail 72 extends along the Z direction, and a slider 71*a* provided to the lifting/lowering placement part 71 is movably engaged with the guide rail 72. The lifting/lowering drive part 73 is, for example, a stepping motor. The transmission part 74 is a belt-pulley mechanism composed of a belt 74*a* and pulleys 74*b* and 74*c*. The lifting/lowering drive part 73 rotationally drives the pulley 74*b*, thereby causing the belt 74*a* extended onto the pulleys 74*b* and 74*c* provided on the upper and lower sides in the Z direction to move in a circulating manner. The lifting/lowering placement part 71 is fixed to a portion of the belt 74*a* and is moved in the Z direction along the guide rail 72 when the belt 74*a* is moved in a circulating manner. Consequently, the lifting/lowering placement part 71 is moved in the up-down direction (Z direction) by the lifting/lowering drive part 73**.

Figure 20:
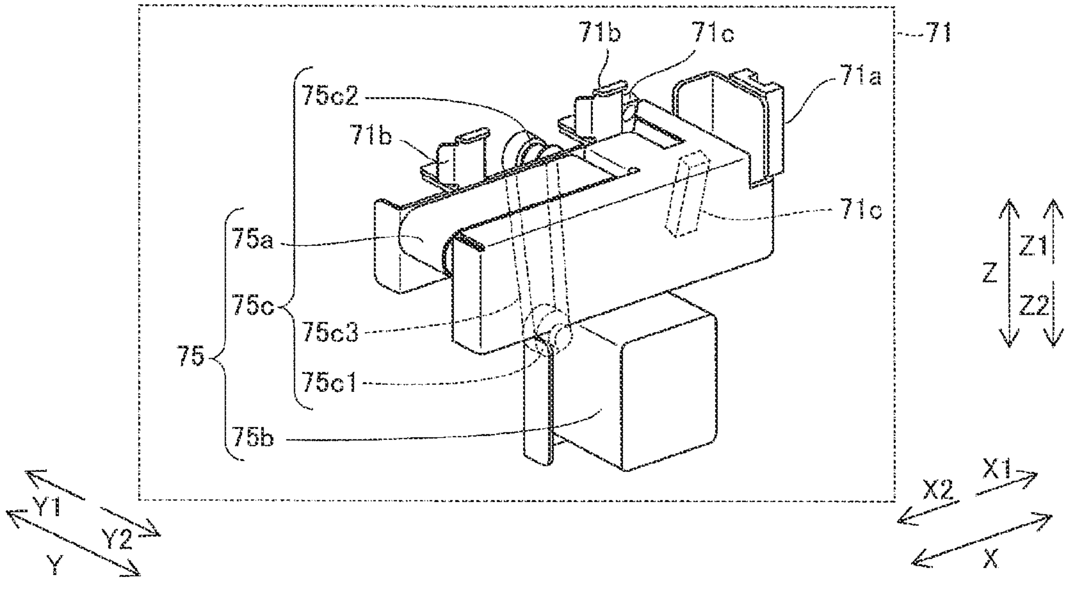
FIG. 20 is a perspective view for explaining a lifting/lowering placement part.

A specimen rack 2 is placed on the lifting/lowering placement part 71. As shown in FIG. 20, the lifting/lowering placement part 71 includes stoppers **71*b*, rack sensors 71*c*, and a laterally-sending part 75**.

The stoppers 71*b* are provided so as to be raised upward from a Y1-side end portion of the upper surface of the lifting/lowering placement part 71. A specimen rack 2 sent out in the Y1 direction from the second transport part 22 or the third transport part 23 onto the lifting/lowering placement part 71 is brought into contact with the stoppers 71*b* so that the stoppers 71*b* stop the specimen rack 2. The rack sensors 71*c* are transmission-type light sensors. The rack sensors 71*c* detect that the specimen rack 2 has been set on the lifting/lowering placement part 71.

The laterally-sending part 75 includes: a transport belt 75*a* to be driven in a circulating manner in the X direction; a belt drive part 75*b*; and a transmission part 75*c*. The belt drive part 75*b* is, for example, a stepping motor. The transmission part 75*c* includes: a pulley 75*c*1 attached to an output shaft of the belt drive part 75*b*; a pulley 75*c*2 attached to a drive shaft of the transport belt 75*a*; and a transmission belt 75*c*3 extended onto the pulleys 75*c*1 and 75*c*2. The belt drive part 75*b* rotates the drive shaft of the transport belt 75*a* via the transmission part 75*c*. The transport belt 75*a* is exposed from the upper surface of the lifting/lowering placement part 71. When the transport belt 75*a* is driven in a circulating manner in the X1 direction or the X2 direction by the belt drive part 75*b*, the specimen rack 2 placed on the lifting/lowering placement part 71 is moved in the X direction.

The second lifting/lowering part 33 shown in FIG. 6 also includes a lifting/lowering placement part identical to the lifting/lowering placement part 71 of the first lifting/lowering part 27. The specimen rack 2 is relayed between the second lifting/lowering part 33 and each of the first transport path 31 and the second transport path 32 by the laterally-sending part of the lifting/lowering placement part.

(Transport Operation for Specimen Rack)

Next, a flow of a transport operation for a specimen rack 2 by the specimen transport unit 20 will be described.

Figure 21:
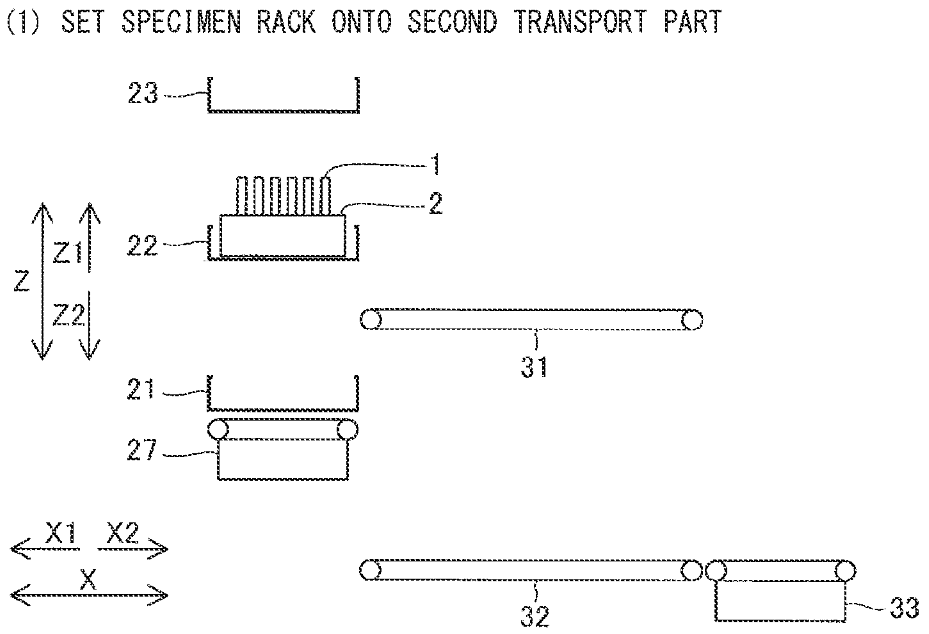
FIG. 21 is a first diagram for explaining operation of the specimen transport unit.
Figure 22:
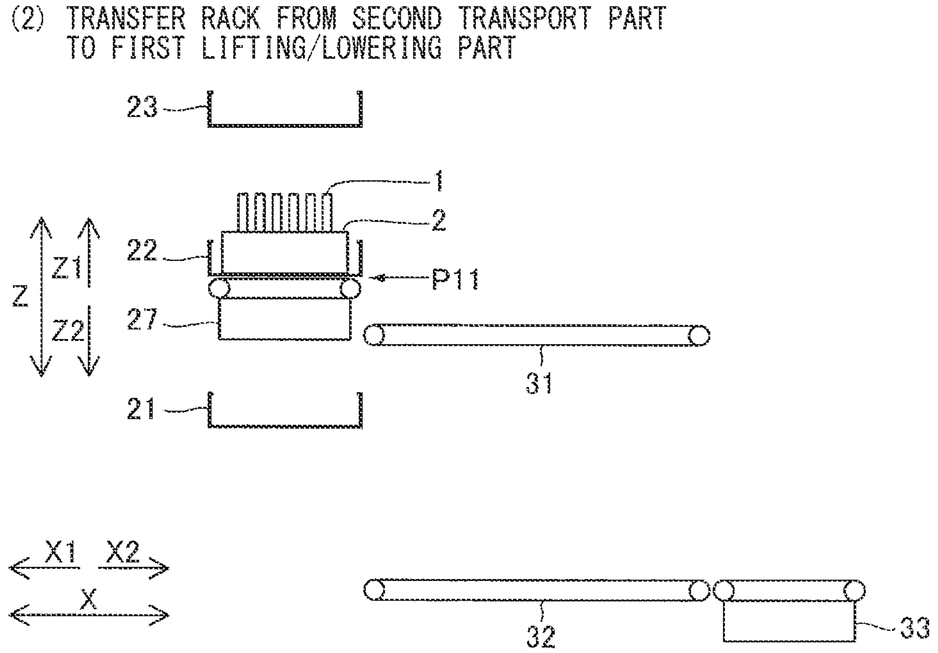
FIG. 22 is a second diagram for explaining the operation of the specimen transport unit.

As shown in FIG. 21, a specimen rack 2 is set on the second transport part 22 (rack setting part) by a user. When the specimen rack 2 starts to be supplied to the measurement unit 10, the lifting/lowering placement part 71 of the first lifting/lowering part 27 is moved to a relay position P11 for the second transport part 22 as shown in FIG. 22. The second transport part 22 moves the specimen rack 2 in the Y1 direction by the movement mechanism 22*e* so as to relay the specimen rack 2 set on the second transport part 22 to the first lifting/lowering part 27.

Figure 23:
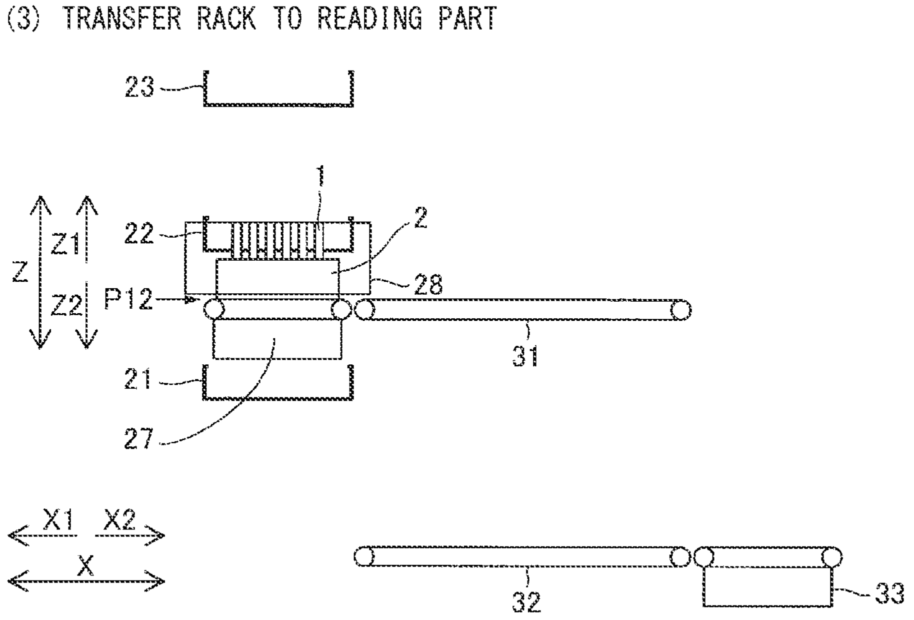
FIG. 23 is a third diagram for explaining the operation of the specimen transport unit.

As shown in FIG. 23, the first lifting/lowering part 27 having received the specimen rack 2 moves the lifting/lowering placement part 71 to a reading position P12 of the reading part 28. The reading position P12 is also a relay position, for a specimen rack 2, between the first lifting/lowering part 27 and the first transport path 31. The reading part 28 reads identification information about each of the specimen rack 2 on the lifting/lowering placement part 71 and specimen containers 1 held by the specimen rack 2.

Figure 24:
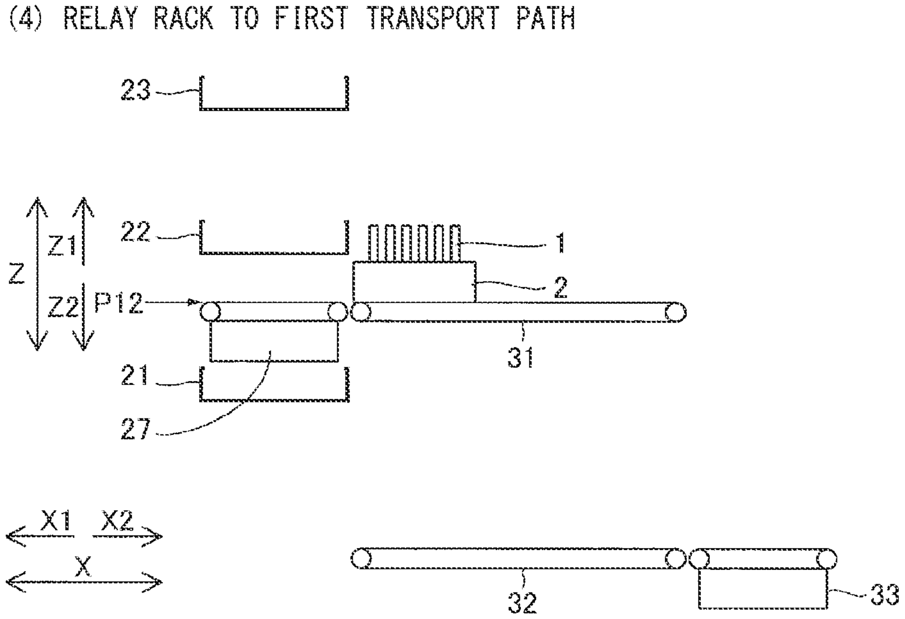
FIG. 24 is a fourth diagram for explaining the operation of the specimen transport unit.
Figure 25:
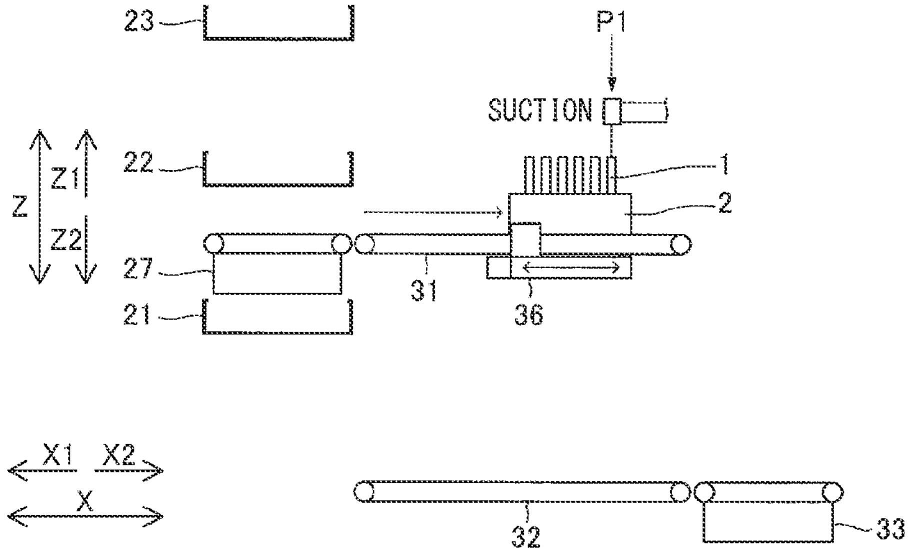
FIG. 25 is a fifth diagram for explaining the operation of the specimen transport unit.

As shown in FIG. 24, after the identification information is read, the first lifting/lowering part 27 moves the specimen rack 2 in the X2 direction by the laterally-sending part 75 so as to send out the specimen rack 2 onto the first transport path 31. As shown in FIG. 25, the specimen rack 2 received from the first lifting/lowering part 27 is moved in the X2 direction through the first transport path 31 to the specimen suction position P1. The specimen containers 1 held by the specimen rack 2 are sequentially positioned at the specimen suction position P1 one by one by the laterally-sending mechanism 36. At the specimen suction position P1, specimens in the respective specimen containers 1 held by the specimen rack 2 are sequentially suctioned by the measurement unit 10.

Figure 26:
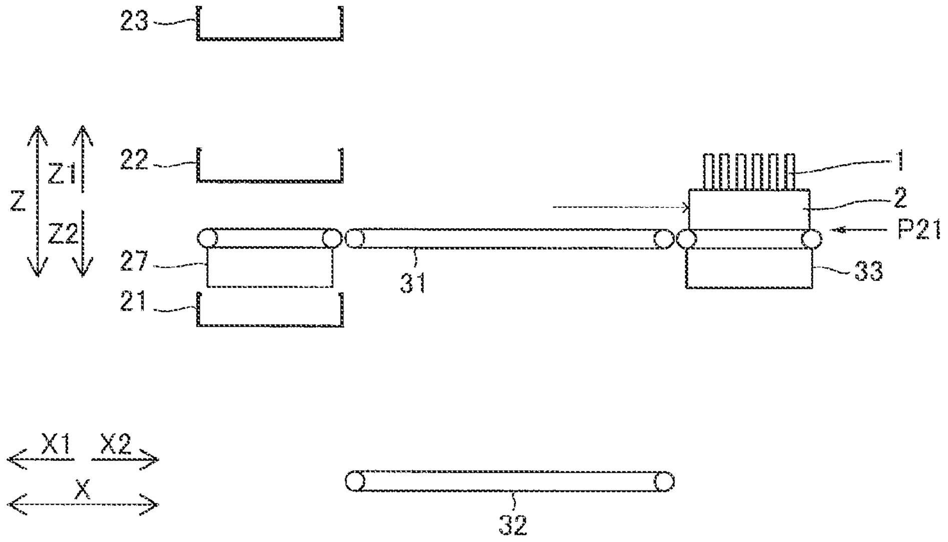
FIG. 26 is a sixth diagram for explaining the operation of the specimen transport unit.
Figure 27:
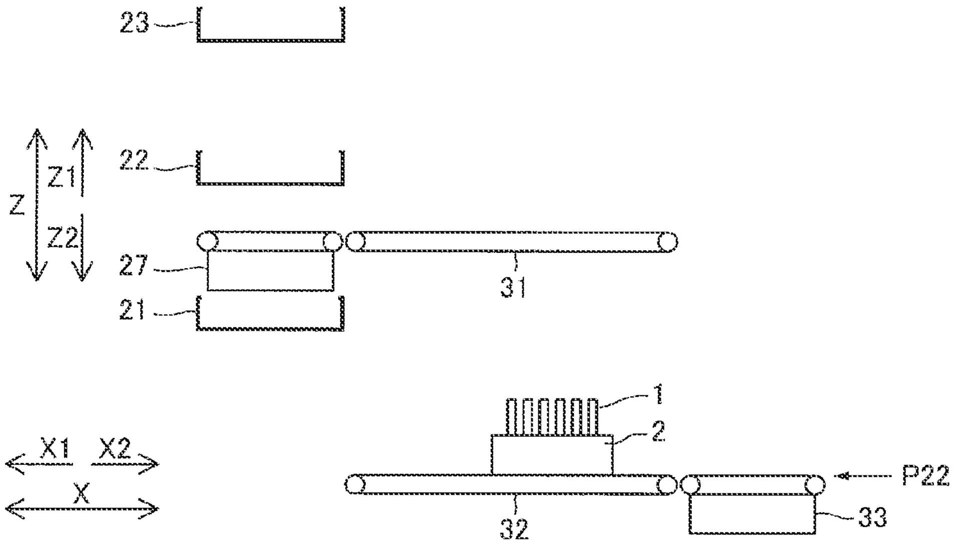
FIG. 27 is a seventh diagram for explaining the operation of the specimen transport unit.

After the specimens are suctioned, the specimen rack 2 having been subjected to specimen suction is moved in the X2 direction through the first transport path 31 so as to be relayed onto the second lifting/lowering part 33 moved to a relay position P21, as shown in FIG. 26. As shown in FIG. 27, the second lifting/lowering part 33 having received the specimen rack 2 is moved to a relay position P22 for the second transport path 32. The second lifting/lowering part 33 moves the specimen rack 2 in the X1 direction and sends out the specimen rack 2 onto the second transport path 32.

Figure 28:
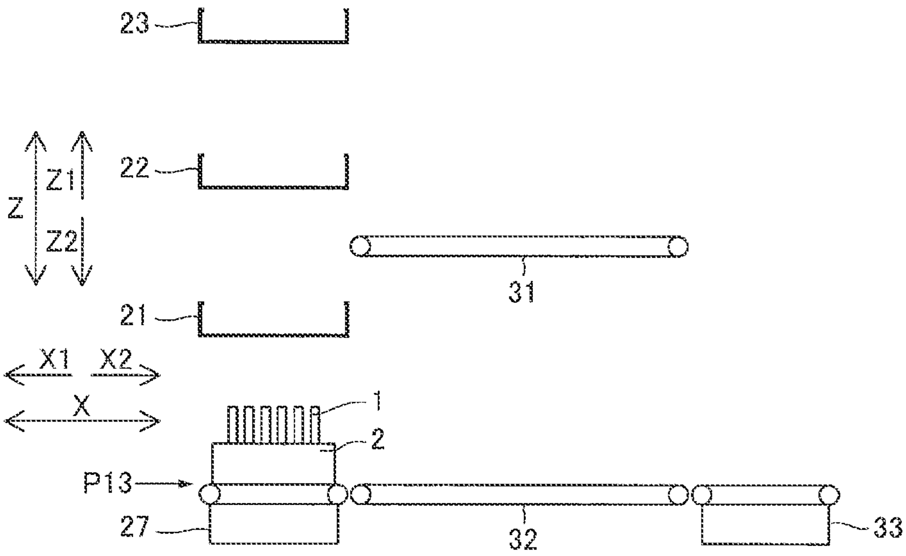
FIG. 28 is an eighth diagram for explaining the operation of the specimen transport unit.

As shown in FIG. 28, the specimen rack 2 received from the second lifting/lowering part 33 is moved in the X1 direction through the second transport path 32. The first lifting/lowering part 27 moves the lifting/lowering placement part 71 to a relay position P13 for the second transport path 32. The specimen rack 2 is moved in the X1 direction through the second transport path 32 so as to be relayed onto the first lifting/lowering part 27 moved to the relay position P13.

Figure 29:
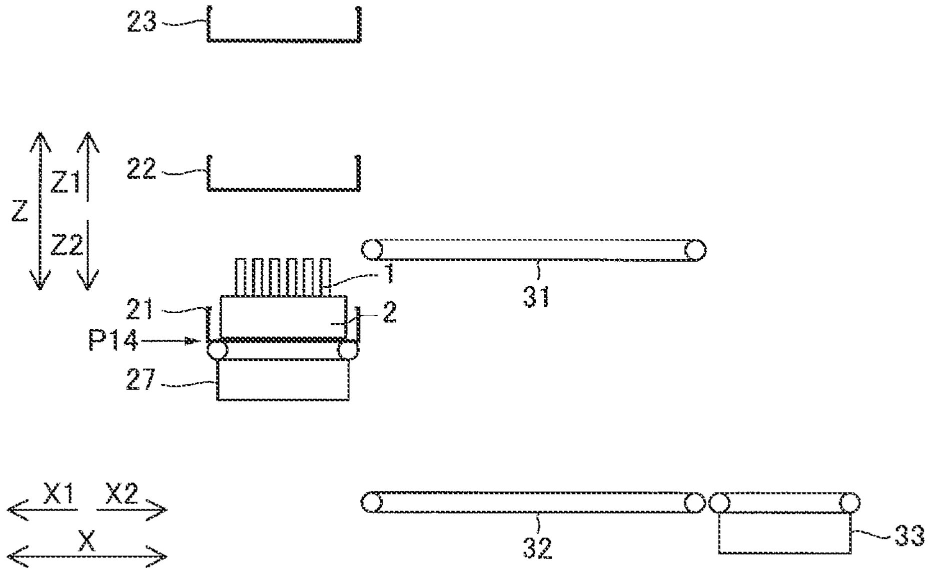
FIG. 29 is a ninth diagram for explaining the operation of the specimen transport unit.

As shown in FIG. 29, the first lifting/lowering part 27 having received the specimen rack 2 moves the lifting/lowering placement part 71 to a relay position P14 for the first transport part 21. The first transport part 21 moves the specimen rack 2 on the lifting/lowering placement part 71 in the Y2 direction onto the first placement surface 21*b* by the sending mechanism 56 so as to receive the specimen rack 2 from the first lifting/lowering part 27.

In this manner, transport of the specimen rack 2 set on the second transport part 22 is performed until the specimen rack 2 is collected on the first transport part 21.

Figure 30:
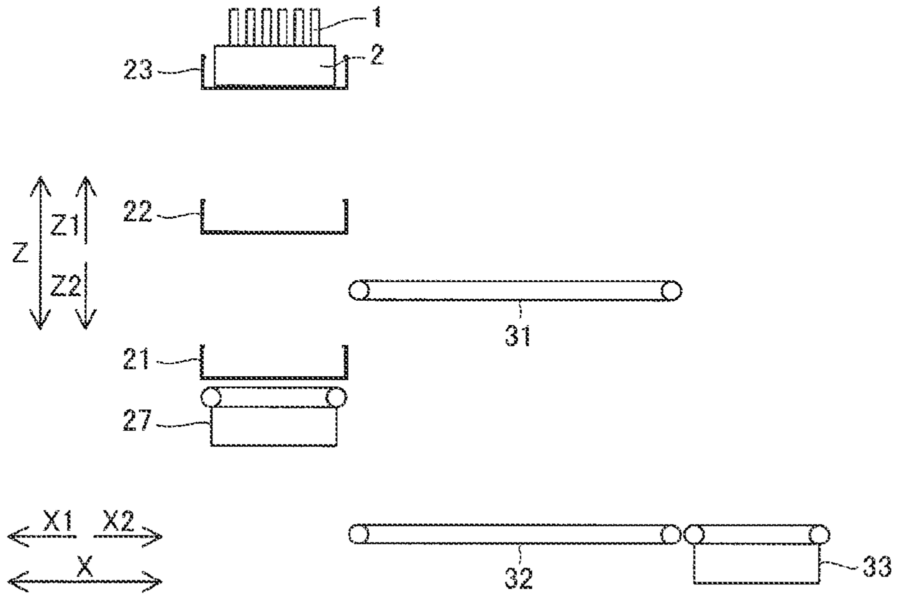
FIG. 30 is a first diagram for explaining rack transport from the third transport part of the specimen transport unit.
Figure 31:
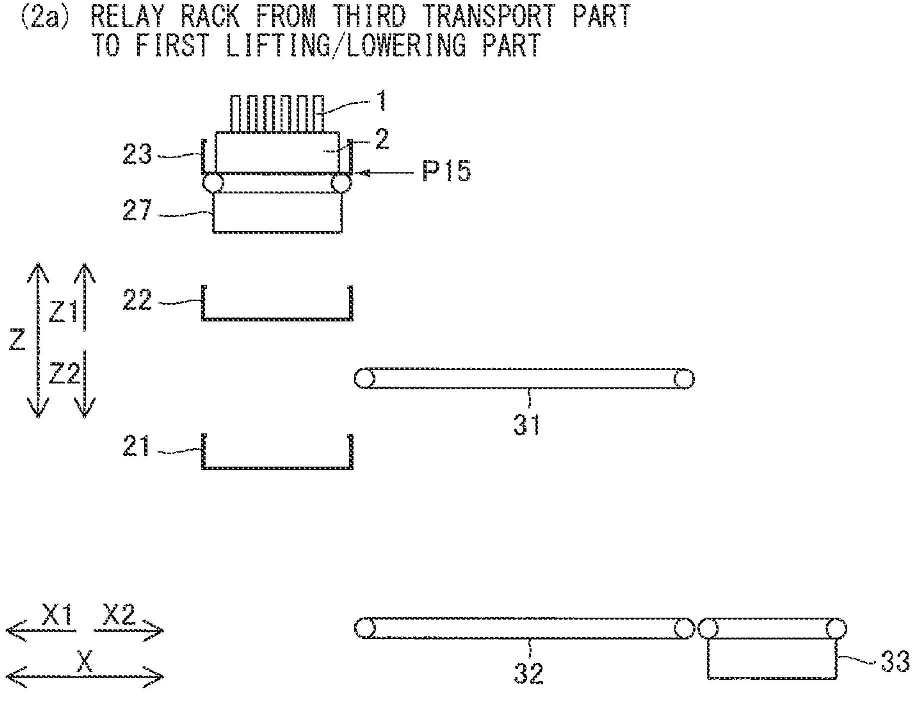
FIG. 31 is a second diagram for explaining the rack transport from the third transport part of the specimen transport unit.

When a specimen rack 2 is set on the third transport part 23 as shown in FIG. 30, the lifting/lowering placement part 71 of the first lifting/lowering part 27 is moved to a relay position P15 (shown in FIG. 31) for the third transport part 23 instead of the relay position P11 (shown in FIG. 22) for the second transport part 22. The third transport part 23 moves the placement base 23*b* in the Y1 direction by the placement base movement mechanism 23*c* so as to relay the specimen rack 2 set on the placement base 23*b* to the first lifting/lowering part 27.

Operations after the specimen rack 2 is relayed to the first lifting/lowering part 27 are the same as the operations shown in FIG. 23 to FIG. 29, and thus, will not be described.

(Measurement Unit)

Figure 32:
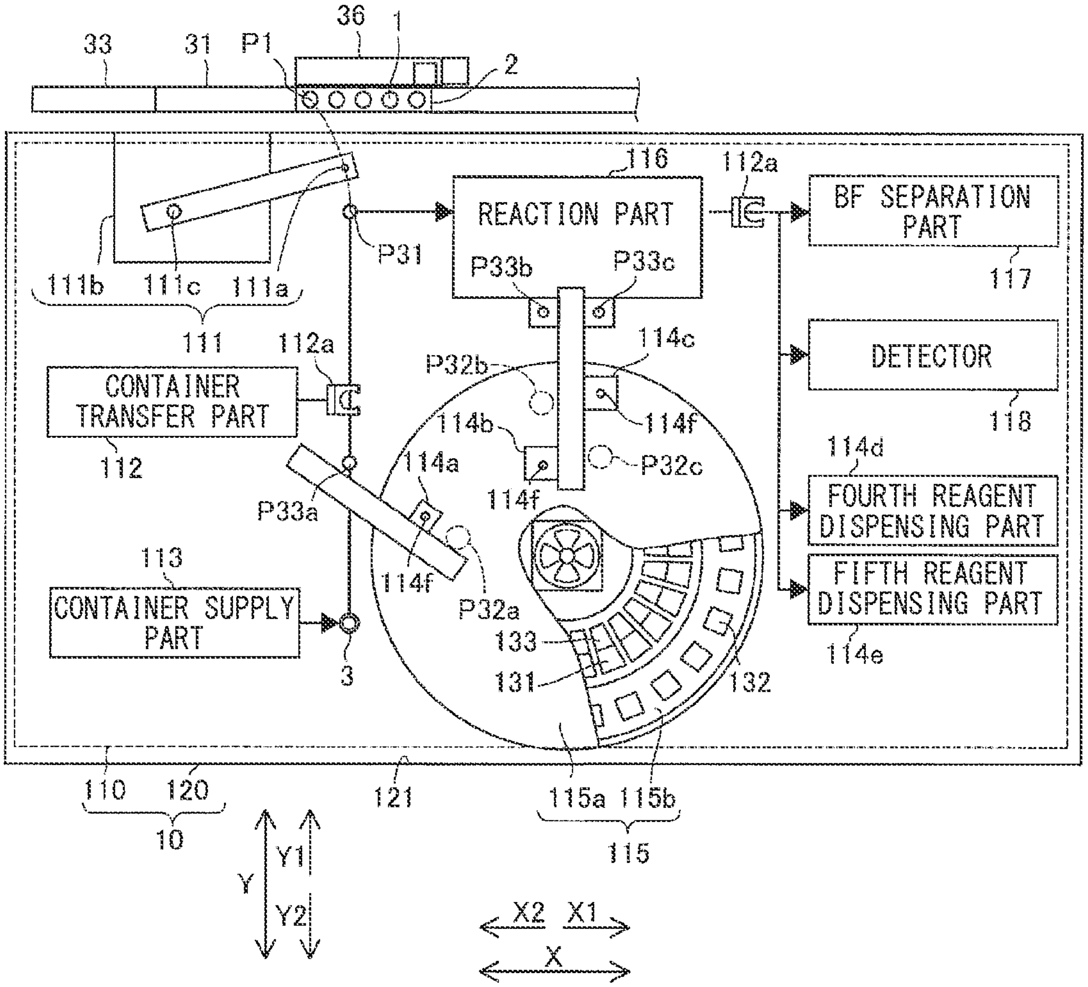
FIG. 32 is a plan view for explaining a configuration of a measurement unit.

Next, a configuration of the measurement unit 10 will be described in detail with reference to FIG. 32.

The measurement unit 10 includes a measurement mechanism 110 for measuring a specimen. The measurement mechanism 110 includes a specimen dispensing part 111, a container transfer part 112, a container supply part 113, reagent dispensing parts (114*a* to 114*e*), a reagent cooling storage 115, a reaction part 116, a BF separation part 117, and a detector 118. The measurement mechanism 110 is accommodated in a first accommodation part 121 (see FIG. 33) in a housing 120. The housing 120 has the shape of a box capable of accommodating therein each of these parts of the measurement unit 10.

The specimen dispensing part 111 suctions a specimen transported to the specimen suction position P1 by the specimen transport unit 20 and dispenses the suctioned specimen into a container 3. The specimen dispensing part 111 is provided at a Y1-side (rear-surface-side) end portion in the housing 120 so as to be located near the corner on the X2 side. The specimen dispensing part 111 includes: a pipette 111*a* for performing suction and discharge; and a pipette movement mechanism 111*b* for moving the pipette 111*a*. The pipette movement mechanism 111*b* is configured to be capable of an operation of rotating the pipette 111*a* about a rotation shaft 111*c* and an operation of moving the pipette 111*a* along the up-down direction. The specimen dispensing part 111 can move the pipette 111*a* to the specimen suction position P1 on the first transport path 31 and a specimen dispensing position P31 through rotation about the rotation shaft 111*c*. The specimen dispensing part 111 moves the pipette 111*a* in the up-down direction, thereby causing the distal end of the pipette 111*a* to enter a specimen container 1 and retract from inside the specimen container 1.

In the specimen dispensing part 111, the distal end of the pipette 111*a* is mounted with a dispensing tip, and a predetermined amount of specimen in a specimen container 1 transported to the specimen suction position P1 is suctioned into the dispensing tip. The specimen dispensing part 111 dispenses the suctioned specimen into a container 3 disposed at the specimen dispensing position P31. After the dispensing, the specimen dispensing part 111 disposes of the dispensing tip by removal thereof from the distal end of the pipette 111*a*.

The container transfer part 112 transfers a container 3. The container transfer part 112 obtains an empty container 3 from the container supply part 113 and transfers the container 3 to each of treatment positions such as the specimen dispensing part 111, the reagent dispensing parts 114, the reaction part 116, the BF separation part 117, and the detector 118. The container transfer part 112 is composed of: a catcher 112*a* which grasps the container 3; and a movement mechanism which moves the catcher 112*a*. The movement mechanism is an orthogonal robot movable in three orthogonal axial directions which are the up-down direction and two horizontal directions. The movement mechanism may include an articulated robot mechanism and an arm mechanism to be horizontally rotated about a rotation shaft.

The container supply part 113 can store therein a plurality of unused containers 3. The container supply part 113 supplies, at a predetermined container supply position, each of the unused empty containers 3 to the container transfer part 112.

Each of the reagent dispensing parts suctions a reagent in a reagent container and dispenses the suctioned reagent into the container 3. The reagent dispensing parts include: a first reagent dispensing part 114*a* for dispensing an R1 reagent in a reagent container 131; a second reagent dispensing part 114*b* for dispensing an R2 reagent in a reagent container 132; and a third reagent dispensing part 114*c* for dispensing an R3 reagent in a reagent container 133. In addition, the reagent dispensing parts 114 include: a fourth reagent dispensing part 114*d* for dispensing an R4 reagent; and a fifth reagent dispensing part 114*e* for dispensing an R5 reagent. The reagent containers 131, 132, and 133 are accommodated in the reagent cooling storage 115.

The first reagent dispensing part 114*a* can move a pipette 114*f* between an R1 reagent dispensing position P33*a* and a suction position P32*a* at which the R1 reagent is suctioned. The second reagent dispensing part 114*b* can move a pipette 114*f* between an R2 reagent dispensing position P33*b* and a suction position P32*b* at which the R2 reagent is suctioned. The third reagent dispensing part 114*c* can move a pipette 114*f* between an R3 reagent dispensing position P33*c* and a suction position P32*c* at which the R3 reagent is suctioned.

The fourth reagent dispensing part 114*d* and the fifth reagent dispensing part 114*e* are provided at positions away from the reagent cooling storage 115. The fourth reagent dispensing part 114*d* and the fifth reagent dispensing part 114*e* are connected via liquid sending tubes to reagent containers containing the R4 reagent and the R5 reagent, respectively, and can discharge the respective reagents into containers 3 transferred by the container transfer part 112.

The reagent cooling storage 115 has a container holding part 115*b* in a case 115*a* having a heat insulation structure. The container holding part 115*b* holds the reagent containers. The case 115*a* keeps cooling, by a cooler, the reagents in the reagent containers at a fixed temperature suitable for preservation. The upper surface of the case 115*a* is provided with hole portions that can be opened/closed so as to allow the pipettes 114*f* to enter the inside of the case 115*a* at the suction position P32*a*, the suction position P32*b*, and the suction position P32*c*.

The container holding part 115*b* is formed such that a plurality of the reagent containers are held side-by-side in the circumferential direction. The container holding part 115*b* can independently rotate, in the circumferential direction, a plurality of rows of the reagent containers concentric with each other. Consequently, the container holding part 115*b* allows desired reagent containers, selected from these rows of reagent containers being held, to be disposed at positions directly below the respective suction positions P32*a* to P32*c*. In the container holding part 115*b*, the reagent containers 131, 132, and 133 respectively containing the R1 reagent, the R2 reagent, and the R3 reagent are set.

The reaction part 116 includes a heater and a temperature sensor, holds a container 3, and heats a sample contained in the container 3 so as to cause a reaction. Through the heating, the specimen and the reagent contained in the container 3 are reacted with each other.

The BF separation part 117 has a function of performing a BF separation process of separating the liquid phase and the solid phase from the container 3. In a state where magnetic particles in which an immune complex (described later) has been formed are aggregated by magnetic force, the BF separation part 117 suctions a liquid component in the container 3 by a suction tube and supplies a washing liquid by a discharge tube. The BF separation part 117 is configured to thus remove an unnecessary substance contained in the liquid component inside the container 3 by separating the substance from the magnetic particles in which the immune complex has been formed.

The detector 118 detects, by a photodetector, light generated in the course of a reaction between a luminescent substrate and a labeled antibody bound to an antigen of the specimen and outputs a detection signal based on the amount of the detected light. The photodetector includes, for example, a photomultiplier tube.

Figure 33:
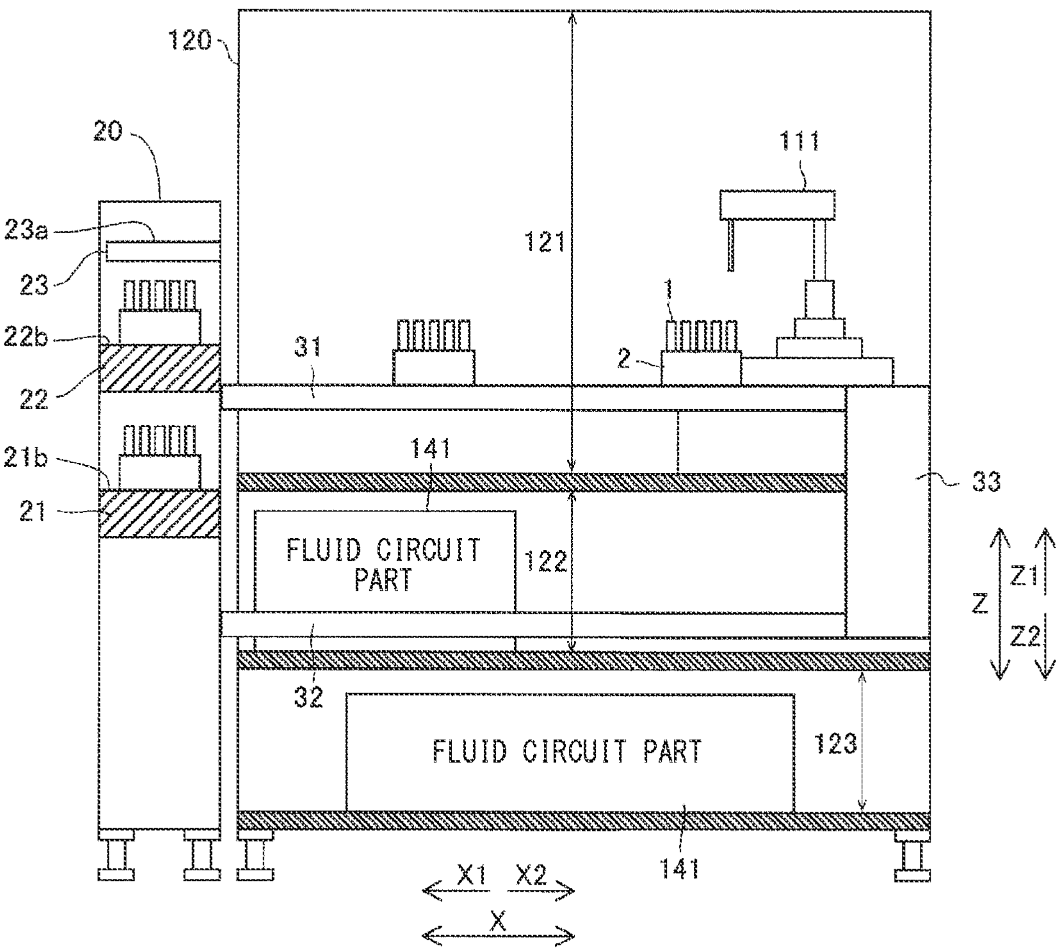
FIG. 33 is a schematic cross-sectional view for explaining the configuration of the measurement unit.

As shown in FIG. 33, the measurement unit 10 includes, in the housing 120, the first accommodation part 121, a second accommodation part 122 disposed below the first accommodation part 121, and a third accommodation part 123 disposed below the second accommodation part 122.

The first accommodation part 121 is an accommodation space for accommodating the measurement mechanism 110 (see FIG. 32) for measuring a specimen. Although FIG. 33 shows only the specimen dispensing part 111, the parts of the measurement mechanism 110 shown in FIG. 32 are disposed in the first accommodation part 121 and the second accommodation part 122. The second accommodation part 122 is an accommodation space for further accommodating a portion of a fluid circuit part 141 for operating the measurement mechanism 110. The fluid circuit part 141 is in fluid connection with each of the specimen dispensing part 111, the first reagent dispensing part 114*a*, the second reagent dispensing part 114*b*, the third reagent dispensing part 114*c*, the fourth reagent dispensing part 114*d*, the fifth reagent dispensing part 114*e*, and the BF separation part 117 which are disposed in the first accommodation part 121. The fluid circuit part 141 includes a pump for supplying pressure and a valve for switching flow paths, in order to suction and discharge a liquid in each of the dispensing parts (111 and 114*a* to 114*e*) and the BF separation part 117. The third accommodation part is an accommodation space for accommodating the fluid circuit part 141.

Here, the first transport path 31 of the specimen transport unit 20 is disposed at a height position above the second accommodation part 122, and the second transport path 32 of the specimen transport unit 20 is disposed at a height position below the center of the second accommodation part 122 and above the third accommodation part 123. Consequently, a region that is, in the up-down direction (Z direction), more than half the region of the second accommodation part 122 is disposed between the first transport path 31 and the second transport path 32. In addition, the entire region of the third accommodation part 123 is disposed below the second transport path 32. Therefore, in the case of, for example, performing maintenance of the fluid circuit part 141 accommodated in the second accommodation part 122, access to the inside of the second accommodation part 122 is easily achieved from between the first transport path 31 and the second transport path 32. In addition, in the case of performing maintenance of the fluid circuit part 141 accommodated in the third accommodation part 123, neither the first transport path 31 nor the second transport path 32 hinders the maintenance. Therefore, in the case of performing maintenance of the measurement unit 10, the transport mechanism 29 does not need to be disassembled or reassembled, whereby maintenance work can be efficiently performed.

In addition, in the present embodiment, the first transport part 21 and the second transport part 22 are disposed at height positions different from each of height positions of the first transport path 31 and the second transport path 32. Likewise, the third transport part 23 is disposed at a height position different from each of the height positions of the first transport path 31 and the second transport path 32.

Here, the height positions of the transport parts (the first transport part 21, the second transport part 22, and the third transport part 23) of the specimen transport unit 20 are desirably set to height positions that make it easy for a user to perform work. Meanwhile, the first transport path 31 and the second transport path 32 form a route for transporting specimen racks 2 to the measurement unit 10, and thus, are required to be disposed at height positions suitable for the device configuration of the measurement unit 10 for suctioning specimens. Considering this, the present embodiment employs a configuration in which the first lifting/lowering part 27 movable upward/downward is provided between: the first transport part 21, the second transport part 22, and the third transport part 23; and the first transport path 31 and the second transport path 32. In this configuration, the height positions of the first transport part 21, the second transport part 22, and the third transport part 23 can be set irrespective of the height positions of the first transport path 31 and the second transport path 32 (i.e., the height positions suitable for the device configuration of the measurement unit 10). Therefore, the height positions of the first transport part 21, the second transport part 22, and the third transport part 23 can be set to height positions that differ from the height position of each of the first transport path 31 and the second transport path 32 and that make it easy for a user to perform work.

Specifically, the second transport part 22 and the third transport part 23 are disposed at height positions above the first transport path 31, and the first transport part 21 is disposed at a height position above the second transport path 32. Since the height positions of the first transport part 21, the second transport part 22, and the third transport part 23 are thus set to higher positions suitable for allowing a user to perform work while standing, workability in setting/collection work for specimen racks 2 can be improved.

(Configuration Regarding Control of Specimen Measurement Apparatus)

Next, a configuration regarding control of the specimen measurement apparatus 300 will be described.

Figure 34:
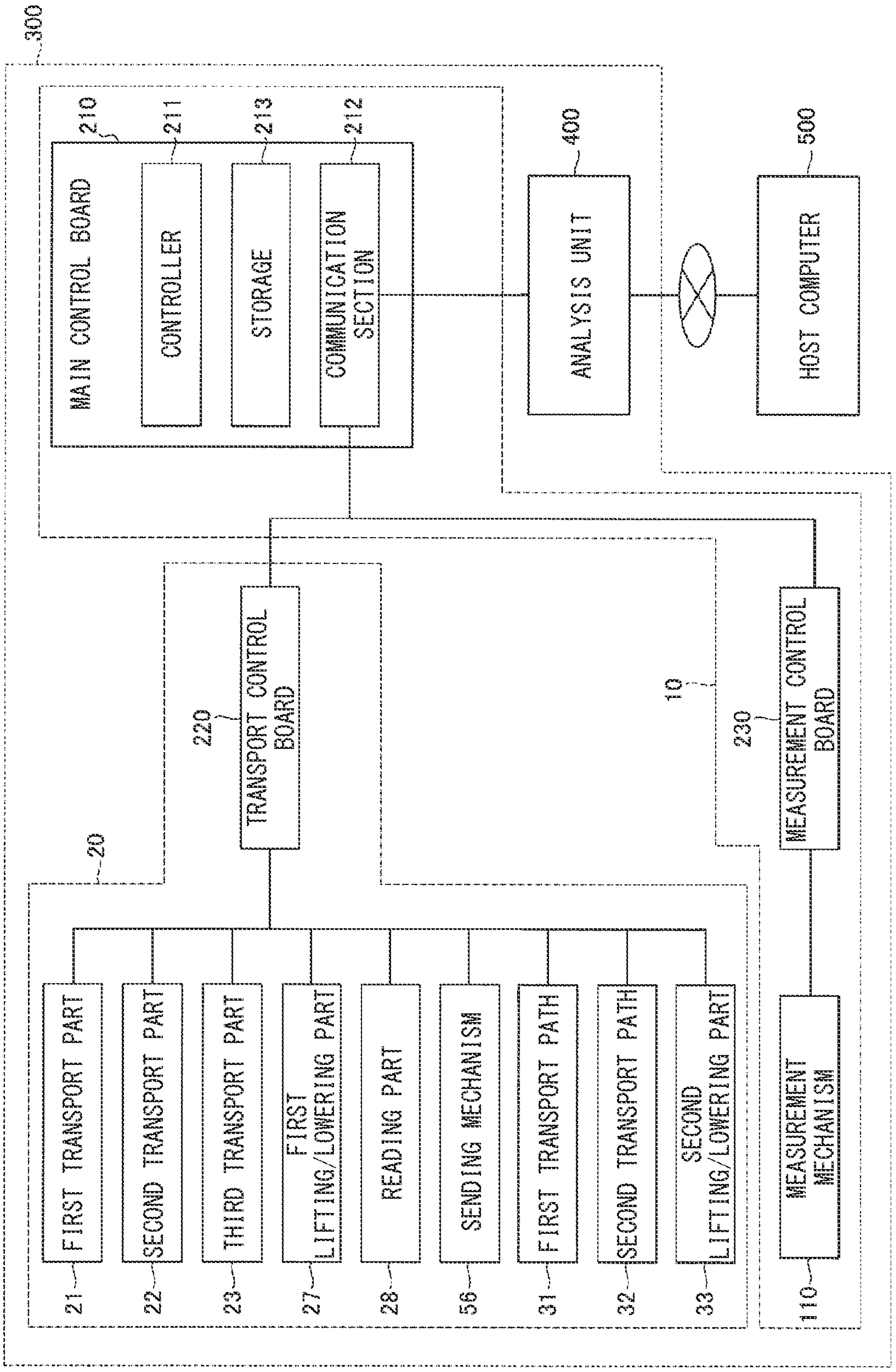
FIG. 34 is a block diagram showing a configuration regarding control of the specimen measurement apparatus.

As shown in FIG. 34, the specimen measurement apparatus 300 includes: a main control board 210 and a measurement control board 230 provided to the measurement unit 10; and a transport control board 220 provided to the specimen transport unit 20.

The main control board 210 includes the controller 211, a communication section 212, and a storage 213. The controller 211 includes: a processor implemented by a CPU or an FPGA; and a memory. The controller 211 executes a control program stored in the storage 213, to control each part of the measurement unit 10 and the specimen transport unit 20. The storage 213 is implemented by a semiconductor storage element and stores therein: the program to be executed by the controller 211; data of identification information and a measurement order; and data of a detection signal obtained by the detector 118. The communication section 212 includes an I/O interface and a communication interface for performing communication with the specimen transport unit 20 and the analysis unit 400.

The transport control board 220 includes: an I/O circuit which obtains a signal from a sensor provided to each part of the specimen transport unit 20; a drive circuit for a motor provided to each part of the specimen transport unit 20; and a circuit for communication with the main control board 210. The controller 211 of the main control board 210 controls, via the transport control board 220, operations of the first transport part 21, the second transport part 22, the third transport part 23, the first lifting/lowering part 27, the reading part 28, the sending mechanism 56, the first transport path 31, the second transport path 32, and the second lifting/lowering part 33. The controller 211 obtains, via the transport control board 220, identification information about each of specimen racks 2 and specimen containers 1 obtained from the reading part 28.

The measurement control board 230 includes: an I/O circuit for a sensor for controlling operation of the measurement mechanism 110; a drive circuit for a motor and a valve; and a circuit for communication with the main control board 210. The controller 211 of the main control board 210 controls operation of the measurement mechanism 110 via the measurement control board 230. The controller 211 obtains, via the measurement control board 230, data of a detection signal obtained by the detector 118 through a specimen measurement process.

The analysis unit 400 is implemented by a personal computer (PC) and is mainly composed of: a body composed of a CPU, a ROM, a RAM, a solid-state drive (SSD), and the like; a display section implemented by a liquid crystal display; and input devices implemented by a keyboard and a mouse.

The analysis unit 400 is communicably connected to the communication section 212 of the main control board and a host computer 500. The analysis unit 400 obtains, via the main control board 210, each piece of identification information read by the reading part 28 of the specimen transport unit 20. The analysis unit 400 is configured to inquire of the host computer 500 about the identification information, to obtain a measurement order regarding the specimen in the corresponding specimen container 1 held by the specimen rack 2.

The analysis unit 400 transmits the obtained measurement order to the controller 211 via the communication section 212 of the main control board 210. The controller 211 controls each part of the specimen transport unit 20 and the measurement unit 10 according to the transmitted measurement order.

The controller 211 transmits a detection signal from the detector 118 obtained by measuring the specimen in the specimen container 1 by the measurement unit 10, via the communication section 212 to the analysis unit 400. The analysis unit 400 is configured to analyze the amount of an analyte contained in the specimen or the like on the basis of the obtained detection signal. In addition, the analysis unit 400 displays the result of the analysis on the display screen or transmits the result to the host computer 500.

(Measurement Operation by Specimen Measurement Apparatus)

Figure 35:
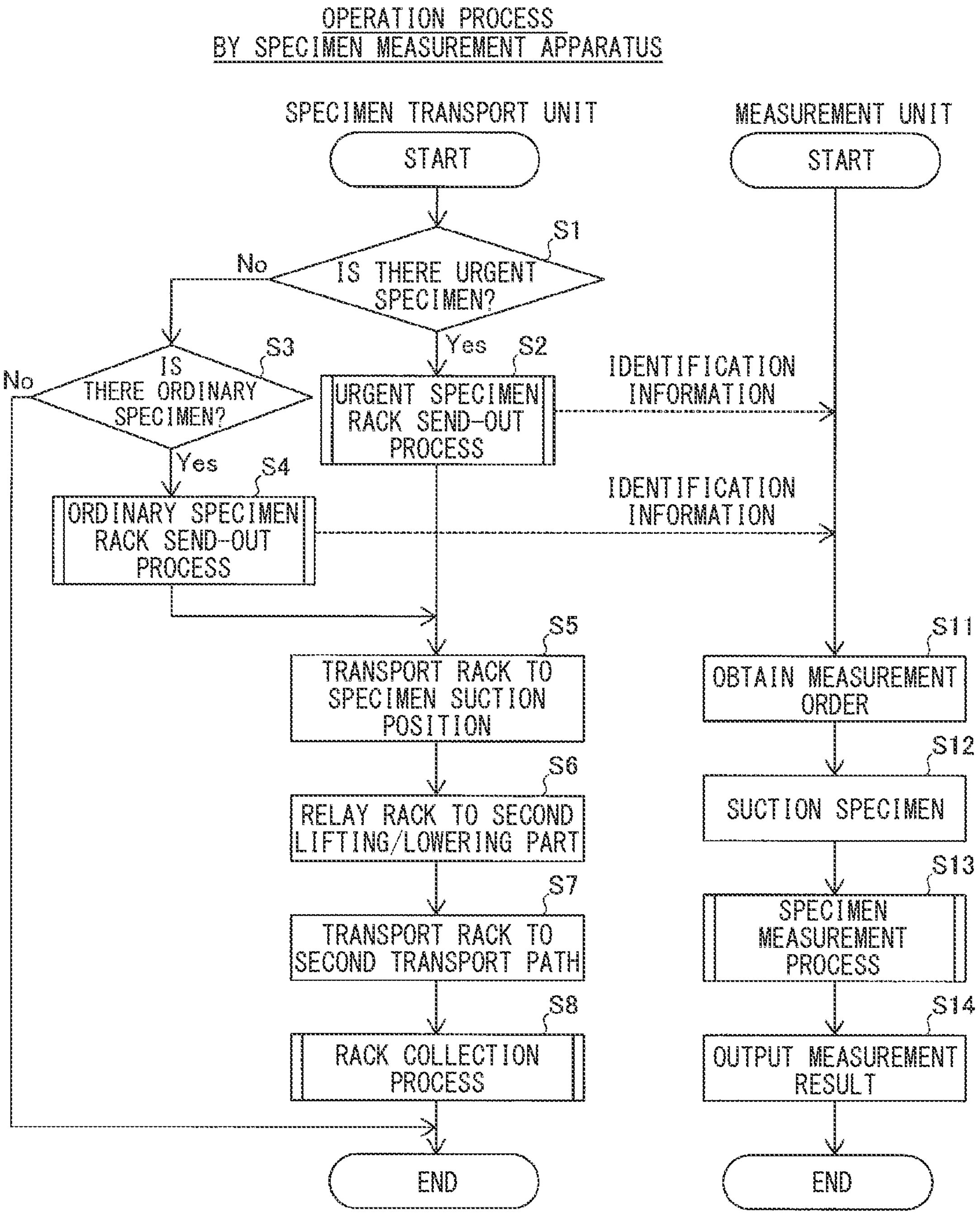
FIG. 35 is a flowchart for explaining operation of the specimen measurement apparatus.

Next, a measurement operation by the specimen measurement apparatus 300 will be described with reference to FIG. 35. Operations of the specimen transport unit 20 and the measurement unit 10 are controlled by the controller 211.

<Specimen Transport Unit>

In step S1, the controller 211 determines whether or not a specimen rack 2 has been set on the third transport part 23. When the rack sensor 67*a* has detected a specimen rack 2 set on the placement base 23*b* of the third transport part 23, the controller 211 advances the process to step S2.

In step S2, the controller 211 executes an urgent specimen rack send-out process. The urgent specimen rack send-out process is a process including: sending out a specimen rack 2 from the third transport part 23 to the first lifting/lowering part 27; reading identification information about each of the specimen rack 2 and specimen containers 1 thereon by the reading part 28; and relaying the specimen rack 2 to the first transport path 31. The process in step S2 is an interruption process, and thus the determination process in step S1 is continuously performed also while the following steps S3 to S8 are being performed. When, while steps S3 to S8 are being performed, it is determined in step S1 that a specimen rack 2 has been set on the third transport part 23 (interruption specimen setting part), steps S3 to S8 are continuously performed on the specimen rack 2 being subjected to steps S3 to S8, and concurrently, a process of steps S2 and S5 to S8 is performed on the specimen rack 2 set on the third transport part 23 (interruption specimen setting part).

Meanwhile, when no specimen rack 2 has been set on the third transport part 23 in step S1, i.e., when the rack sensor 67*a* has not detected any specimen rack 2 on the placement base 23*b* of the third transport part 23 in step S1, the controller 211 advances the process to step S3.

In step S3, the controller 211 determines whether or not a specimen rack 2 has been set on the second transport part 22. When the rack presence/absence sensors 45*a* to 45*d* have detected a specimen rack 2 set on the second placement surface 22*b* of the second transport part 22, the controller 211 advances the process to step S4.

In step S4, the controller 211 executes an ordinary specimen rack send-out process. The ordinary specimen rack send-out process is a process including: sending out one specimen rack 2 from the second transport part 22 to the first lifting/lowering part 27; reading identification information about each of the specimen rack 2 and specimen containers 1 thereon by the reading part 28; and relaying the specimen rack 2 to the first transport path 31.

Meanwhile, when no specimen rack 2 has been set on the second transport part 22 in step S3, i.e., when the rack presence/absence sensors 45*a* to 45*d* have not detected any specimen rack 2 on the second placement surface 22*b* of the second transport part 22 in step S3, the controller 211 ends the process.

Thus, when it is detected through steps S1 to S4 that a specimen rack 2 has been set on either of the second transport part 22 and the third transport part 23, the process for sending out the specimen rack 2 toward the specimen suction position P1 of the measurement unit 10 is performed. When the urgent specimen rack send-out process or the ordinary specimen rack send-out process is performed, the identification information about each of the specimen rack 2 having been sent out and specimen containers 1 thereon is read by the reading part 28 and transmitted to the analysis unit 400.

After the urgent specimen rack send-out process in step S2 or the ordinary specimen rack send-out process in step S4, the controller 211 advances the process to step S5. In step S5, the controller 211 controls the first transport path 31 to transport, to the specimen suction position P1, the specimen rack 2 relayed onto the first transport path 31. Each time a specimen is suctioned from a specimen container 1 that has been positioned at the specimen suction position P1 by the laterally-sending mechanism 36, the controller 211 causes the next pre-suction specimen container 1 to be positioned at the specimen suction position P1. When all the specimen containers 1 held by the specimen rack 2 have been positioned at the specimen suction position P1, the controller 211 advances the process to step S6.

In step S6, the controller 211 performs control in which the specimen rack 2 having been subjected to specimen suction is relayed from the first transport path 31 to the second lifting/lowering part 33. The controller 211 controls the second lifting/lowering part 33 such that the second lifting/lowering part 33 is moved to the relay position P21 for relaying between the first transport path 31 and the second lifting/lowering part 33. Then, the controller 211 controls the first transport path 31 to transport the specimen rack 2 onto the second lifting/lowering part 33.

In step S7, the controller 211 performs control in which the specimen rack 2 relayed to the second lifting/lowering part 33 is relayed from the second lifting/lowering part 33 to the second transport path 32. The controller 211 controls the second lifting/lowering part 33 such that the second lifting/lowering part 33 is moved to the relay position P22 for relaying between the second transport path 32 and the second lifting/lowering part 33. Then, the controller 211 controls the second lifting/lowering part 33 to laterally send the specimen rack 2 onto the second transport path 32.

In step S8, the controller 211 executes a rack collection process on the specimen rack 2 relayed to the second transport path 32. The rack collection process is a process of sending the specimen rack 2 from the second transport path 32 via the first lifting/lowering part 27 to the first transport part 21. When the specimen rack 2 is collected on the first transport part 21 through step S8, the process of transporting the one specimen rack 2 is completed.

<Measurement Unit>

In the measurement unit 10, in step S11, the controller 211 obtains a measurement order from the analysis unit 400 on the basis of the identification information read by the reading part 28.

In step S12, the controller 211 performs control in which the specimen in the specimen container 1 transported to the specimen suction position P1 in step S5 is suctioned by the specimen dispensing part 111.

In step S13, the controller 211 causes the measurement mechanism 110 to perform a specimen measurement process on the suctioned specimen. As a result of the specimen measurement process, data of a detection signal from the detector 118 is obtained.

In step S14, the controller 211 performs control in which the obtained data of the detection signal is outputted to the analysis unit 400 by the communication section 212. The analysis unit 400 analyzes the amount of an analyte contained in the specimen or the like on the basis of the detection signal obtained from the measurement unit 10 and displays the result of the analysis on the display section.

Through the above steps, the operation process by the specimen measurement apparatus 300 is performed.

The controller 211 executes the process starting from step S1 again in order to perform a transport process for the next specimen rack 2. Therefore, when a user sets a plurality of specimen racks 2 together onto the second transport part 22, the process of steps S4 to S8 is performed on one specimen rack 2 at the head (on the Y1 direction side) on the second transport part 22. The controller 211 keeps executing the process of steps S1 to S8 until there is no more specimen rack 2 set on the second transport part 22.

The controller 211 executes the process of steps S11 to S14 on a plurality of specimen containers 1 held by each of the specimen racks 2 and obtains respective pieces of data of detection signals. When the next specimen rack 2 is sent out by the specimen transport unit 20, the controller 211 executes the process of steps S11 to S14 on each of specimen containers 1 held by the new specimen rack 2.

Here, for describing a transport process for one specimen rack 2, the process from send-out to collection of the specimen rack 2 is shown as a sequential flow. In actuality, however, transport processes for a plurality of specimen racks 2 are concurrently performed at different timings. For example, while specimen suction is being performed on a certain specimen rack 2 in step S5, a rack send-out process (step S2 or S4) for the next specimen rack 2 or a rack collection process (step S8) for the previous specimen rack 2 can be performed.

(Urgent Specimen Rack Send-Out Process)

Figure 36:
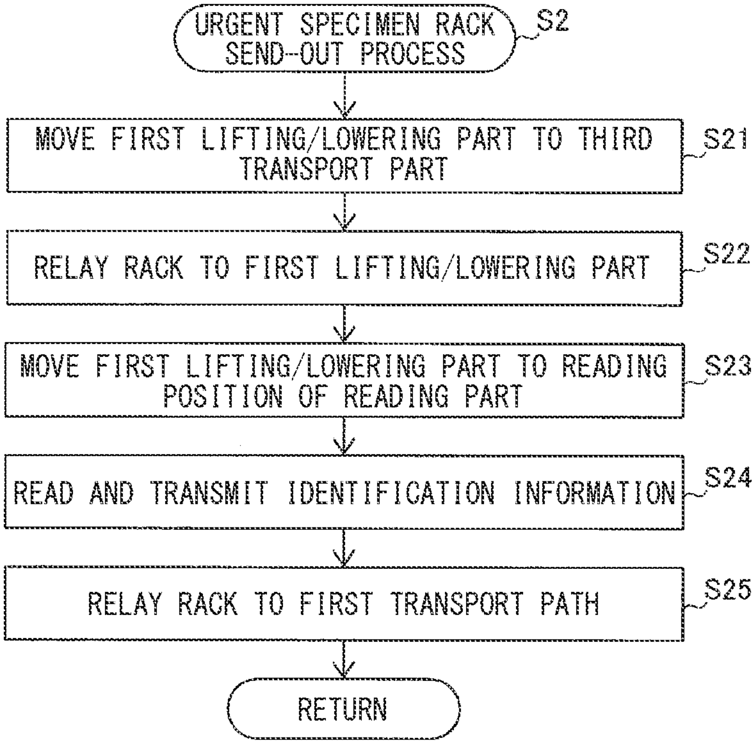
FIG. 36 is a flowchart for explaining an urgent specimen rack send-out process.

Next, the urgent specimen rack send-out process in step S2 in FIG. 35 will be described with reference to FIG. 36. The urgent specimen rack send-out process is executed by the controller 211. For operations of the specimen transport unit 20, refer to FIG. 21 to FIG. 31.

In step S21, the controller 211 controls the lifting/lowering drive part 73 to move the first lifting/lowering part 27 to the relay position P15 for the third transport part 23.

In step S22, the controller 211 controls the placement base drive part 61*b* to move the placement base 23*b* of the third transport part 23 in the Y1 direction from the origin position to the relay position P15. When the rack sensors 71*c* of the lifting/lowering placement part 71 have detected a specimen rack 2, the controller 211 causes the placement base drive part 61*b* to stop performing the drive. Consequently, the specimen rack 2 is relayed from the third transport part 23 to the first lifting/lowering part 27. When the rack sensors 71*c* of the first lifting/lowering part 27 have not detected any specimen rack 2 even at the time of the relaying operation, the controller 211 performs a predetermined error process.

In step S23, the controller 211 controls the lifting/lowering drive part 73 to move the first lifting/lowering part 27 to the reading position P12 of the reading part 28. In step S24, the controller 211 controls the reading part 28 to read identification information about the specimen rack 2 on the first lifting/lowering part 27 disposed at the reading position P12 and identification information about each of specimen containers 1 held by the specimen rack 2. When the controller 211 obtains these pieces of identification information from the reading part 28, the controller 211 causes the communication section 212 to transmit the obtained pieces of identification information to the analysis unit 400.

In step S25, the controller 211 controls the belt drive part 75*b* such that the specimen rack 2 on the first lifting/lowering part 27 is moved onto the first transport path 31 by the laterally-sending part 75. Consequently, the specimen rack 2 on the first lifting/lowering part 27 is relayed to the first transport path 31.

Through the above steps, the urgent specimen rack send-out process is completed, and the process is returned to step S5 and the subsequent steps.

(Ordinary Specimen Rack Send-Out Process)

Figure 37:
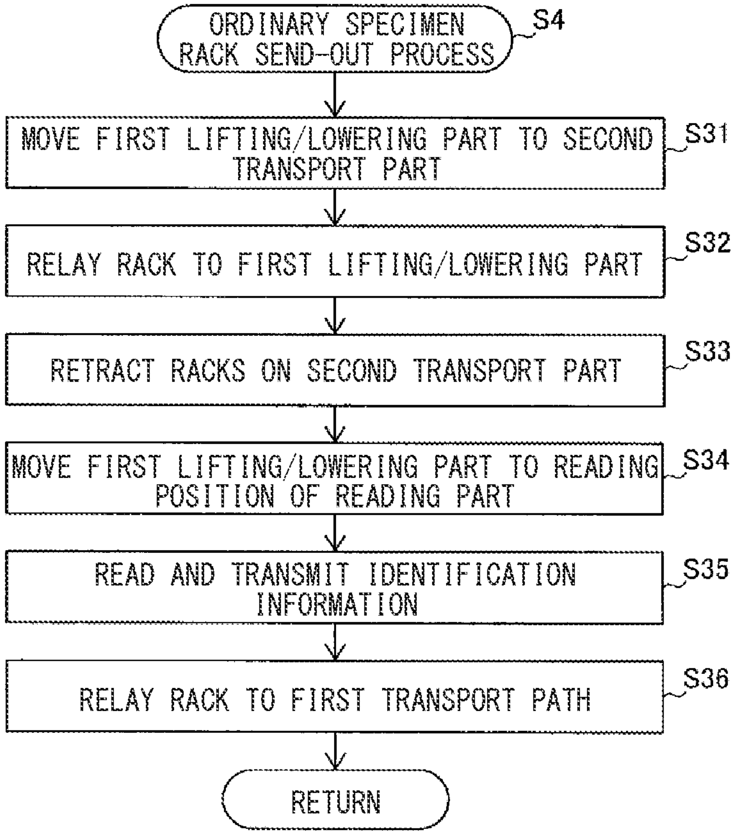
FIG. 37 is a flowchart for explaining an ordinary specimen rack send-out process.

Next, the ordinary specimen rack send-out process in step S4 in FIG. 35 will be described with reference to FIG. 37. The ordinary specimen rack send-out process is executed by the controller 211.

In step S31, the controller 211 controls the lifting/lowering drive part 73 to move the first lifting/lowering part 27 to the relay position P11 for the second transport part 22.

In step S32, the controller 211 controls the claw drive part 43*g* and the claw drive part 44*g* of the second transport part 22 to move the one-side claw 41 and the other-side claw 42 in the Y1 direction from the front end portion on the Y2 side. When the rack sensors 71*c* of the lifting/lowering placement part 71 have detected a specimen rack 2, the controller 211 causes the claw drive part 53*g* and the claw drive part 54*g* to stop performing the drive. Consequently, the specimen rack 2 is relayed from the second transport part 22 to the first lifting/lowering part 27. When the rack sensors 71*c* have not detected any specimen rack 2 even at the time of the relaying operation, the controller 211 performs a predetermined error process.

In step S33, the controller 211 actuates the rack returning mechanism 47. Consequently, when a plurality of specimen racks 2 are set on the second transport part 22, the second and subsequent specimen racks 2 other than the specimen rack 2 at the head that has been relayed to the first lifting/lowering part 27 are returned in the Y2 direction by the predetermined safety distance by the pair of claws 47*a* of the rack returning mechanism 47. When the rear-end sensor 46 has not detected a second specimen rack 2 even at the time of actuating the rack returning mechanism 47, the controller 211 performs a predetermined error process.

The process from step S34 to step S36 is the same as the process from step S23 to step S25 in the urgent specimen rack send-out process, and thus, will not be described.

Through the above steps, the ordinary specimen rack send-out process is completed, and the process is returned to step S5 and the subsequent steps.

(Rack Collection Process)

Figure 38:
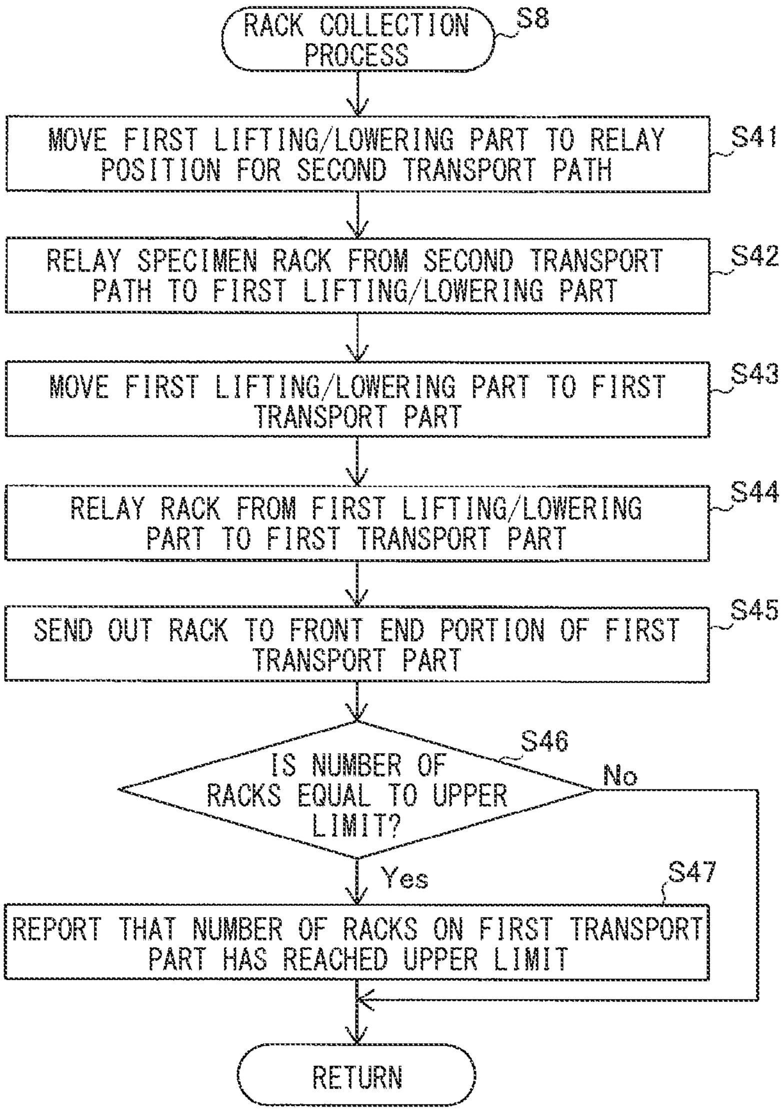
FIG. 38 is a flowchart for explaining a rack collection process.

Next, the rack collection process in step S8 in FIG. 35 will be described with reference to FIG. 38. The rack collection process is executed by the controller 211.

In step S41, the controller 211 controls the lifting/lowering drive part 73 to move the first lifting/lowering part 27 to the relay position P13 for the second transport path 32.

In step S42, the controller 211 controls the second transport path 32 to transport the specimen rack 2 on the second transport path 32 in the X1 direction onto the first lifting/lowering part 27. When the rack sensors 71*c* of the lifting/lowering placement part 71 have detected the specimen rack 2, the controller 211 stops operation of the second transport path 32. Consequently, the specimen rack 2 is relayed from the second transport path 32 to the first lifting/lowering part 27. When the rack sensors 71*c* have not detected any specimen rack 2 even at the time of the relaying operation, the controller 211 performs a predetermined error process.

In step S43, the controller 211 controls the lifting/lowering drive part 73 to move the first lifting/lowering part 27 to the relay position P14 for the first transport part 21.

In step S44, the controller 211 controls the collection drive part 56*d* of the sending mechanism 56 to move the specimen rack 2 from the first lifting/lowering part 27 to the first transport part 21. Consequently, the specimen rack 2 is relayed from the first lifting/lowering part 27 to the first transport part 21. When the specimen rack 2 is still being detected by the rack sensors 71*c* even after the operation of the sending mechanism 56, the controller 211 performs a predetermined error process.

In step S45, the controller 211 controls the claw drive part 53*g* and the claw drive part 54*g* of the first transport part 21 to move the one-side claw 51 and the other-side claw 52 in the Y2 direction from the origin positions on the Y1 side. Consequently, the specimen rack 2 is transported toward the front end portion of the first transport part 21 from the position to which the specimen rack 2 has been sent by the sending mechanism 56.

The first transport part 21 transports, in the Y2 direction, the specimen rack 2 having been sent this time. When the specimen rack 2 is pressed against the contact member 55*a* and the arrival detector 55 has detected the movement of the contact member 55*a*, the controller 211 causes the claw drive part 53*g* and the claw drive part 54*g* to stop performing the drive. When the arrival detector 55 has not detected any movement of the contact member 55*a* even at the time of the drive by the claw drive part 53*g* and the claw drive part 54*g*, the controller 211 performs a predetermined error process.

The controller 211 obtains the amount of drive, by the claw drive part 53*g* and the claw drive part 54*g*, from the origin positions to the positions at which the arrival detector 55 has detected the movement. The controller 211 obtains the number of the specimen racks 2 stored on the first transport part 21 on the basis of the obtained amount of drive.

In step S46, the controller 211 determines whether or not the obtained number of the specimen racks 2 is equal to a preset upper limit value. When the number of the specimen racks 2 stored on the first transport part 21 has not reached the upper limit value, the rack collection process is ended, and the present time of transport process for the specimen rack 2 is ended.

Meanwhile, when the number of the specimen racks 2 stored on the first transport part 21 has reached the upper limit value, the controller 211 advances the process to step S47. In step S47, the controller 211 causes the communication section 212 to report, to the analysis unit 400, that the number of the specimen racks 2 stored on the first transport part 21 has reached the upper limit value. Then, the controller 211 ends the rack collection process.

When receiving the report that the number of the specimen racks 2 has reached the upper limit value, the analysis unit 400 causes the display section to display, for example, notice information that prompts execution of work of taking out specimen racks 2 from the first transport part 21. Consequently, a user can ascertain, from the display screen of the analysis unit 400, that specimen racks 2 need to be taken out from the first transport part 21.

(Specimen Measurement Process)

Figure 39:
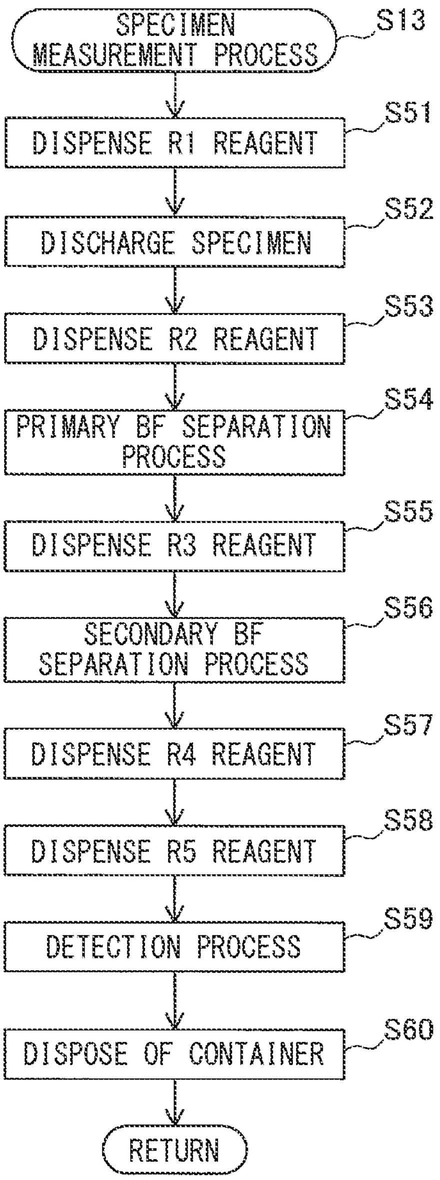
FIG. 39 is a flowchart for explaining a specimen measurement process.
Figure 40:
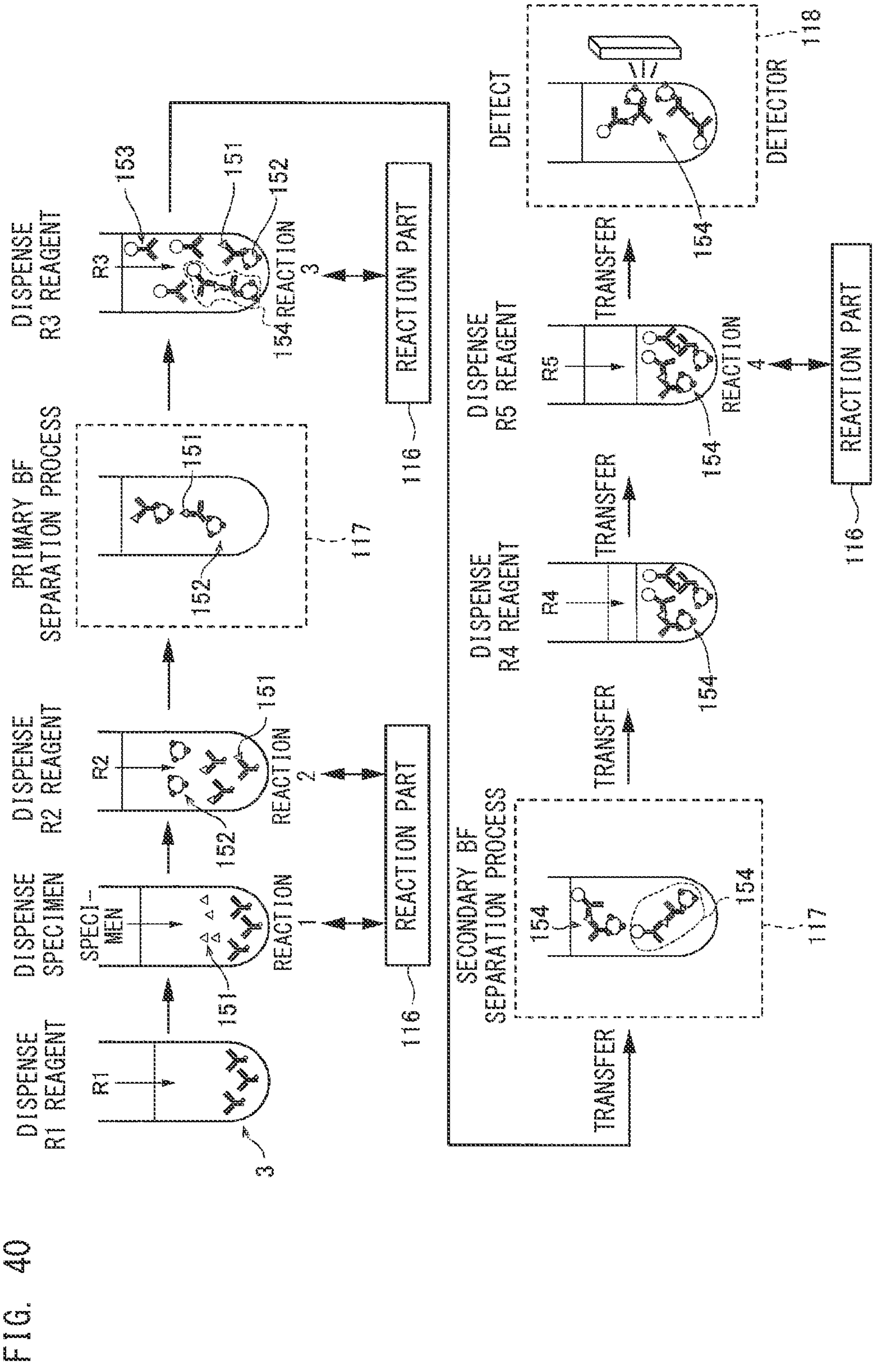
FIG. 40 is a diagram for explaining a flow of specimen measurement.

Next, the specimen measurement process in step S13 in FIG. 35 will be described with reference to FIG. 39 and FIG. 40. The specimen measurement process is executed by the controller 211. An example in which an analyte 151 contained in a specimen is a hepatitis B surface antigen (HBsAg) will be described as an example of immunoassay.

In step S51, the controller 211 performs control in which the R1 reagent is dispensed into a container 3. The controller 211 performs control in which: the container transfer part 112 is caused to transfer a container 3 to the R1 reagent dispensing position P33*a*; and the first reagent dispensing part 114*a* is caused to dispense the R1 reagent into the container 3.

In step S52, the controller 211 performs control in which a specimen is discharged into the container 3. The controller 211 causes the container transfer part 112 to transfer the container 3 to the specimen dispensing position P31. The controller 211 causes the specimen dispensing part 111 having suctioned a specimen in step S12 to: rotate to the specimen dispensing position P31; and discharge the suctioned specimen into the container 3 at the specimen dispensing position P31. As shown in FIG. 40, the R1 reagent contains a capture substance which is reacted with and bound to the analyte 151 in the specimen. The capture substance is, for example, an antibody modified with biotin (biotin antibody).

In step S53, the controller 211 performs control in which: the container transfer part 112 is caused to transfer the container 3 to the R2 reagent dispensing position P33*b*; and the second reagent dispensing part 114*b* is caused to dispense the R2 reagent into the container 3. After the R2 reagent is dispensed, the controller 211 causes the container transfer part 112 to transfer the container 3 to the reaction part 116. The controller 211 causes the reaction part 116 to heat the container 3 for a predetermined time. As shown in FIG. 40, the R2 reagent contains magnetic particles 152 to be bound to the capture substance. The magnetic particles 152 are, for example, magnetic particles in which streptavidin to be bound to biotin has been immobilized (StAvi-bound magnetic particles). As a result of the heating, the analyte 151 and the capture substance are bound to each of the magnetic particles 152.

In step S54, the controller 211 controls the BF separation part 117 to perform a primary BF separation process. First, the controller 211 causes the container transfer part 112 to transfer the container 3 to the BF separation part 117. The BF separation part 117 is controlled to perform the primary BF separation process on the sample in the container 3. As shown in FIG. 40, unnecessary components such as an unreacted capture substance are removed from inside the container 3 through the primary BF separation process.

In step S55, the controller 211 performs control in which: the container transfer part 112 is caused to transfer the container 3 to the R3 reagent dispensing position P33*c*; and the third reagent dispensing part 114*c* is caused to dispense the R3 reagent into the container 3. After the R3 reagent is dispensed, the controller 211 causes the container transfer part 112 to transfer the container 3 to the reaction part 116.

The controller 211 causes the reaction part 116 to heat the container 3 for a predetermined time. As shown in FIG. 40, the R3 reagent contains a labeled substance 153 which is reacted with and bound to the analyte 151. The labeled substance 153 is, for example, an alkaline phosphatase (ALP) labeled antibody. As a result of the heating, an immune complex 154 including the analyte 151, the labeled substance 153, and the capture substance is formed on the magnetic particle 152.

In step S56, the controller 211 controls the BF separation part 117 to perform a secondary BF separation process. First, the controller 211 causes the container transfer part 112 to transfer the container 3 to the BF separation part 117. The BF separation part 117 is controlled to perform the secondary BF separation process on the sample in the container 3. As shown in FIG. 40, unnecessary components such as an unreacted labeled substance 153 are removed from inside the container 3 through the secondary BF separation process.

In step S57, the controller 211 performs control in which the R4 reagent is dispensed into the container 3. The controller 211 causes the container transfer part 112 to transfer the container 3 to the fourth reagent dispensing part **114*d* and causes the fourth reagent dispensing part 114*d* to dispense the R4 reagent into the container 3. The R4 reagent contains a buffer solution. The immune complexes 154 bound to the magnetic particles 152 in the container 3** are dispersed in the buffer solution.

In step S58, the controller 211 performs control in which the R5 reagent is dispensed into the container 3. The controller 211 causes the container transfer part 112 to transfer the container 3 to the fifth reagent dispensing part **114*e* and causes the fifth reagent dispensing part 114*e* to dispense the R5 reagent into the container 3. After the R5 reagent is dispensed, the controller 211 causes the container transfer part 112 to transfer the container 3 to the reaction part 116. The controller 211 causes the reaction part 116 to heat the container 3 for a predetermined time. As shown in FIG. 40, the R5 reagent contains a chemiluminescent substrate. The buffer solution contained in the R4 reagent has a composition that promotes a reaction between the substrate and the label (enzyme) of the labeled substance 153 included in the immune complex 154**. The substrate is reacted with the label through the heating, whereby light is generated.

In step S59, the controller 211 performs control in which a process of detecting the immune complex 154 is performed. The controller 211 causes the container transfer part 112 to transfer the container 3 to the detector 118. The controller 211 causes the detector 118 to measure the intensity of the light generated by reacting the substrate with the label. A detection signal from the detector 118 is outputted to the controller 211. The controller 211 transmits data of the detection signal from the detector 118 via the communication section 212 to the analysis unit 400.

After the detection is ended, the container transfer part 112 is controlled in step S60 to: take out the post-measurement container 3 from the detector 118; and dispose of the container 3 into a disposal port.

Through the above steps, the specimen measurement process by the measurement unit 10 is performed.

[Modifications]

The embodiment and examples disclosed herein are merely illustrative in all aspects and should not be considered as being restrictive. The scope of the present disclosure is defined not by the description of the above embodiment or examples but by the scope of the claims, and further includes meaning equivalent to the scope of the claims and all modifications within said scope.

(First Modification)

For example, in the above first embodiment, an example in which both a specimen rack 2 set on the third transport part 23 (interruption specimen setting part) and a specimen rack 2 set on the second transport part 22 (rack setting part) are transported to the first transport part 21 (rack collection part) after being subjected to specimen suction, has been described. Meanwhile, in a first modification, the specimen rack 2 set on the third transport part 23 may be returned to the third transport part 23 after being subjected to specimen suction.

Figure 41:
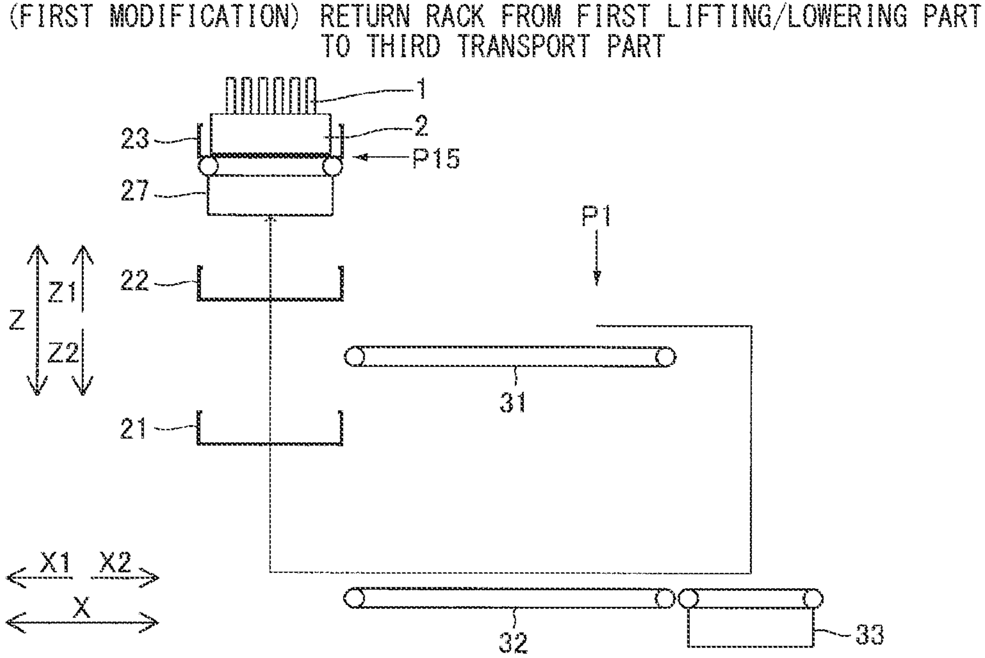
FIG. 41 is a schematic diagram for explaining a first modification.

As shown in FIG. 41, a specimen rack 2 with an urgent specimen, which has been subjected to specimen suction, being set is relayed from the second transport path 32 to the first lifting/lowering part 27, and then, in the first modification, the first lifting/lowering part 27 is moved to the relay position P15 for the third transport part 23.

At this time, as shown in FIG. 15, the arm part 63 is disposed at the relay position P15 for the first lifting/lowering part 27 in advance by the placement base drive part **61*b* in the third transport part 23. Thus, when the first lifting/lowering part 27 has arrived at the relay position P15, the specimen rack 2 on the first lifting/lowering part 27 is inserted through the inner side of the arm 64*a* of the arm part 63** from below.

Then, the third transport part 23 moves the arm part 63 in the Y2 direction by the placement base drive part **61*b*. Consequently, the specimen rack 2 is pushed by the bent portions 64*a*4 and 64*a*5 (see FIG. 12) of the arm 64*a*, whereby the specimen rack 2 is relayed from the first lifting/lowering part 27 to the table part 62. Then, the third transport part 23 moves the arm part 63 in the Y2 direction to the origin position (shown in FIG. 13) at the front end portion by the placement base drive part 61*b***.

In this manner, in the first modification, the first lifting/lowering part 27 moves a specimen rack 2, received from the third transport part 23, to the relay position for the first transport path 31 (reading position P12 (see FIG. 24)) in order to transfer the specimen rack 2 to the first transport path 31 and moves a specimen rack 2, received from the second transport path 32, to the relay position P15 for the third transport part 23 in order to transfer the specimen rack 2 to the third transport part 23. Consequently, the specimen rack 2 with urgent specimens being set can be returned not to the first transport part 21 but to the third transport part 23. Therefore, a user can collect a specimen rack 2, for ordinary specimens, set on the first transport part 21 and a specimen rack 2 for urgent specimens from the specimen transport unit 20 while easily distinguishing these specimen racks 2 from each other.

(Second Modification)

Figure 42:
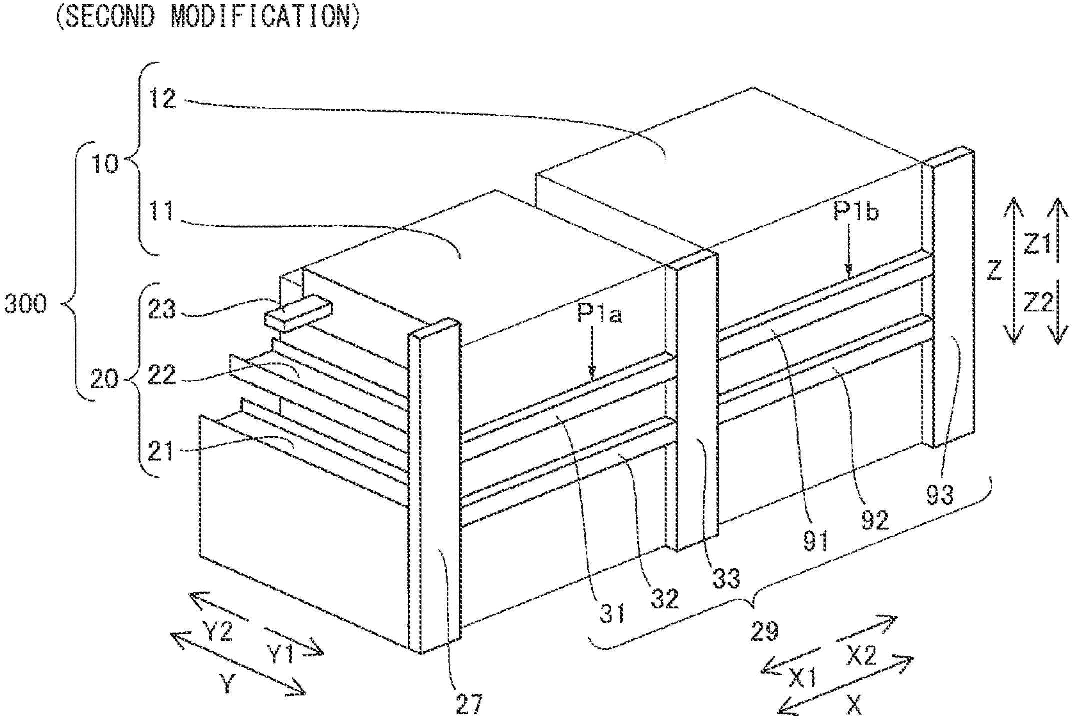
FIG. 42 is a schematic diagram for explaining a second modification.

In a second modification shown in FIG. 42, the measurement unit 10 includes: a first measurement unit 11 which suctions a specimen from a specimen container 1 and measures the suctioned specimen; and a second measurement unit 12 which suctions a specimen from a specimen container 1 and measures the suctioned specimen. That is, the specimen measurement apparatus 300 includes two measurement devices.

In one example, the first measurement unit 11 and the second measurement unit 12 are measurement devices identical to each other. In another example, the first measurement unit 11 and the second measurement unit 12 are different measurement devices, and some or all of measurement items to be measured by the first measurement unit 11 and measurement items to be measured by the second measurement unit 12 are different from each other.

The transport mechanism 29 can transport a specimen rack 2 with respect to a specimen suction position P1*a* of the first measurement unit 11 through the first transport path 31, the second transport path 32, and the second lifting/lowering part 33.

In the second modification, the transport mechanism 29 further includes: a third transport path 91 adjacent to the movement region of the second lifting/lowering part 33; a fourth transport path 92 disposed below the third transport path 91 and adjacent to the movement region of the second lifting/lowering part 33; and a third lifting/lowering part 93 which moves in the up-down direction and relays a specimen rack 2 between the third transport path 91 and the fourth transport path 92. A specimen suction position P1*b* of the second measurement unit 12 is set on the third transport path 91. The configurations of the third transport path 91, the fourth transport path 92, and the third lifting/lowering part 93 are substantially the same as the configurations of the first transport path 31, the second transport path 32, and the second lifting/lowering part 33, respectively.

The first measurement unit 11 is configured to suction a specimen from a specimen container 1 held by a specimen rack 2 on the first transport path 31, and the second measurement unit 12 is configured to suction a specimen from a specimen container 1 held by a specimen rack 2 on the third transport path 91.

Thus, a specimen rack 2 can be relayed between the first transport path 31 or the second transport path 32 and the third transport path 91 or the fourth transport path 92 via the second lifting/lowering part 33. Therefore, the first transport part 21, the second transport part 22, and the third transport part 23 do not need to be separately provided to each of the first measurement unit 11 and the second measurement unit 12. Consequently, even though a plurality of the measurement units 10 are provided, increase in installation area can be suppressed.

Figure 43:
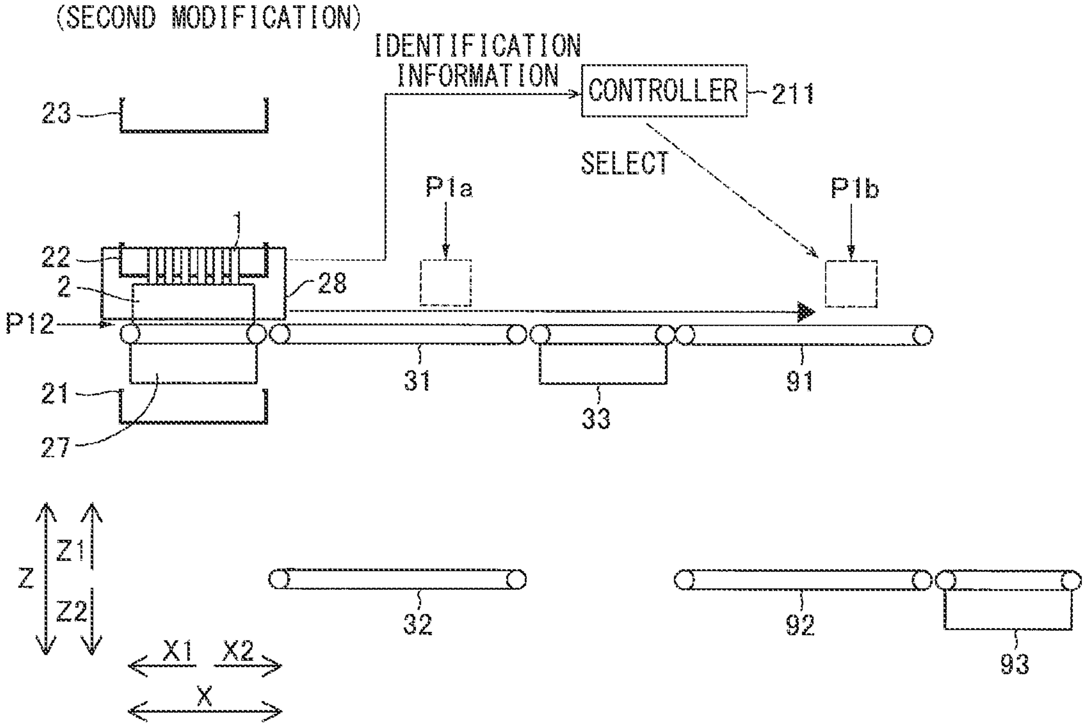
FIG. 43 is a schematic diagram for explaining selection of a transport destination for a specimen rack.

As shown in FIG. 43, in the second modification, the controller 211 performs control in which a supply destination for a specimen rack 2 is selected from the first measurement unit 11 and the second measurement unit 12 on the basis of identification information read by the reading part 28. Specifically, when a specimen rack 2 is relayed from the second transport part 22 or the third transport part 23 to the first lifting/lowering part 27 and then identification information about each of the specimen rack 2 and specimen containers 1 thereon is read by the reading part 28 at the reading position P12, the controller 211 transmits the read identification information to the analysis unit 400. The analysis unit 400 inquires of the host computer 500 about the identification information, obtains a measurement order corresponding to the identification information, and transmits the obtained measurement order to the controller 211. The controller 211 performs, on the basis of the obtained measurement order, selection as to whether the specimen rack 2 on the first lifting/lowering part 27 is to be transported to the specimen suction position P1*a* of the first measurement unit 11 or the specimen suction position P1*b* of the second measurement unit 12. The controller 211 performs control in which the specimen rack 2 is transported to the selected transport destination.

Consequently, the specimen rack 2 set on the second transport part 22 or the third transport part 23 can be transported to an appropriate supply destination out of the first measurement unit 11 and the second measurement unit 12 on the basis of the identification information.

Figure 44:
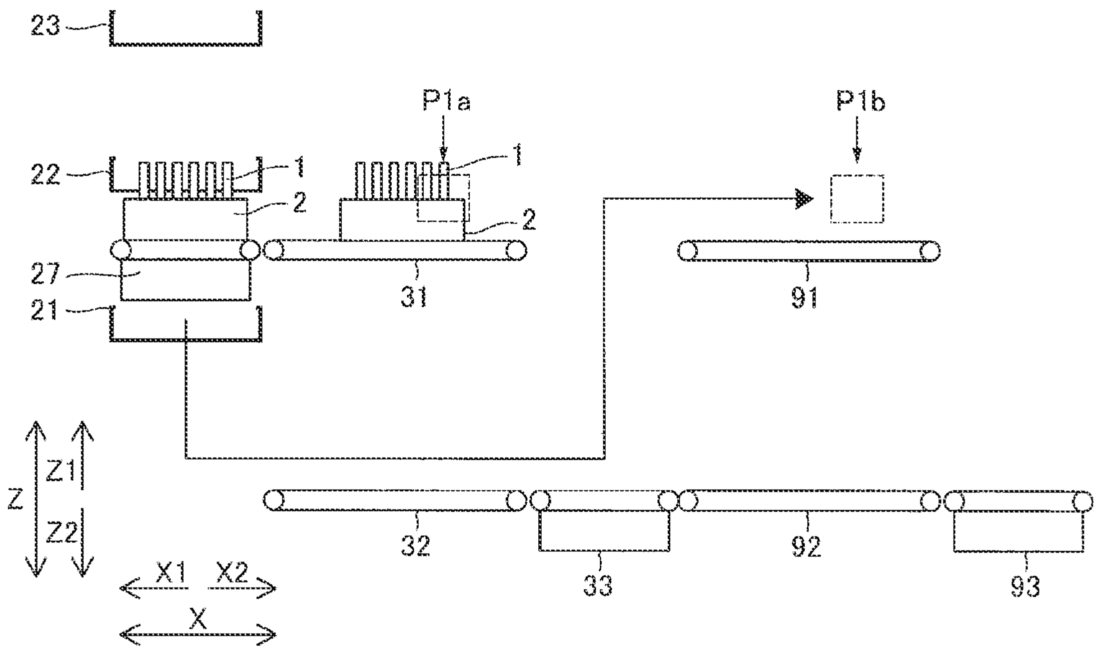
FIG. 44 is a schematic diagram for explaining a route for transporting a specimen rack.

In the second modification, while specimens are being suctioned by the first measurement unit 11 from specimen containers 1 held by a specimen rack 2 on the first transport path 31, another specimen rack 2 is transported to the third transport path 91 via the second transport path 32 and the second lifting/lowering part 33 as shown in FIG. 44. Consequently, specimens are suctioned by the second measurement unit 12 from specimen containers 1 held by the other specimen rack 2. Meanwhile, when specimens are not being suctioned on the first transport path 31 by the first measurement unit 11, the specimen rack 2 can be transported to the third transport path 91 via the first transport path 31 and the second lifting/lowering part 33 as shown in FIG. 43.

In the second modification in FIG. 42, the first transport part 21, the second transport part 22, and the third transport part 23 are provided so as to be adjacent to the X1-side side surface of the first measurement unit 11 on the X1 side out of the first measurement unit 11 and the second measurement unit 12 arrayed in the X direction. The positions of the first transport part 21, the second transport part 22, and the third transport part 23 are not limited to those in the example in FIG. 42.

(Third Modification)

Figure 45:
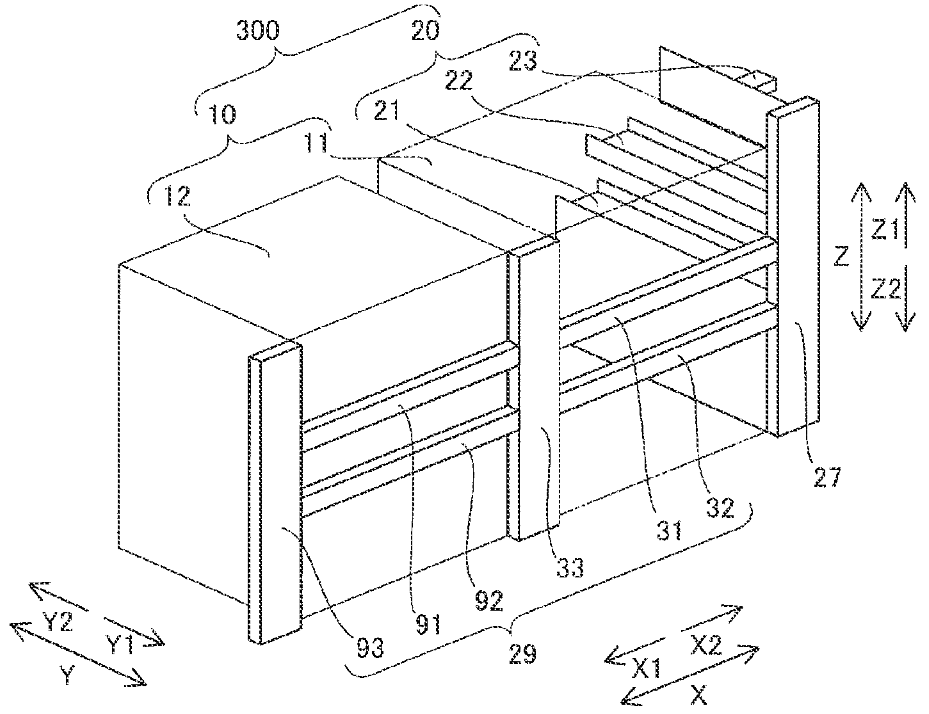
FIG. 45 is a schematic diagram for explaining a third modification.

In a third modification shown in FIG. 45, the first transport part 21, the second transport part 22, and the third transport part 23 are provided so as to be adjacent to the X2-side side surface of the first measurement unit 11 on the X2 side out of the first measurement unit 11 and the second measurement unit 12 arrayed in the X direction.

(Fourth Modification)

Figure 46:
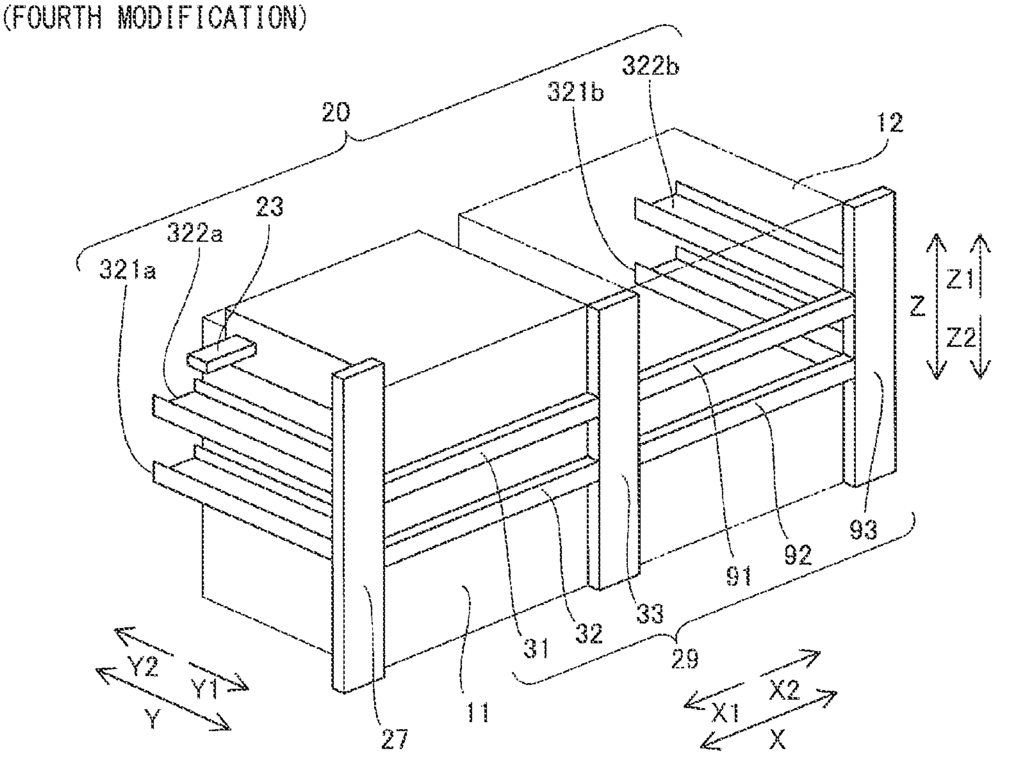
FIG. 46 is a schematic diagram for explaining a fourth modification.

In a fourth modification shown in FIG. 46, the specimen transport unit 20 includes two first transport parts 321*a* and 321*b*. Likewise, the specimen transport unit 20 includes two second transport parts 322*a* and 322*b*.

The third transport part 23, the first transport part 321*a*, and the second transport part 322*a* are arranged in the up-down direction on the X1 side relative to the first measurement unit 11. The first transport part 321*b* and the second transport part 322*b* are arranged in the up-down direction on the X2 side relative to the second measurement unit 12.

In the fourth modification, each of the first transport part 321*a* and the second transport part 322*a* on the X1 side is a rack setting part that allows a specimen rack 2 to be set thereon and that transports the specimen rack 2 having been set thereon toward either of the measurement units 10. Each of the first transport part 321*b* and the second transport part 322*b* on the X2 side is a rack collection part that collects a specimen rack 2 holding a specimen container 1 having been subjected to specimen suction by either of the measurement units 10. The third transport part 23 is an interruption specimen setting part.

In this manner, each pair of first and second transport parts arranged in the up-down direction may be configured as either rack setting parts or rack collection parts so as to perform the same function. In this case, the plurality of rack setting parts or the plurality of rack collection parts are arranged in the up-down direction, whereby the number of specimen racks 2 that can be set on the specimen transport unit 20 can be increased without increasing the installation area of the device. In the fourth modification, the number of specimen racks 2 that can be set and the number of specimen racks 2 that have been subjected to specimen suction and that can be stored, are respectively increased owing to the two rack setting parts (the first transport part 321*a* and the second transport part 322*a*) and the two rack collection parts (the first transport part 321*b* and the second transport part 322*b*), whereby more specimens can be measured through batch processing. That is, the frequencies of work of additionally setting specimen racks 2 and work of collecting specimen racks 2 can be decreased.

In the fourth modification, a specimen rack 2 relayed from any of the third transport part 23 and the two rack setting parts (the first transport part 321*a* and the second transport part 322*a*) to the first lifting/lowering part 27 is transported to either the specimen suction position, of the first measurement unit 11, on the first transport path 31 or the specimen suction position, of the second measurement unit 12, on the third transport path 91, and is subjected to specimen suction. The specimen rack 2 having been subjected to specimen suction is relayed to the third lifting/lowering part 93 and collected on either of the two rack collection parts (the first transport part 321*b* and the second transport part 322*b*).

In this manner, in the fourth modification, a user can collectively perform work of setting specimen racks 2, at the places of the three transport parts (the third transport part 23, the first transport part 321*a*, and the second transport part 322*a*) arranged upward/downward on the X1 side relative to the first measurement unit 11, and the user can collectively perform work of collecting specimen racks 2, at the places of the two transport parts (the first transport part 321*b* and the second transport part 322*b*) arranged upward/downward on the X2 side relative to the second measurement unit 12. Consequently, workability in setting work for specimen racks 2 can be improved.

(Fifth Modification)

Figure 47:
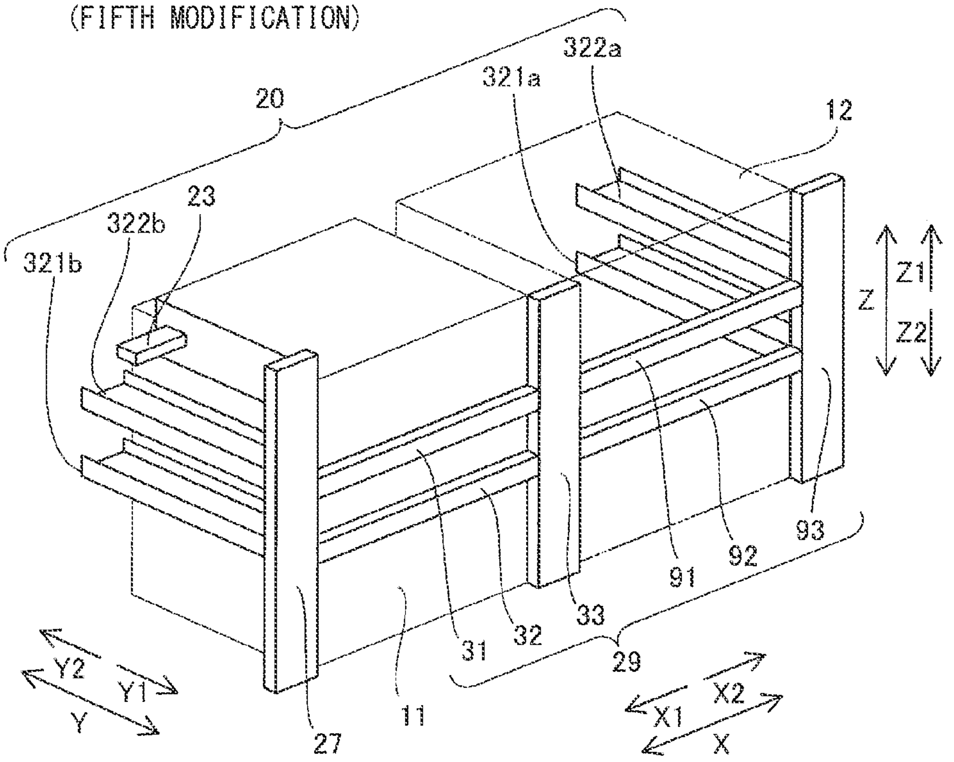
FIG. 47 is a schematic diagram for explaining a fifth modification.

In a fifth modification shown in FIG. 47, the positions of the rack setting parts and the positions of the rack collection parts differ from those in the above fourth modification.

The third transport part 23 and the two rack collection parts (the first transport part 321*b* and the second transport part 322*b*) are arranged in the up-down direction on the X1 side relative to the first measurement unit 11. The two rack setting parts (the first transport part 321*a* and the second transport part 322*a*) are arranged in the up-down direction on the X2 side relative to the second measurement unit 12.

(Sixth Modification)

Although an example in which three parts which are the first transport part 21, the second transport part 22, and the third transport part 23 are arranged upward/downward has been described in the above embodiment, the present disclosure is not limited to this example.

Figure 48:
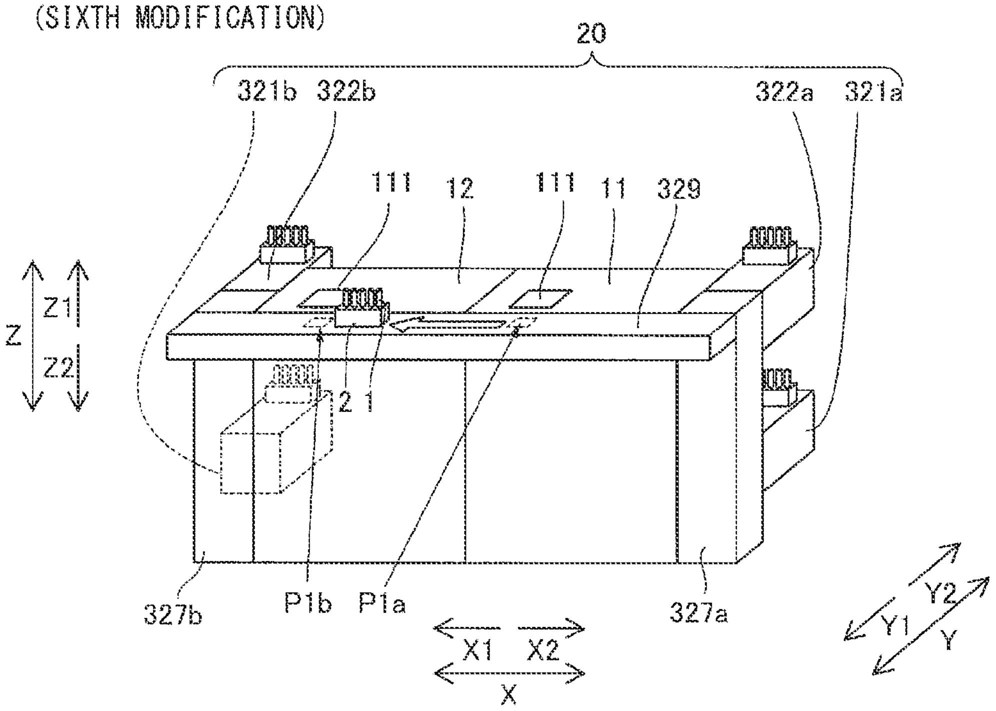
FIG. 48 is a schematic diagram for explaining a sixth modification.

In a sixth modification shown in FIG. 48, the specimen transport unit 20 includes the two first transport parts 321*a* and 321*b* and the two second transport parts 322*a* and 322*b*. However, in the sixth modification, the third transport part 23 corresponding to the third layer is not provided.

The first transport part 321*a* and the second transport part 322*a* are arranged in the up-down direction so as to each be adjacent to the X2-side side surface of the first measurement unit 11. Consequently, a first unit is formed to have a layered structure composed of two layers in which the second transport part 322*a* is disposed above the first transport part 321*a*. In the sixth modification, the first transport part 321*a* is a rack setting part, and the second transport part 322*a* is an interruption specimen setting part.

Further, the first transport part 321*b* and the second transport part 322*b* are arranged in the up-down direction so as to each be adjacent to the X1-side side surface of the second measurement unit 12. Consequently, a second unit is formed to have a layered structure composed of two layers in which the second transport part 322*b* is disposed above the first transport part 321*b*. In the sixth modification, both the first transport part 321*b* and the second transport part 322*b* are rack collection parts.

A rack lifting/lowering part 327*a* is provided to end portions in the Y1 direction of the first transport part 321*a* and the second transport part 322*a*. A rack lifting/lowering part 327*b* is provided to end portions in the Y1 direction of the first transport part 321*b* and the second transport part 322*b*. In addition, a linear rack transport path 329 is provided so as to extend in the X1 direction from the rack lifting/lowering part 327*a* via the specimen suction positions P1*a* and P1*b* of the first measurement unit 11 and the second measurement unit 12 to the rack lifting/lowering part 327*b*.

The rack lifting/lowering part 327*a* is configured to: move in the up-down direction to the height position of either of the first transport part 321*a* and the second transport part 322*a*, to receive a specimen rack 2; and move in the up-down direction to the height position of the rack transport path 329, to send out the specimen rack 2 onto the rack transport path 329.

The rack lifting/lowering part 327*b* is configured to: move in the up-down direction to the height position of the rack transport path 329, to receive the specimen rack 2 from the rack transport path 329; and move in the up-down direction to the height position of either of the first transport part 321*b* and the second transport part 322*b*, to relay the specimen rack 2 to said transport part out of the first transport part 321*b* and the second transport part 322*b*.

Alternatively, the first transport part 321*a* and the second transport part 322*a* of the first unit may be configured as a rack collection part and an interruption specimen setting part, and the first transport part 321*b* and the second transport part 322*b* of the second unit may be configured as a rack collection part and a rack setting part.

(Seventh Modification)

In the above embodiment and the above modifications, examples in which the lifting/lowering parts for moving specimen racks 2 in the up-down direction such as the first lifting/lowering part 27, the second lifting/lowering part 33, the third lifting/lowering part 93, the rack lifting/lowering part 327*a*, and the rack lifting/lowering part 327*b* are provided, have been described. Meanwhile, as in a seventh modification shown in FIG. 49, the lifting/lowering parts do not have to be provided.

Figure 49:
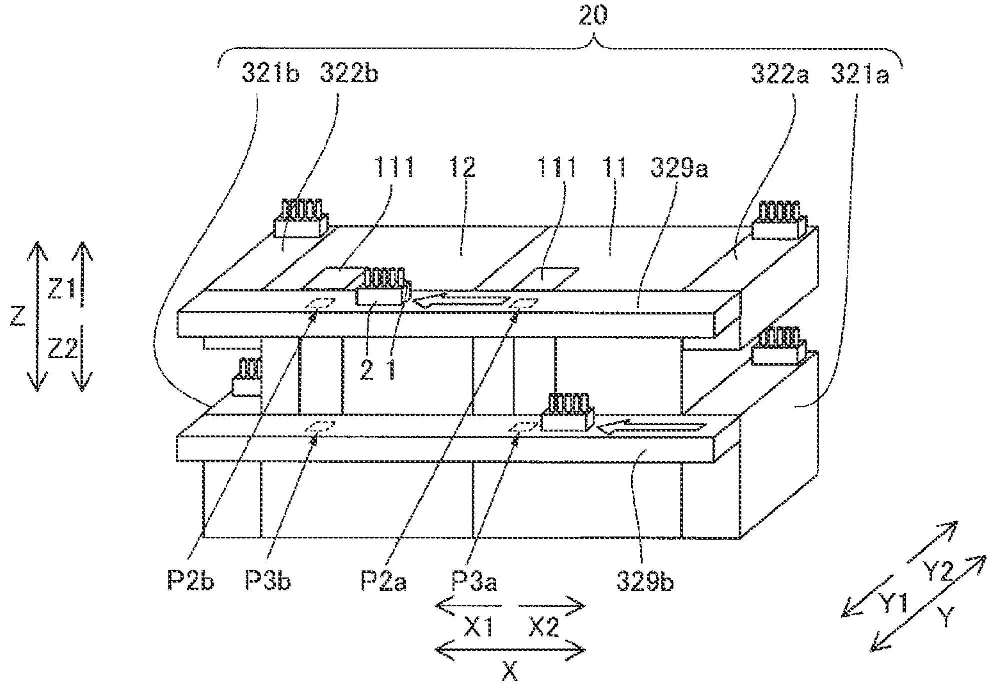
FIG. 49 is a schematic diagram for explaining a seventh modification.

In the seventh modification shown in FIG. 49, the first transport part 321*a* and the second transport part 322*a* are disposed on the X2 side relative to the first measurement unit 11 and the second measurement unit 12, and the first transport part 321*b* and the second transport part 322*b* are disposed on the X1 side relative to the first measurement unit 11 and the second measurement unit 12. The first transport part 321*a* and the second transport part 322*a* are respectively a rack setting part and an interruption specimen setting part, and both the first transport part 321*b* and the second transport part 322*b* are rack collection parts.

An upper-side transport path 329*a* on the upper stage is provided so as to extend on and between the second transport part 322*a* and the second transport part 322*b* on the upper stage. A lower-side transport path 329*b* on the lower stage is provided below the upper-side transport path 329*a* so as to extend on and between the first transport part 321*a* and the first transport part 321*b* on the lower stage.

The upper-side transport path 329*a* extends in the X1 direction from the Y1-side end portion of the second transport part 322*a* via upper-side suction positions P2*a* and P2*b* of the first measurement unit 11 and the second measurement unit 12 to the Y1-side end portion of the second transport part 322*b*.

The lower-side transport path 329*b* extends in the X1 direction from the Y1-side end portion of the first transport part 321*a* via lower-side suction positions P3*a* and P3*b* of the first measurement unit 11 and the second measurement unit 12 to the Y1-side end portion of the first transport part 321*b*.

The first measurement unit 11 can suction a specimen from a specimen container 1 at each of the upper-side suction position P2*a* and the lower-side suction position P3*a* by moving the specimen dispensing part 111 in the up-down direction. The second measurement unit 12 can suction a specimen from a specimen container 1 at each of the upper-side suction position P2*b* and the lower-side suction position P3*b* by moving the specimen dispensing part 111 in the up-down direction.

Consequently, a specimen rack 2 set on the second transport part 322*a* is subjected to specimen suction at the upper-side suction position P2*a* or P2*b* and transported to the second transport part 322*b* through the upper-side transport path 329*a* on the upper stage. Meanwhile, a specimen rack 2 set on the first transport part 321*a* is subjected to specimen suction at the lower-side suction position P3*a* or P3*b* and transported to the first transport part 321*b* through the lower-side transport path 329*b* on the lower stage.

Although a layered structure composed of two layers in which the first transport part and the second transport part are arranged in the up-down direction or a layered structure composed of three layers in which the first transport part, the second transport part, and the third transport part are arranged in the up-down direction has been described in each of the above embodiment and the above modifications, a layered structure composed of four or more layers may be formed.

Although each of the first transport part 21 and the second transport part 22 in the above embodiment is configured to transport a specimen rack 2 in the short-side direction of the specimen rack 2 and allow the specimen rack 2 to be taken out therefrom or set thereon in the long-side direction of the specimen rack 2 by a user, each of the first transport part 21 and the second transport part 22 may be configured to transport a specimen rack 2 in the long-side direction of the specimen rack 2 and allow the specimen rack 2 to be taken out therefrom or set thereon in the short-side direction of the specimen rack 2 by the user.

Although each of the first transport part 21 and the second transport part 22 in the above embodiment is configured to transport a specimen rack 2 in the short-side direction of the specimen rack 2 and allow the specimen rack 2 to be taken out therefrom or set thereon in the long-side direction of the specimen rack 2 by the user, the X1-side side surface of each of the first transport part 21 and the second transport part 22 may be covered by the cover part over the entire length in the Y direction of the X1-side side surface. Even in this case, the specimen rack 2 can be taken out from or set on the front end portion (Y2-side end portion) of each of the first transport part 21 and the second transport part 22 by the user.

Although the first transport part 21, the second transport part 22, and the third transport part 23 are arranged in this order from the lower side in the above embodiment, the order of arrangement is not limited thereto. In addition, although the first transport part 21, the second transport part 22, and the third transport part 23 are such that the front end portion of the first transport part 21 is closest to the Y2 side, the front end portion of the third transport part 23 is closest to the Y1 side, and the second transport part 22 is located therebetween in the above embodiment, the relationship in arrangement thereof is not limited thereto, and at least two of the front end portion of the first transport part 21, the front end portion of the second transport part 22, and the front end portion of the third transport part 23 only have to be located so as to be shifted from each other in the front-rear direction.

Although an example in which the measurement unit 10 is an immunoassay device for detecting an analyte in a specimen by utilizing an antigen-antibody reaction has been described in each of the above embodiment and the above modifications, the measurement unit 10 may be another type of device such as a biochemical measurement device, a blood coagulation measurement device, a urine analyzer, or a blood cell counter.

Remarks

The present disclosure includes the following items 1-18.

Item 1: A specimen measurement apparatus comprising:

- a measurement unit configured to suction a specimen from a specimen container and measure the suctioned specimen; and
- a specimen transport unit configured to transport the specimen container to the measurement unit, wherein
- the specimen transport unit includes
  - a first transport part including a first placement surface configured to allow a specimen rack to be placed thereon, the first transport part being configured to transport a plurality of the specimen racks, each holding the specimen container, on the first placement surface, and
  - a second transport part disposed above the first transport part and including a second placement surface configured to allow the specimen rack to be placed thereon, the second transport part being configured to transport a plurality of the specimen racks on the second placement surface, and
- at least one of the first transport part and the second transport part is configured to allow the specimen rack to be taken out therefrom or set thereon by a user in a state where the first placement surface and the second placement surface are located at predetermined positions for transporting the specimen rack.

Item 2: The specimen measurement apparatus of item 1, wherein

- each of the first transport part and the second transport part is configured to transport the specimen rack in a short-side direction of the specimen rack, and
- at least the first transport part out of the first transport part and the second transport part is configured to allow the specimen rack to be taken out therefrom or set thereon in a long-side direction of the specimen rack by the user in the state where the first placement surface and the second placement surface are located at the predetermined positions.

Item 3: The specimen measurement apparatus of item 2, wherein

- each of the first transport part and the second transport part is configured to allow the specimen rack to be taken out therefrom or set thereon in the long-side direction of the specimen rack by the user in the state where the first placement surface and the second placement surface are located at the predetermined positions.

Item 4: The specimen measurement apparatus of item 2, wherein

- each of the first transport part and the second transport part has a pair of side surfaces extending along the short-side direction, and the specimen transport unit further includes a cover part covering the specimen transport unit such that at least a portion of a range, of at least one of the pair of side surfaces of the first transport part, that corresponds to a rack storing region on the first placement surface is exposed to outside.

Item 5: The specimen measurement apparatus of item 4, wherein the rack storing region extends along the short-side direction such that the plurality of the specimen racks can be set side-by-side in the short-side direction, and the cover part is provided such that the rack storing region of the first transport part is exposed over an entire length of the rack storing region in the short-side direction.

Item 6: The specimen measurement apparatus of item 4, wherein the measurement unit has a front surface, a rear surface, and a pair of side surfaces, the first transport part and the second transport part are provided along a front-rear direction, of the measurement unit, which is the short-side direction so as to be side-by-side with one of the pair of side surfaces of the measurement unit, and the cover part is provided such that, in the rack storing region of the first transport part, one side surface on the measurement unit side out of the side surfaces of the first transport part is covered and at least a portion of another side surface on an opposite side to the measurement unit out of the side surfaces of the first transport part is exposed.

Item 7: The specimen measurement apparatus of item 6, wherein the cover part is provided such that front end portions of the rack storing region of the first transport part and a rack storing region of the second transport part are also exposed.

Item 8: The specimen measurement apparatus of item 6, wherein a front end portion of the second transport part is located on a rear side relative to a front end portion of the first transport part, and the cover part is provided such that, within a range in the front-rear direction between the front end portion of the first transport part and the front end portion of the second transport part, an upper side relative to the first transport part is uncovered and exposed.

Item 9: The specimen measurement apparatus of item 8, wherein the specimen transport unit further includes a third transport part disposed above the second transport part, a front end portion of the third transport part is located on the rear side relative to the front end portion of the second transport part, and the cover part is provided such that, within a range in the front-rear direction between the front end portion of the second transport part and the front end portion of the third transport part, an upper side relative to the second transport part is uncovered and exposed.

Item 10: The specimen measurement apparatus of item 9, wherein the first transport part is a rack collection part configured to collect the specimen rack holding the specimen container having been subjected to specimen suction by the measurement unit, the second transport part is a rack setting part configured to allow the specimen rack to be set thereon, the specimen rack not having been subjected to specimen suction by the measurement unit, and the third transport part is an interruption specimen setting part configured to allow the specimen rack to be set thereon, the interruption specimen setting part being further configured to transport the specimen rack having been set thereon toward the measurement unit in preference to the rack setting part.

Item 11: The specimen measurement apparatus of item 1, wherein the specimen transport unit further includes a first lifting/lowering part configured to move in an up-down direction between the first transport part and the second transport part and receive the specimen rack.

Item 12: The specimen measurement apparatus of item 11, wherein the specimen transport unit further includes a transport mechanism configured to receive the specimen rack from the first lifting/lowering part, transport the specimen rack to a specimen suction position, and transport the specimen rack having been subjected to specimen suction to the first lifting/lowering part, and the transport mechanism includes a first transport path adjacent to a movement region of the first lifting/lowering part, a second transport path disposed below the first transport path and adjacent to the movement region of the first lifting/lowering part, and a second lifting/lowering part configured to relay the specimen rack between the first transport path and the second transport path.

Item 13: The specimen measurement apparatus of item 12, wherein the first transport part and the second transport part are disposed at height positions different from each of height positions of the first transport path and the second transport path.

Item 14: The specimen measurement apparatus of item 1, wherein one of the first transport part and the second transport part is a rack setting part configured to allow the specimen rack to be set thereon, the specimen rack not having been subjected to specimen suction by the measurement unit, and another one of the first transport part and the second transport part is a rack collection part configured to collect the specimen rack holding the specimen container having been subjected to specimen suction by the measurement unit.

Item 15: The specimen measurement apparatus of item 14, wherein the first transport part is the rack collection part, and the second transport part is the rack setting part.

Item 16: The specimen measurement apparatus of item 1, wherein each of the first transport part and the second transport part is either of a rack setting part configured to allow the specimen rack to be set thereon, the specimen rack not having been subjected to specimen suction by the measurement unit, and a rack collection part configured to collect the specimen rack holding the specimen container having been subjected to specimen suction by the measurement unit.

Item 17: The specimen measurement apparatus of item 1, wherein each of the first transport part and the second transport part has a single transport lane on which the specimen rack is transported.

Item 18: A specimen transport device configured to transport a specimen container to a measurement device configured to suction a specimen from the specimen container, the measurement device being further configured to measure the suctioned specimen, the specimen transport device comprising:

a first transport part including a first placement surface configured to allow a specimen rack to be placed thereon, the first transport part being configured to transport a plurality of the specimen racks, each holding the specimen container, on the first placement surface; and a second transport part disposed above the first transport part and including a second placement surface configured to allow the specimen rack to be placed thereon, the second transport part being configured to transport a plurality of the specimen racks on the second placement surface, wherein at least one of the first transport part and the second transport part is configured to allow the specimen rack to be taken out therefrom or set thereon by a user in a state where the first placement surface and the second placement surface are located at predetermined positions for transporting the specimen rack.

What is claimed is:

1. A specimen measurement apparatus comprising:

a measurement unit comprising:

a specimen dispenser comprising a first pipette and a first pump to suction a specimen from a specimen container and discharge the suctioned specimen into a reaction container, a reagent dispenser comprising a second pipette and a second pump to suction a reagent from a reagent container and discharge the suctioned reagent into the reaction container in which the specimen is discharged, and a detector configured to sense a light from a mixture of the specimen and the reagent in the reaction container to measure the suctioned specimen; and a specimen transport unit configured to transport the specimen container to the measurement unit, wherein the specimen transport unit includes a transport device having a transport surface thereon, a first transport part including a first placement surface configured to allow a plurality of specimen racks to be placed side-by-side along a short-side direction of the specimen rack thereon, the first transport part being configured to transport the plurality of the specimen racks, each holding the specimen container, on the first placement surface in the short-side direction of the specimen rack, wherein the first placement surface is located at a first fixed position at which the specimen racks can be relayed between the transport surface and the first placement surface, and a second transport part disposed above the first transport part and including a second placement surface configured to allow the plurality of specimen racks to be placed side-by-side along the short-side direction of the specimen rack thereon, the second transport part being configured to transport the plurality of the specimen racks on the second placement surface in the short-side direction of the specimen rack, wherein the second placement surface is located at a second fixed position at which the specimen racks can be relayed between the transport surface and the second placement surface, and the first transport part is configured to allow the specimen rack to be taken out therefrom or set thereon in a long-side direction of the specimen rack by a user, wherein a height range between the first placement surface and a lower surface of the second transport part is a rack storing region in which the plurality of specimen racks are placed, and the rack storing region is exposed to outside of the specimen transport unit through an exposed portion in the long-side direction of the specimen rack.

2. The specimen measurement apparatus of claim 1, wherein the second transport part is configured to allow the specimen rack to be taken out therefrom or set thereon in the long-side direction of the specimen rack by the user.

3. The specimen measurement apparatus of claim 1, wherein each of the first transport part and the second transport part has a pair of side surfaces extending along the short-side direction, and the specimen transport unit further includes a cover part covering the specimen transport unit such that at least a portion of a range, of at least one of the pair of side surfaces of the first transport part, that corresponds to the rack storing region on the first placement surface is exposed to outside of the specimen transport unit through the exposed portion in the long-side direction of the specimen rack.

4. The specimen measurement apparatus of claim 3, wherein the cover part is provided such that the rack storing region of the first transport part is exposed over an entire length of the rack storing region in the short-side direction.

5. The specimen measurement apparatus of claim 3, wherein the measurement unit has a front surface, a rear surface, and a pair of side surfaces, the first transport part and the second transport part are provided along a front-rear direction, of the measurement unit, which is the short-side direction so as to be side-by-side with one of the pair of side surfaces of the measurement unit, and the cover part is provided such that, in the rack storing region of the first transport part, one side surface on the measurement unit side out of the side surfaces of the first transport part is covered and at least a portion of another side surface on an opposite side to the measurement unit out of the side surfaces of the first transport part is exposed.

6. The specimen measurement apparatus of claim 5, wherein the cover part is provided such that front end portions of the rack storing region of the first transport part and a rack storing region of the second transport part are also exposed.

7. The specimen measurement apparatus of claim 5, wherein a front end portion of the second transport part is located on a rear side relative to a front end portion of the first transport part, and the cover part is provided such that, within a range in the front-rear direction between the front end portion of the first transport part and the front end portion of the second transport part, an upper side relative to the first transport part is uncovered and exposed.

8. The specimen measurement apparatus of claim 7, wherein the specimen transport unit further includes a third transport part disposed above the second transport part, a front end portion of the third transport part is located on the rear side relative to the front end portion of the second transport part, and the cover part is provided such that, within a range in the front-rear direction between the front end portion of the second transport part and the front end portion of the third transport part, an upper side relative to the second transport part is uncovered and exposed.

9. The specimen measurement apparatus of claim 8, wherein the first transport part is a rack collection part configured to collect the specimen rack holding the specimen container having undergone specimen suction by the measurement unit, the second transport part is a rack setting part configured to allow the specimen rack to be set thereon, the specimen rack before undergoing the specimen suction by the measurement unit, and the third transport part is an interruption specimen setting part configured to allow the specimen rack to be set thereon, the interruption specimen setting part being further configured to transport the specimen rack having been set thereon toward the measurement unit in preference to the rack setting part.

10. The specimen measurement apparatus of claim 1, wherein the transport device includes a first lifting/lowering part having the transport surface thereon and configured to move in an up-down direction between the first transport part and the second transport part and receive the specimen rack, wherein the first placement surface is located at the first fixed position at which the specimen racks can be relayed between the transport surface of the first lifting/lowering part moved to the first transport part and the first placement surface, the second placement surface is located at the second fixed position at which the specimen racks can be relayed between the transport surface of the first lifting/lowering part moved to the second transport part and the second placement surface.

11. The specimen measurement apparatus of claim 10, wherein the specimen transport unit further includes a transport mechanism configured to receive the specimen rack from the first lifting/lowering part, transport the specimen rack to a specimen suction position, and transport the specimen rack having undergone specimen suction to the first lifting/lowering part, and the transport mechanism includes a first transport path adjacent to a movement region of the first lifting/lowering part, a second transport path disposed below the first transport path and adjacent to the movement region of the first lifting/lowering part, and a second lifting/lowering part configured to relay the specimen rack between the first transport path and the second transport path.

12. The specimen measurement apparatus of claim 11, wherein the first transport part and the second transport part are disposed at height positions different from each of height positions of the first transport path and the second transport path.

13. The specimen measurement apparatus of claim 1, wherein one of the first transport part and the second transport part is a rack setting part configured to allow the specimen rack to be set thereon, the specimen rack not having undergone specimen suction by the measurement unit, and another one of the first transport part and the second transport part is a rack collection part configured to collect the specimen rack holding the specimen container having undergone specimen suction by the measurement unit.

14. The specimen measurement apparatus of claim 13, wherein the first transport part is the rack collection part, and the second transport part is the rack setting part.

15. The specimen measurement apparatus of claim 1, wherein each of the first transport part and the second transport part is either of a rack setting part configured to allow the specimen rack to be set thereon, the specimen rack before undergoing specimen suction by the measurement unit, and a rack collection part configured to collect the specimen rack holding the specimen container having undergone the specimen suction by the measurement unit.

16. The specimen measurement apparatus of claim 1, wherein each of the first transport part and the second transport part has a single transport lane on which the specimen rack is transported.

17. A specimen transport device configured to transport a specimen container to a measurement device configured to suction a specimen from the specimen container, the measurement device being further configured to measure the suctioned specimen, the specimen transport device comprising:

a transport device having a transport surface thereon, a first transport part including a first placement surface configured to allow a plurality of specimen racks to be placed side-by-side along a short-side direction of the specimen rack thereon, the first transport part being configured to transport the plurality of the specimen racks, each holding the specimen container, on the first placement surface in the short-side direction of the specimen rack, wherein the first placement surface is located at a first fixed position at which the specimen racks can be relayed between the transport surface and the first placement surface; and a second transport part disposed above the first transport part and including a second placement surface configured to allow the plurality of specimen racks to be placed side-by-side along the short-side direction of the specimen rack thereon, the second transport part being configured to transport the plurality of the specimen racks on the second placement surface in the short-side direction of the specimen rack, wherein the second placement surface is located at a second fixed position at which the specimen racks can be relayed between the transport surface and the second placement surface, wherein the first transport part is configured to allow the specimen rack to be taken out therefrom or set thereon in a long-side direction of the specimen rack by a user, wherein a height range between the first placement surface and a lower surface of the second transport part is a rack storing region in which the plurality of specimen racks are placed, and the rack storing region is exposed to outside of the specimen transport unit through an exposed portion in the long-side direction of the specimen rack.

* * * * *